US010761304B2

(12) United States Patent
Machida

(10) Patent No.: US 10,761,304 B2
(45) Date of Patent: Sep. 1, 2020

(54) ZOOM OPTICAL SYSTEM, OPTICAL APPARATUS AND METHOD FOR MANUFACTURING THE ZOOM OPTICAL SYSTEM

(71) Applicant: Nikon Corporation, Minato-ku, Tokyo (JP)

(72) Inventor: Kosuke Machida, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 199 days.

(21) Appl. No.: 15/778,258

(22) PCT Filed: Nov. 28, 2016

(86) PCT No.: PCT/JP2016/085194
§ 371 (c)(1),
(2) Date: Aug. 13, 2018

(87) PCT Pub. No.: WO2017/094664
PCT Pub. Date: Jun. 8, 2017

(65) Prior Publication Data
US 2018/0341091 A1      Nov. 29, 2018

(30) Foreign Application Priority Data
Nov. 30, 2015   (JP) ................................ 2015-234025

(51) Int. Cl.
*G02B 15/14* (2006.01)
*G02B 15/173* (2006.01)
*G02B 13/02* (2006.01)

(52) U.S. Cl.
CPC ............. *G02B 15/14* (2013.01); *G02B 13/02* (2013.01); *G02B 15/173* (2013.01)

(58) Field of Classification Search
CPC ........ G02B 15/14; G02B 13/02; G02B 13/06; G02B 15/173; G02B 27/0037
See application file for complete search history.

(56) References Cited

U.S. PATENT DOCUMENTS 6,055,114 A      4/2000 Ohtake
2006/0268428 A1  11/2006 Kuroda et al.
(Continued)

FOREIGN PATENT DOCUMENTS

JP   H4-293007 A    10/1992
JP   H11-014904 A    1/1999
(Continued)

OTHER PUBLICATIONS

English translation of International Preliminary Report on Patentability from International Patent Application No. PCT/JP2016/085194, dated Jun. 14, 2018.
(Continued)

*Primary Examiner* — Wen Huang
(74) *Attorney, Agent, or Firm* — SGPatents PLLC

(57) ABSTRACT

A zoom optical system (ZL) comprises, in order from an object: a first lens group (G1) having positive refractive power; an intermediate group (GM) including at least one lens group and having negative refractive power as a whole; an intermediate side lens group (GRP1) having positive refractive power; a subsequent side lens group (GRP2) having positive refractive power; and a subsequent group (GR) including at least one lens group. The intermediate group (GM) includes a partial group satisfying following conditional expressions:

$$1.4 < fvr/fMt < 2.5;\text{ and}$$

$$0.15 < (-fvr)/ft < 0.35$$

where,
fvr denotes a focal length of the partial group,
fMt denotes a focal length of the intermediate group (GM) in a telephoto end state, and
(Continued)

ft denotes a focal length of the zoom optical system (ZL) in the telephoto end state.

11 Claims, 56 Drawing Sheets

(56) References Cited

U.S. PATENT DOCUMENTS

| | | |
|---|---|---|
| 2009/0251781 A1 | 10/2009 | Adachi et al. |
| 2010/0238561 A1 | 9/2010 | Nakagawa et al. |
| 2013/0050843 A1 | 2/2013 | Nakamura |
| 2014/0139722 A1 | 5/2014 | Sugita |
| 2014/0146216 A1 | 5/2014 | Okumura |
| 2014/0184884 A1 | 7/2014 | Iwasawa et al. |
| 2016/0018630 A1 | 1/2016 | Ori et al. |

FOREIGN PATENT DOCUMENTS

| | | |
|---|---|---|
| JP | 2003-287680 A | 10/2003 |
| JP | 2005-292338 A | 10/2005 |
| JP | 2006-301474 A | 11/2006 |
| JP | 2009-265652 A | 11/2009 |
| JP | 2010-197481 A | 9/2010 |
| JP | 2013-044815 A | 3/2013 |
| JP | 2013-178430 A | 9/2013 |
| JP | 2014-041223 A | 3/2014 |
| JP | 2014-102462 A | 6/2014 |
| JP | 2014-106391 A | 6/2014 |
| JP | 2014-126851 A | 7/2014 |
| JP | 2016-206409 A | 12/2016 |
| WO | WO 2014/155463 A1 | 10/2014 |

OTHER PUBLICATIONS

Office Action dated Jan. 21, 2020, in Japanese Patent Application No. 2017-553841.
Office Action dated Dec. 26, 2019, in Chinese Patent Application No. 201680069746.5.
International Search Report from International Patent Application No. PCT/JP2016/085194, dated Feb. 28, 2017.
Office Action dated Jun. 11, 2019, in Japanese Patent Application No. 2017-553841.

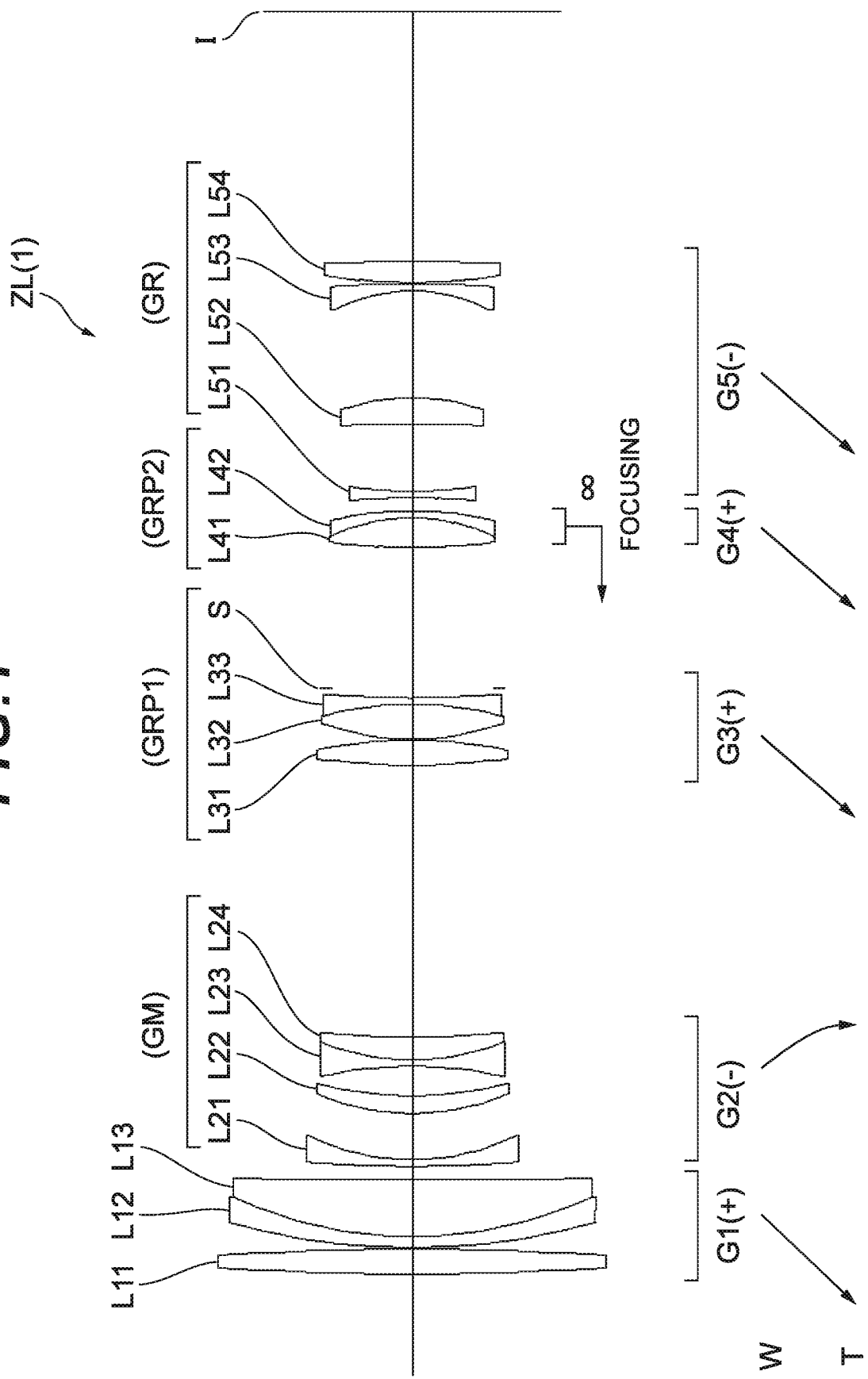

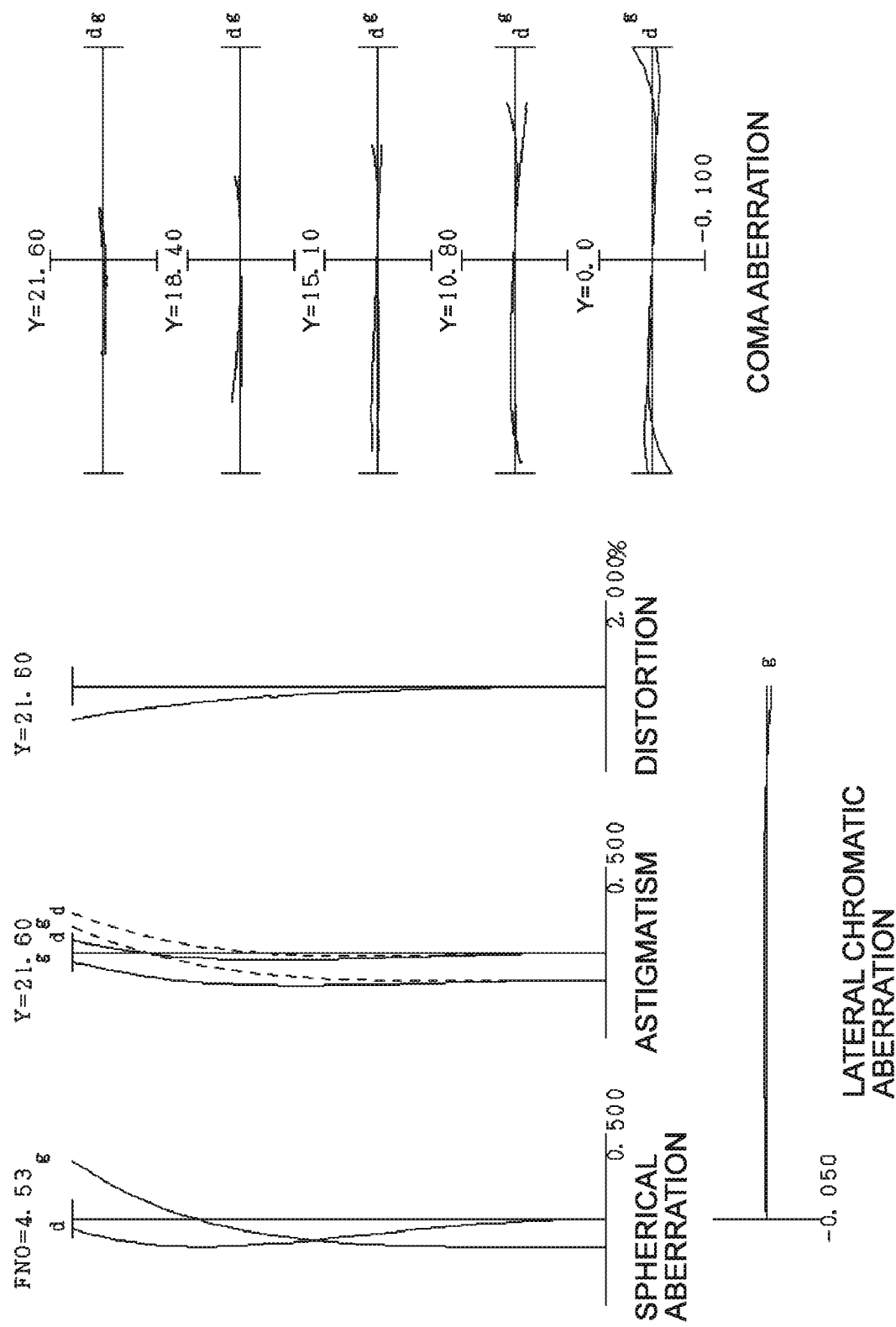

COMA ABERRATION

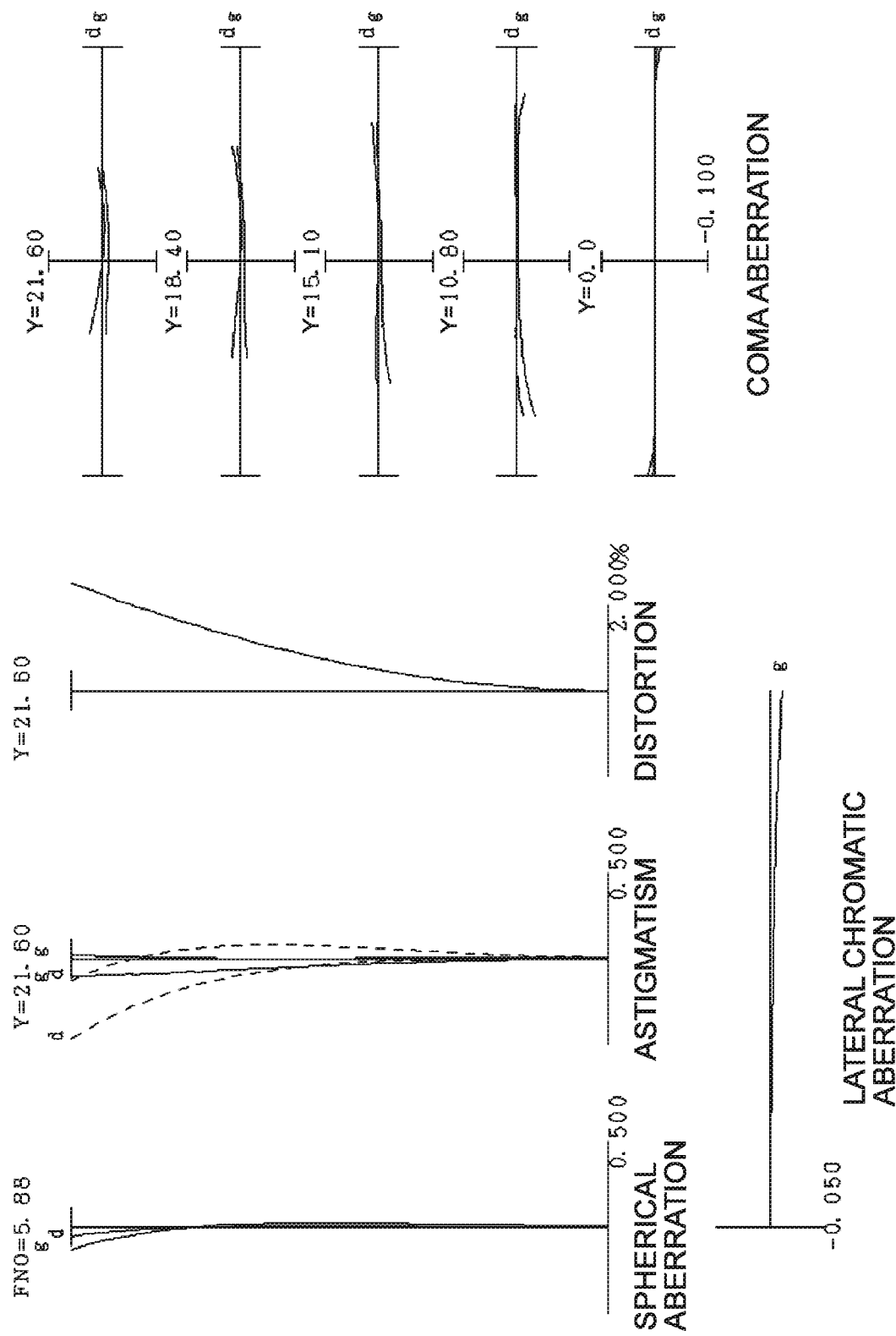

COMA ABERRATION

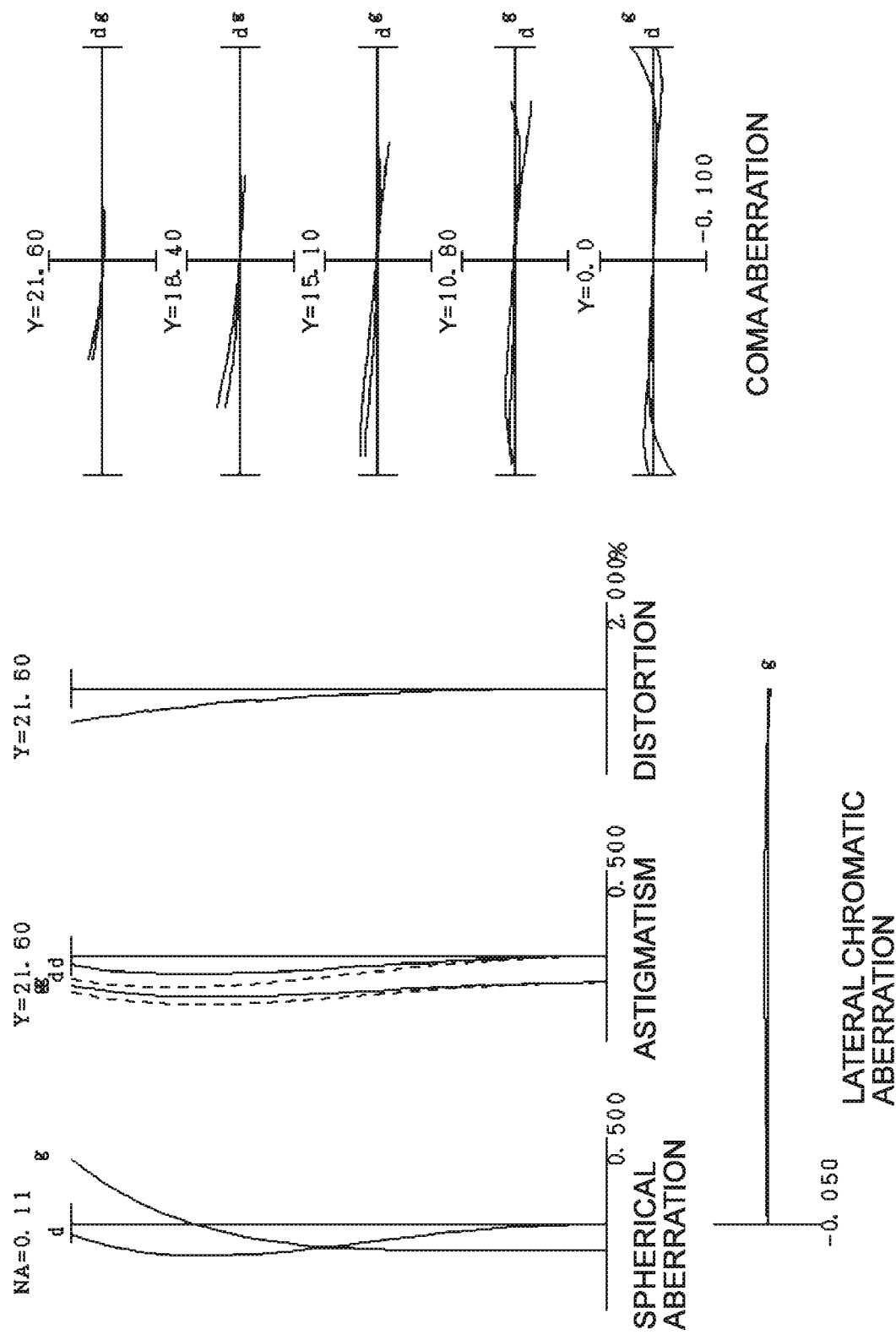

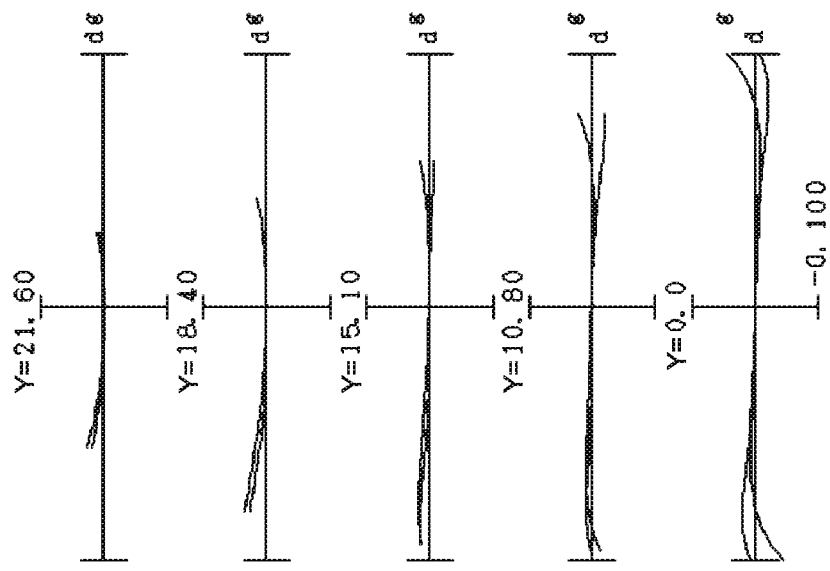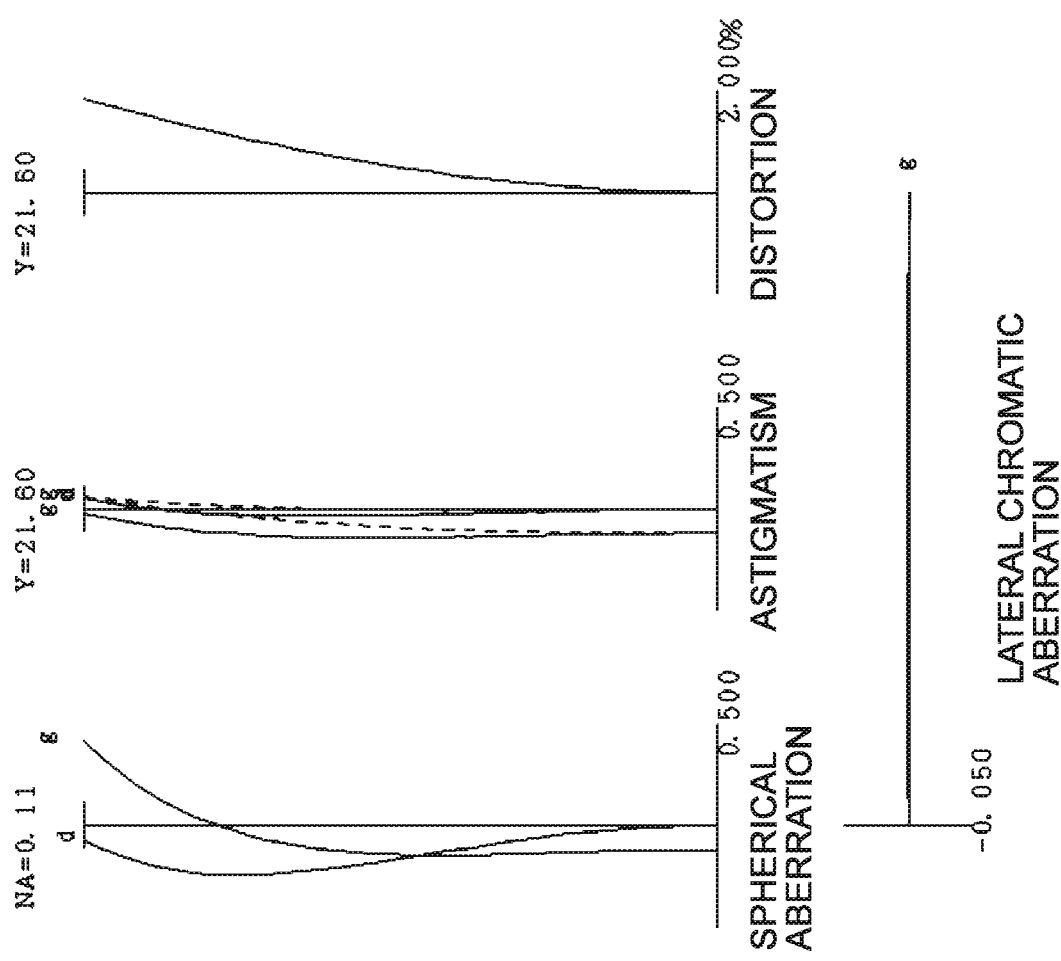

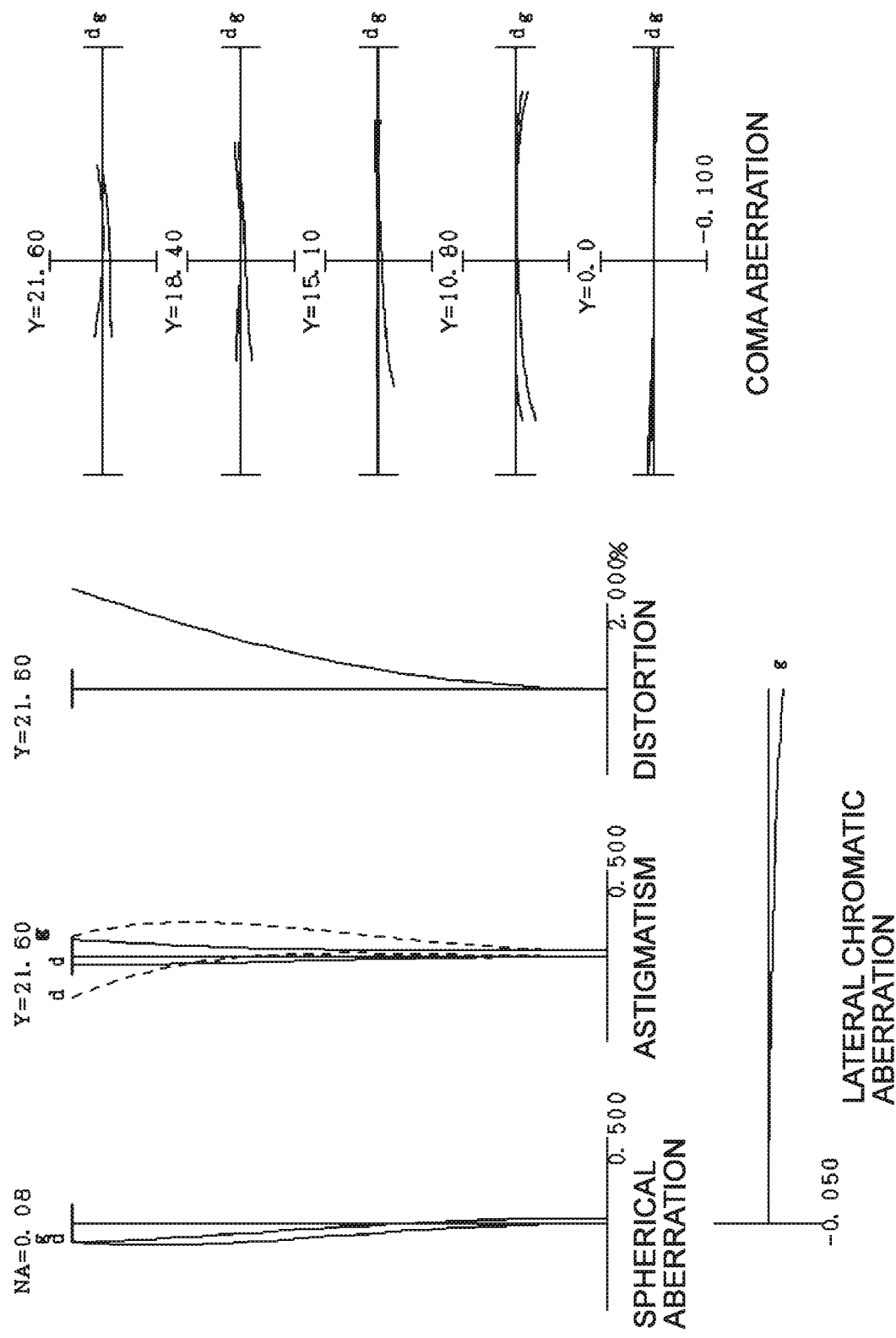

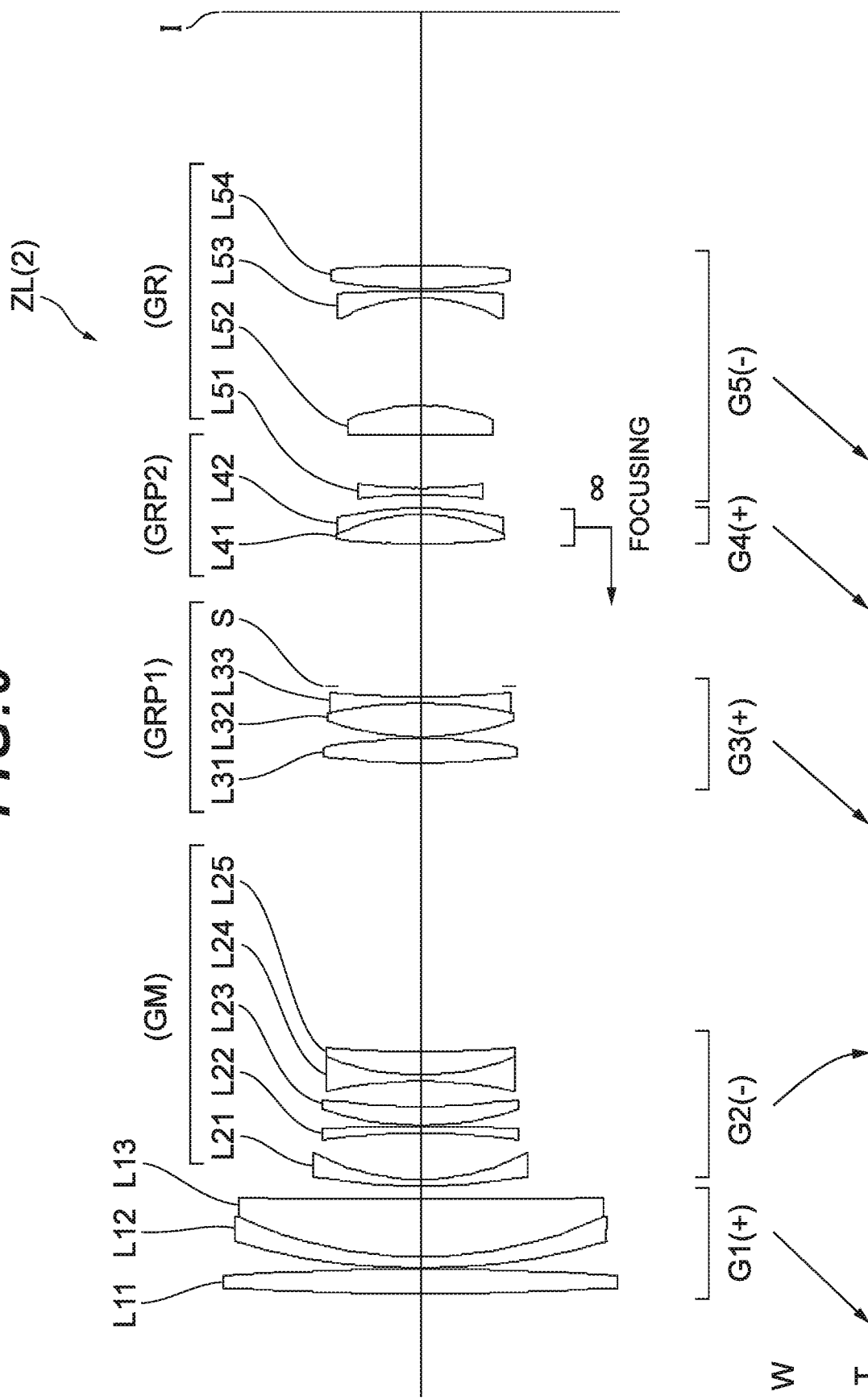

COMA ABERRATION

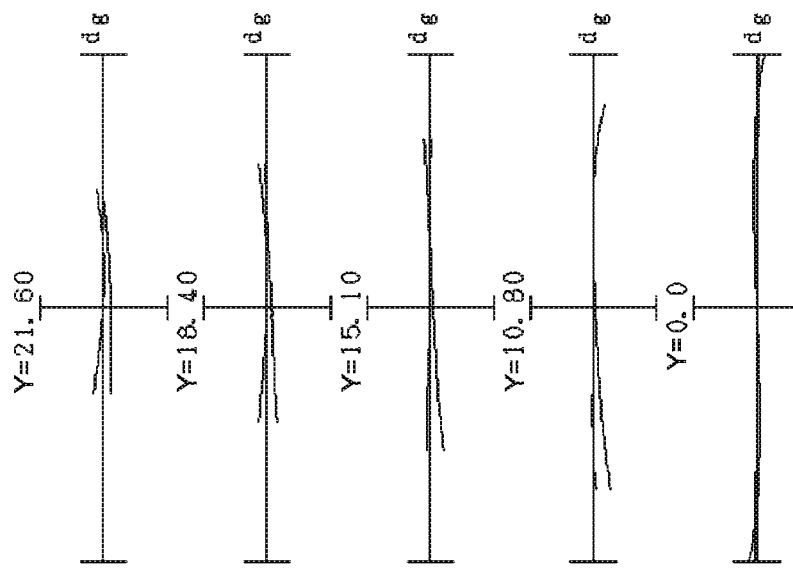
FIG. 9A
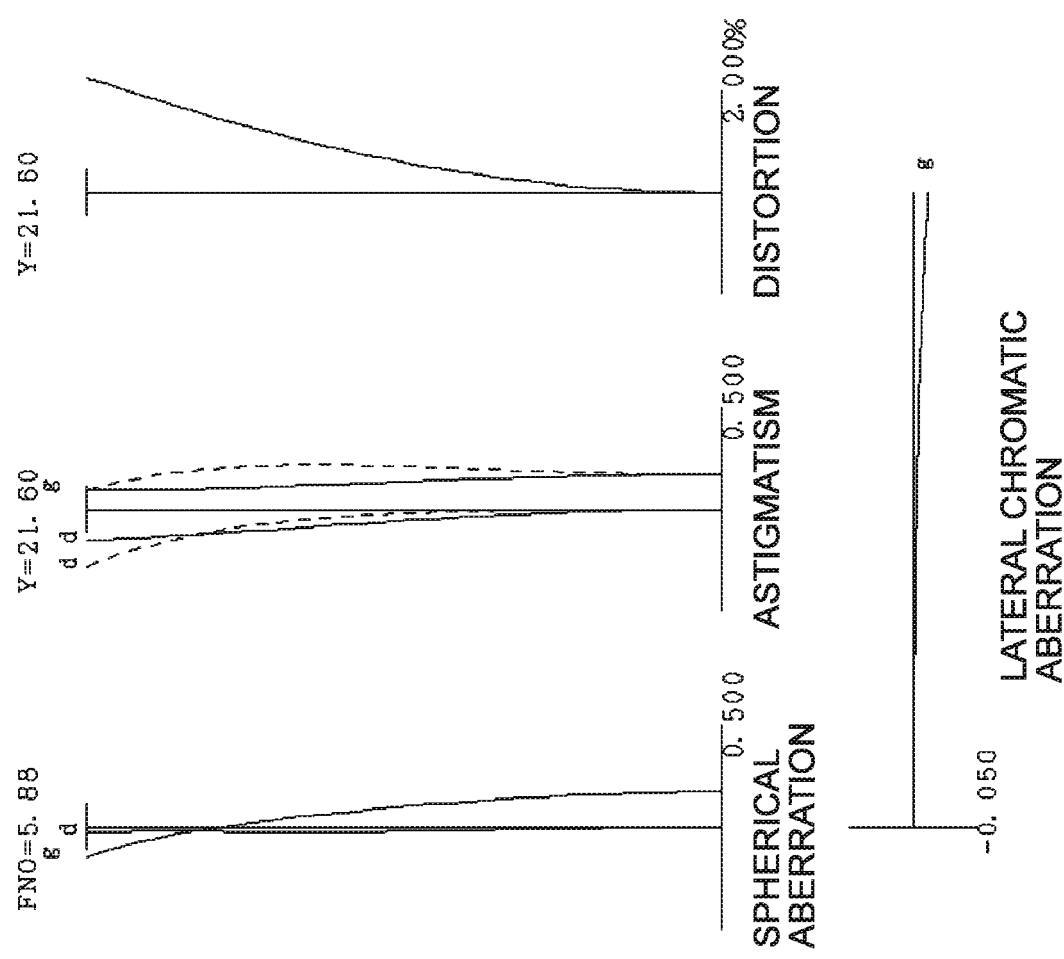

COMA ABERRATION

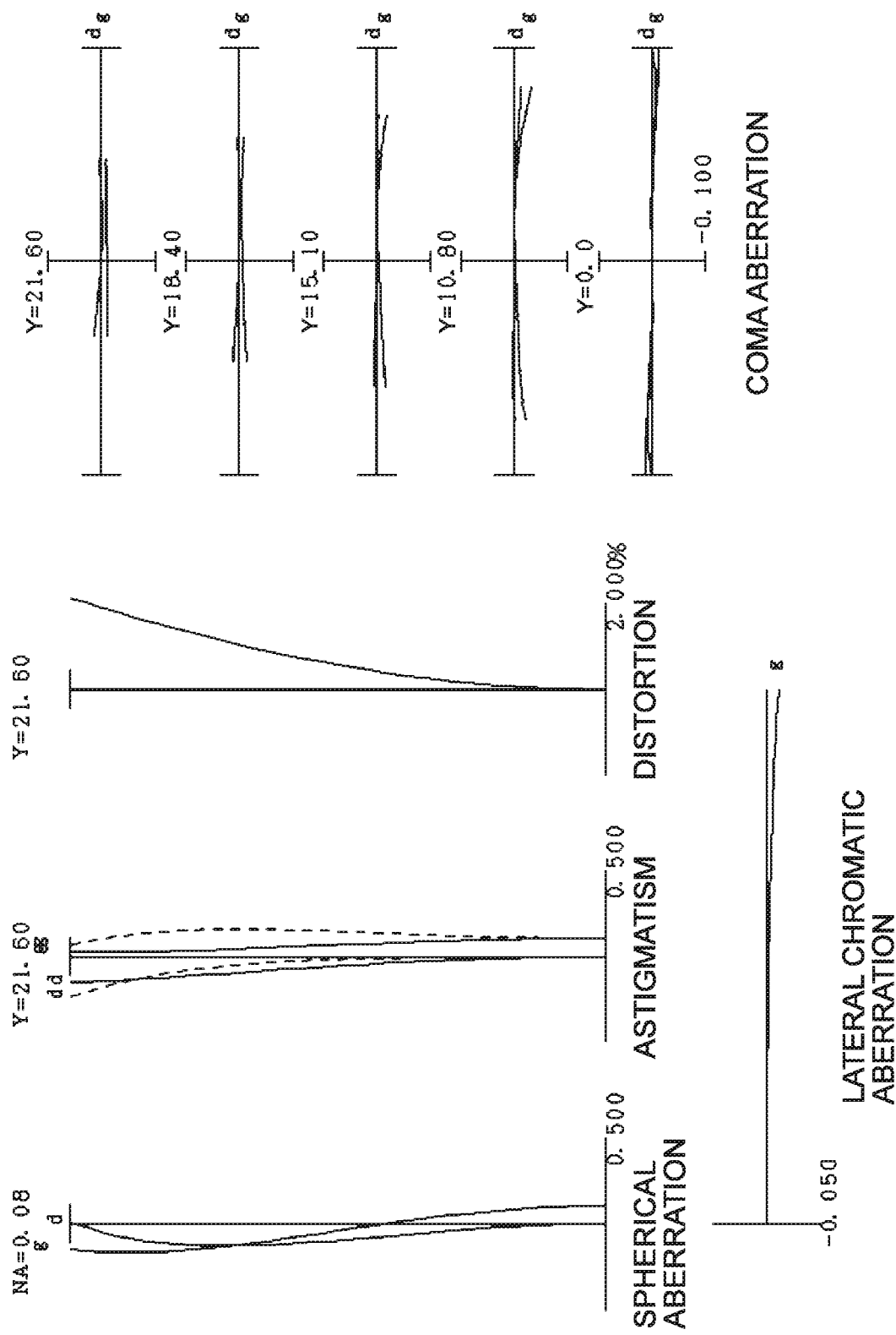

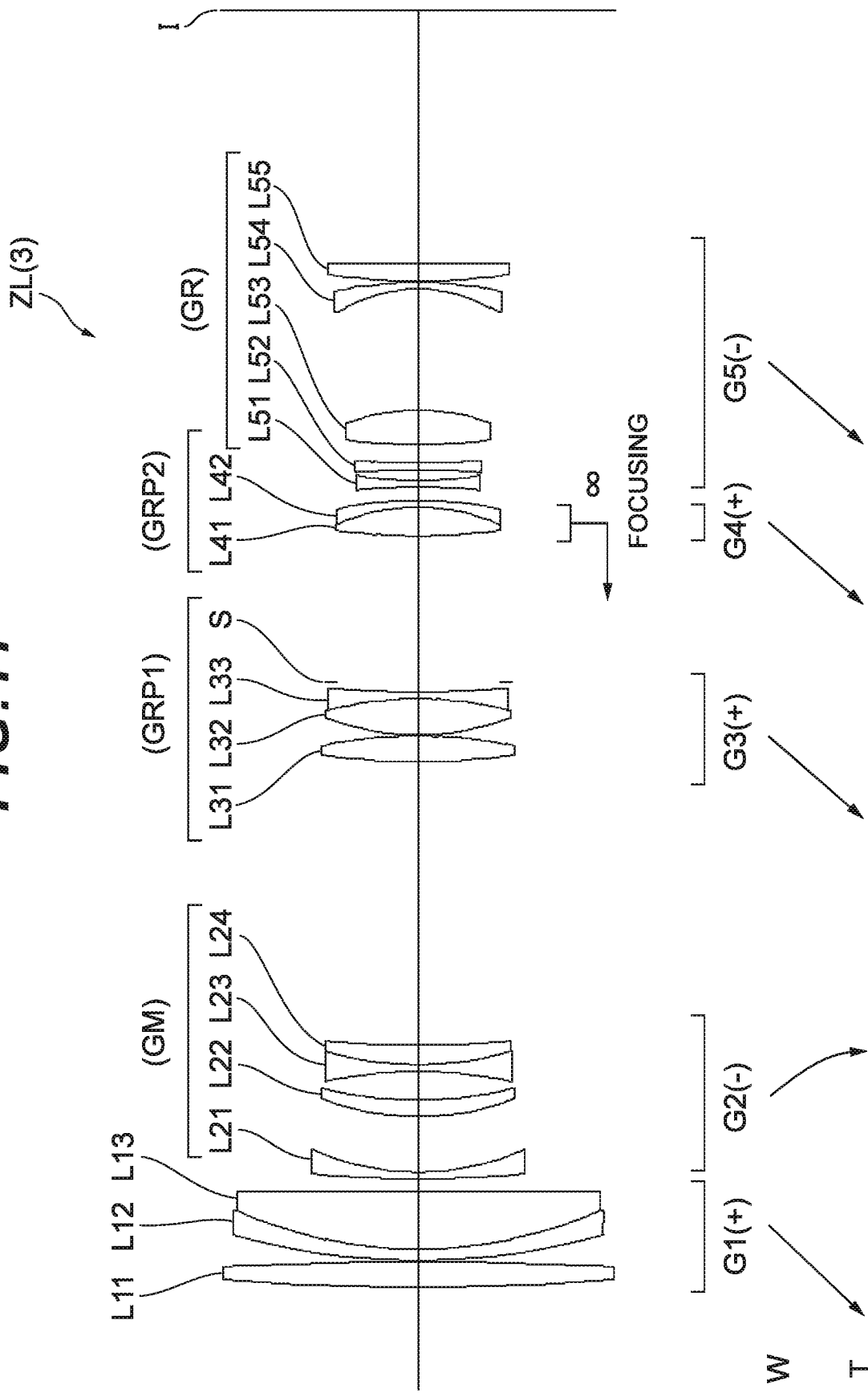

COMA ABERRATION

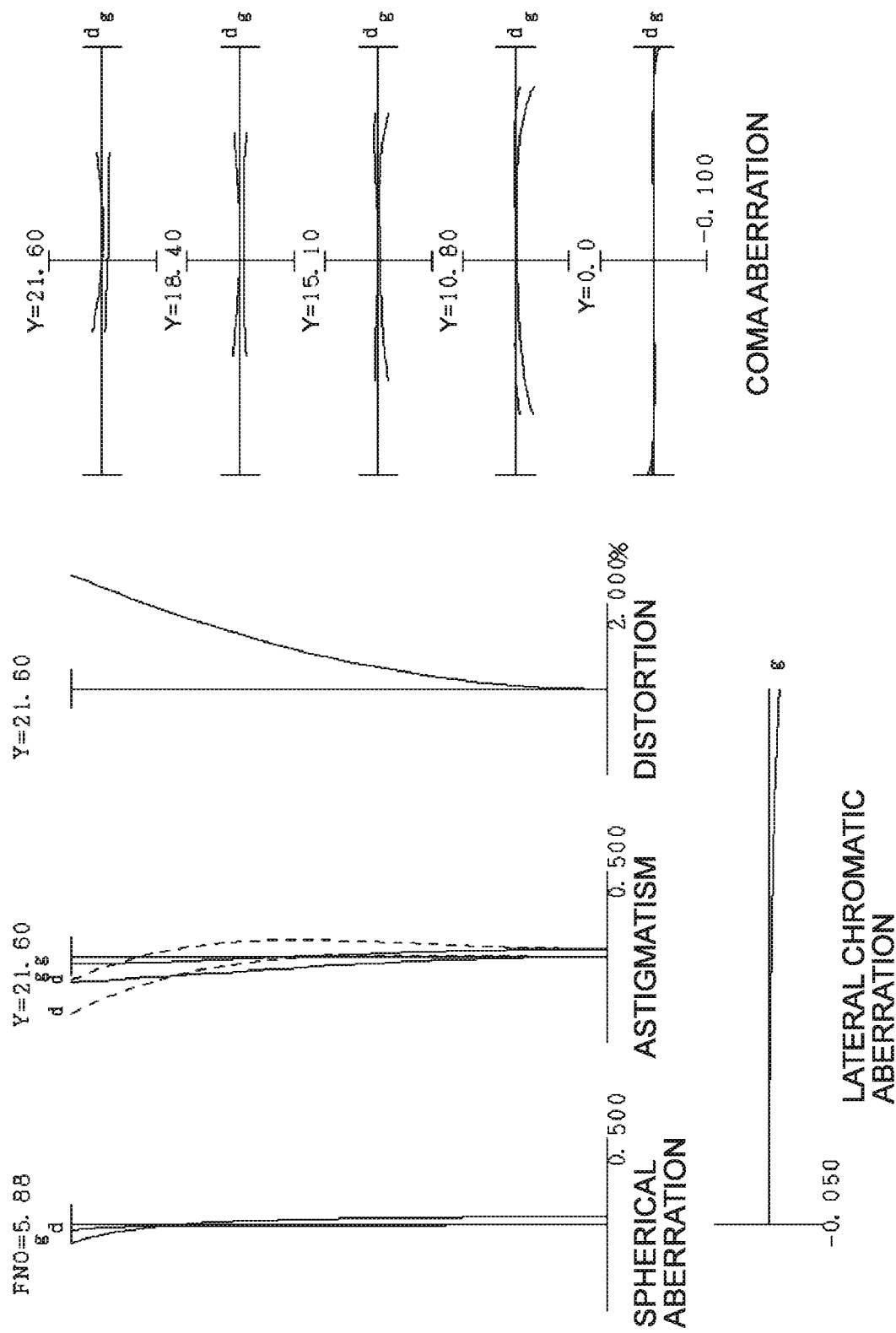

COMA ABERRATION

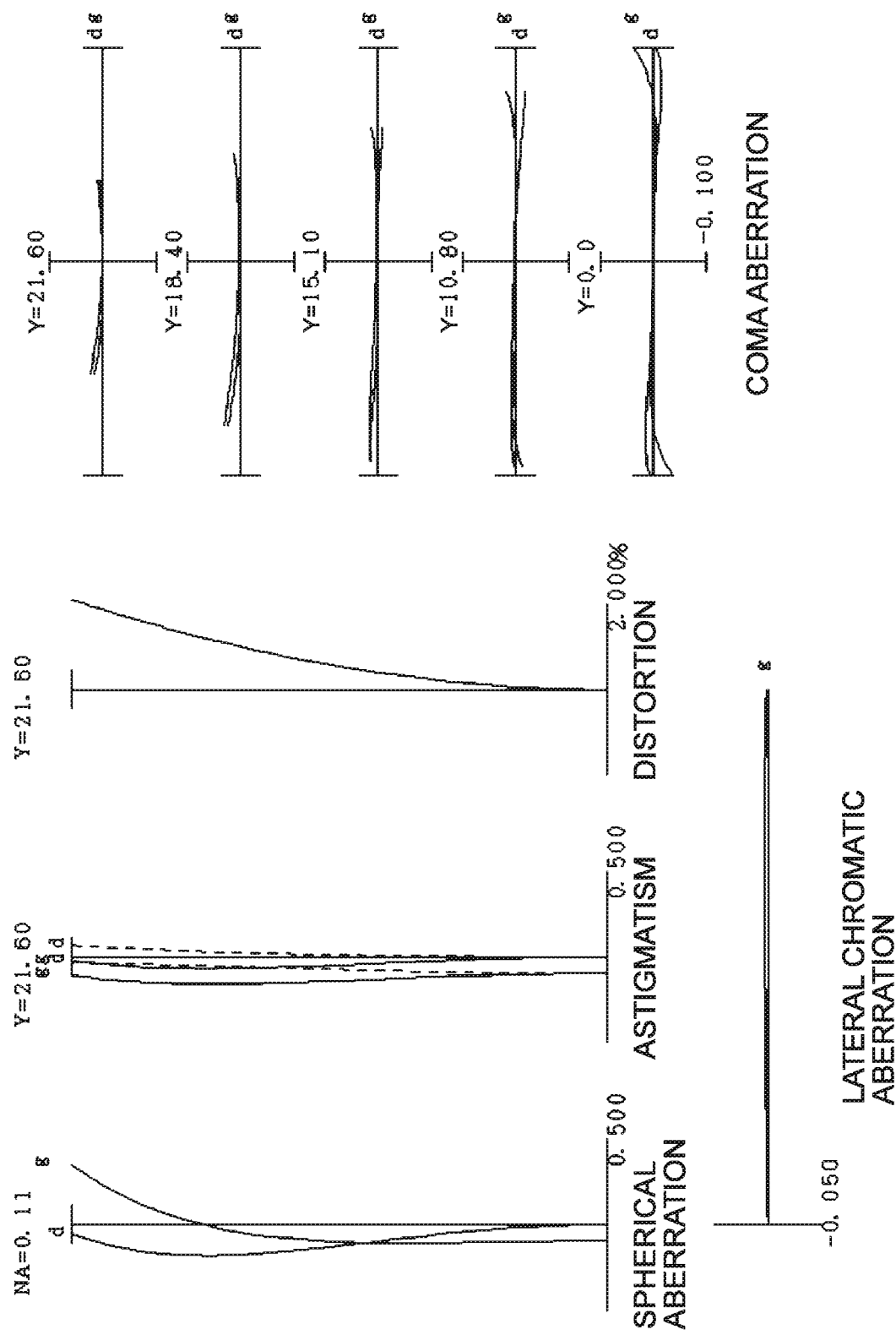

COMA ABERRATION

COMA ABERRATION

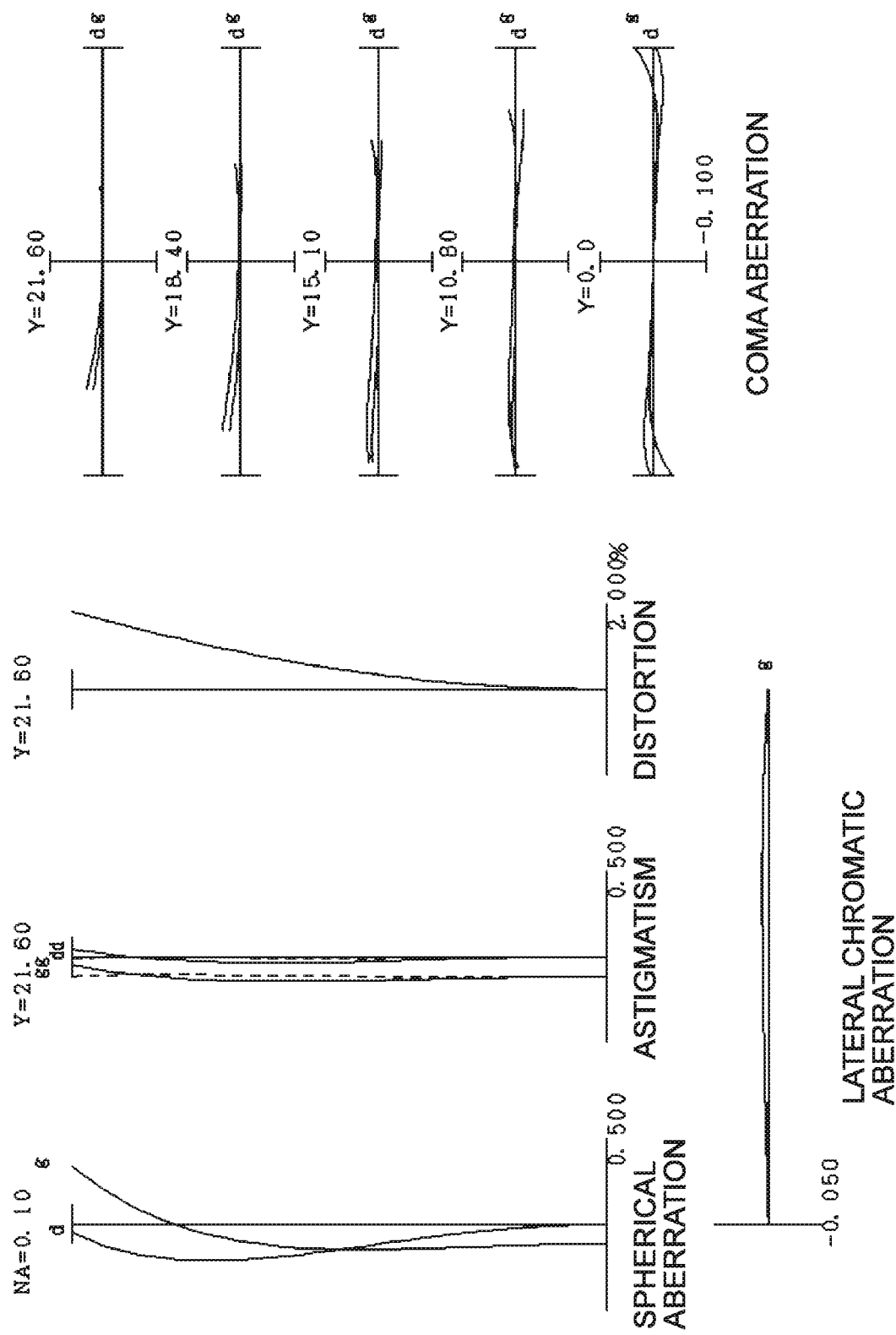

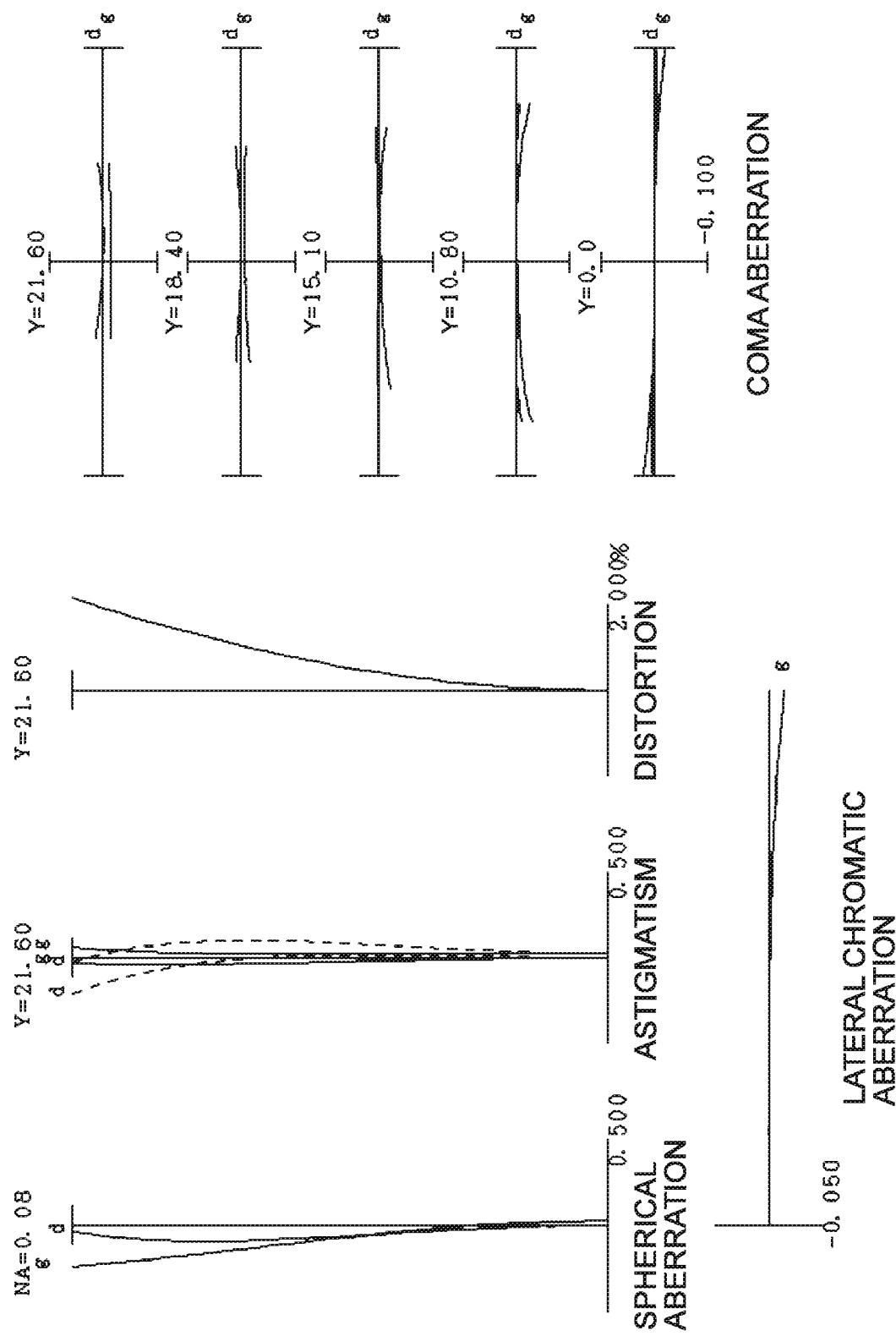

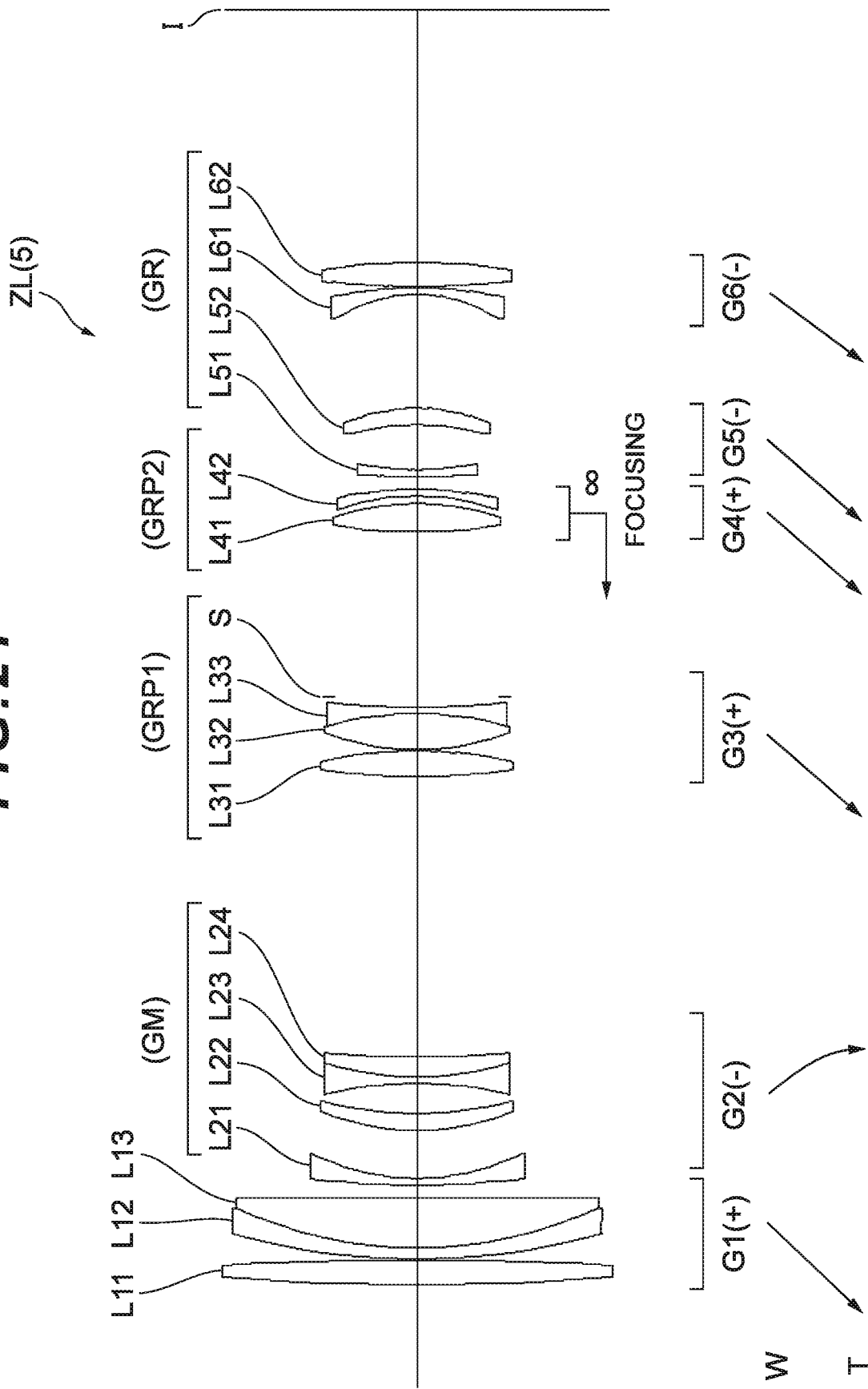

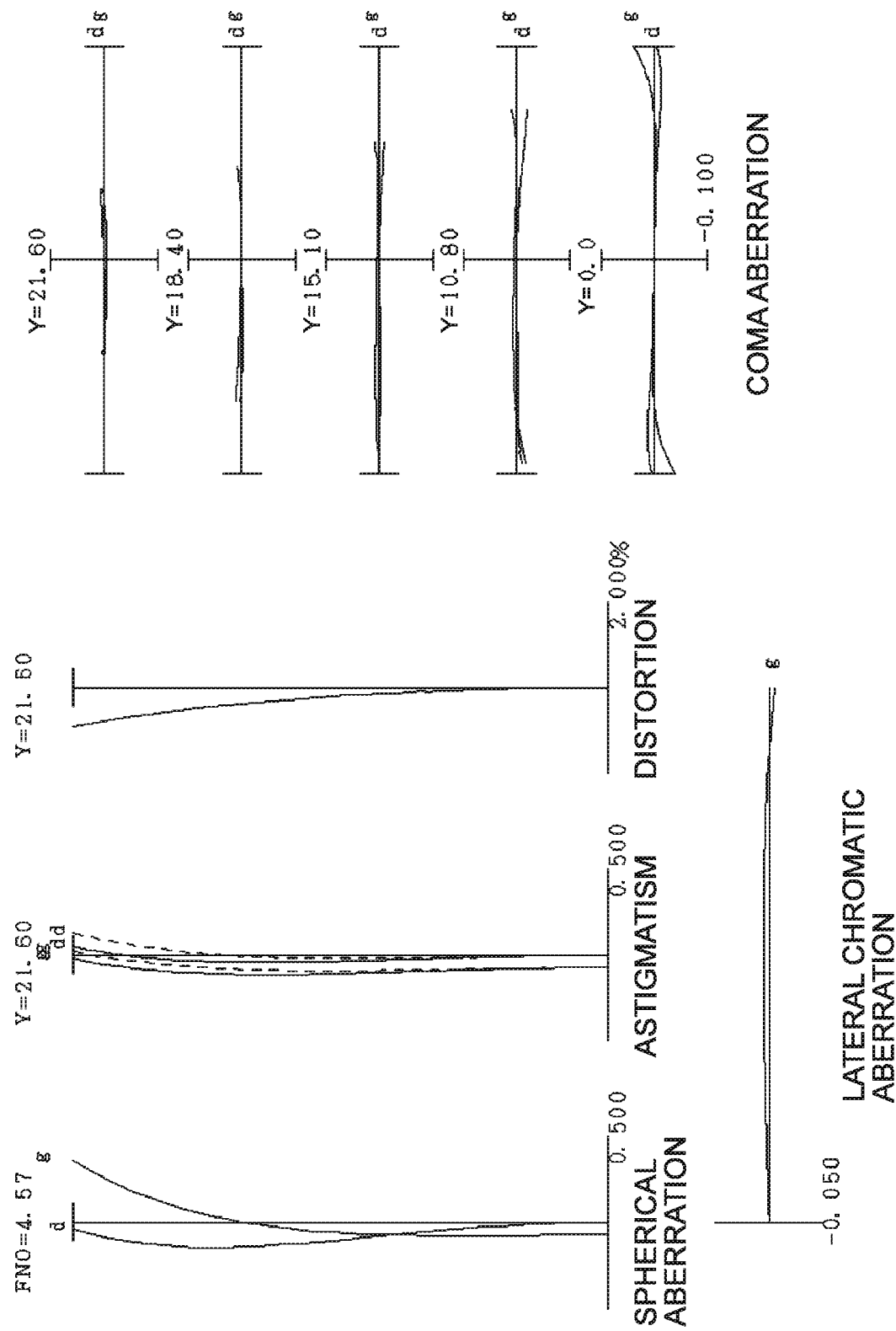

COMA ABERRATION

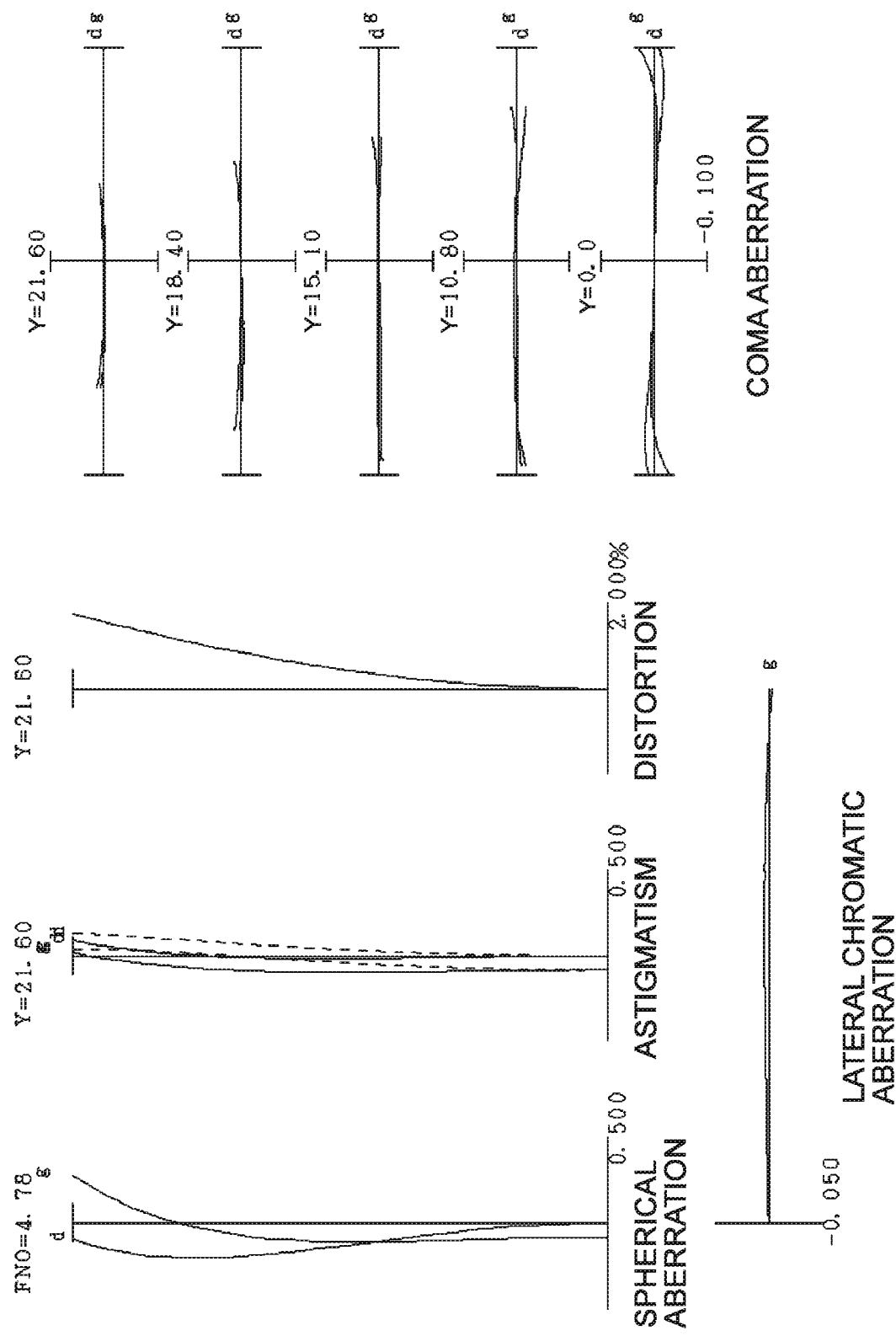

COMA ABERRATION

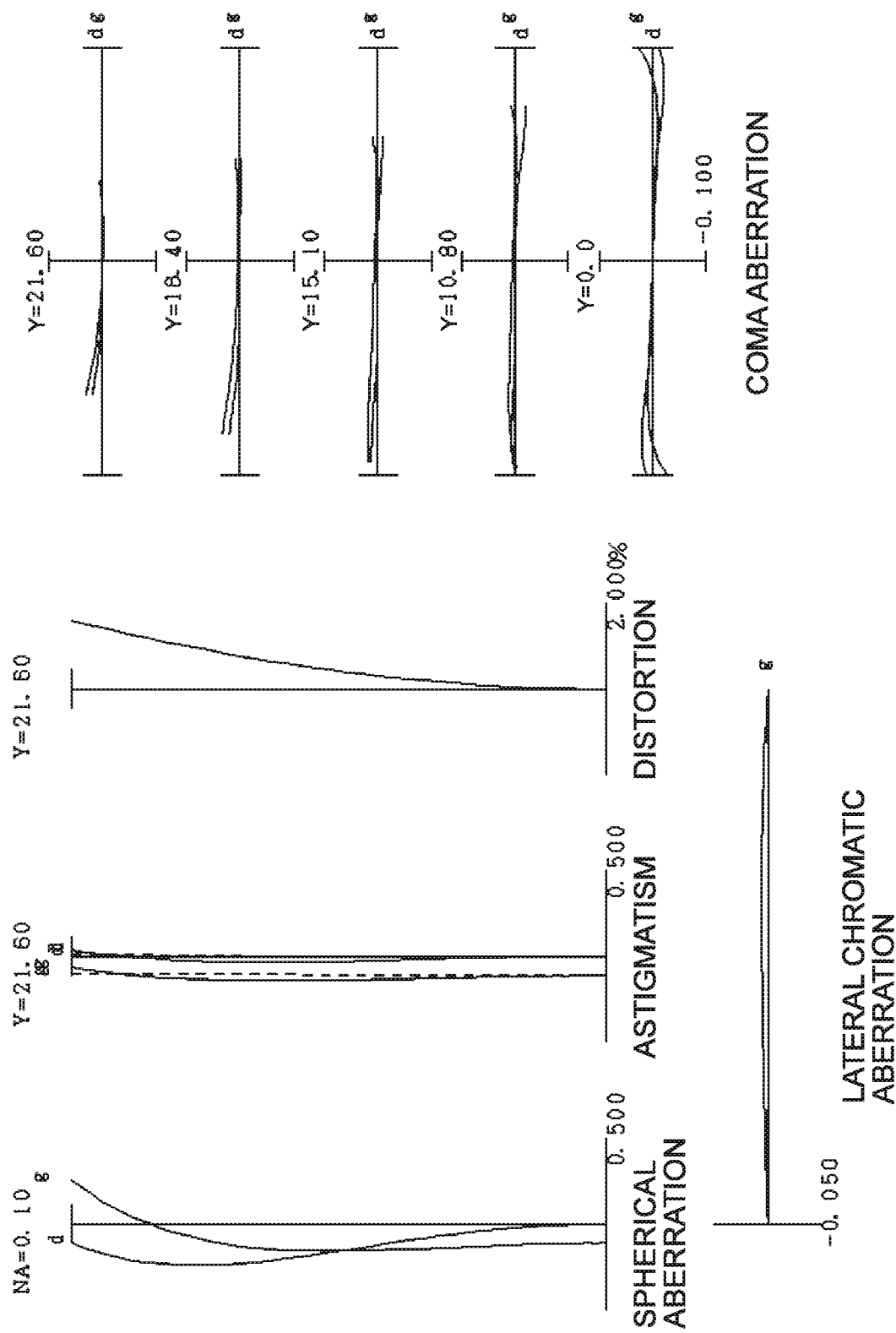

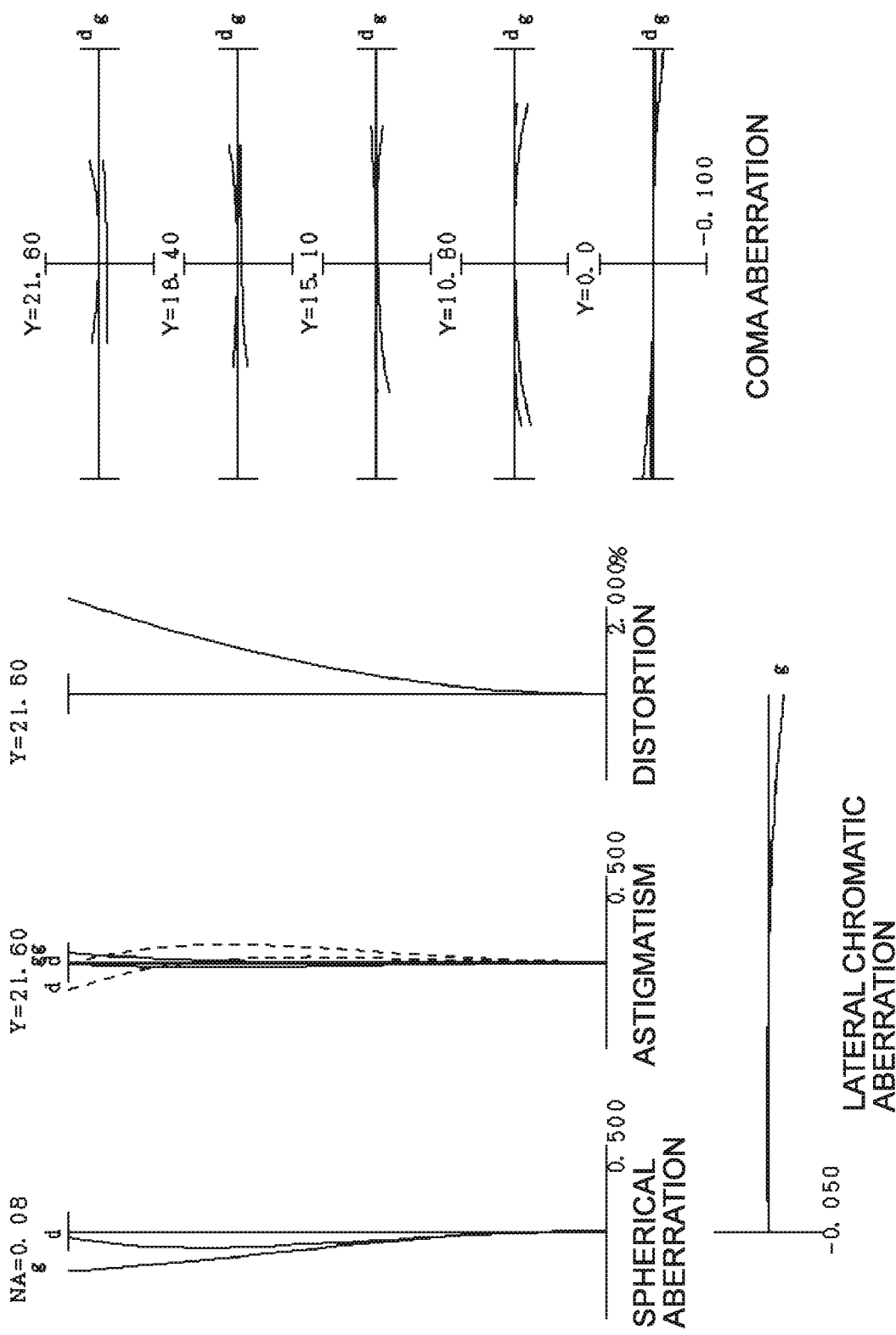

COMA ABERRATION

COMA ABERRATION

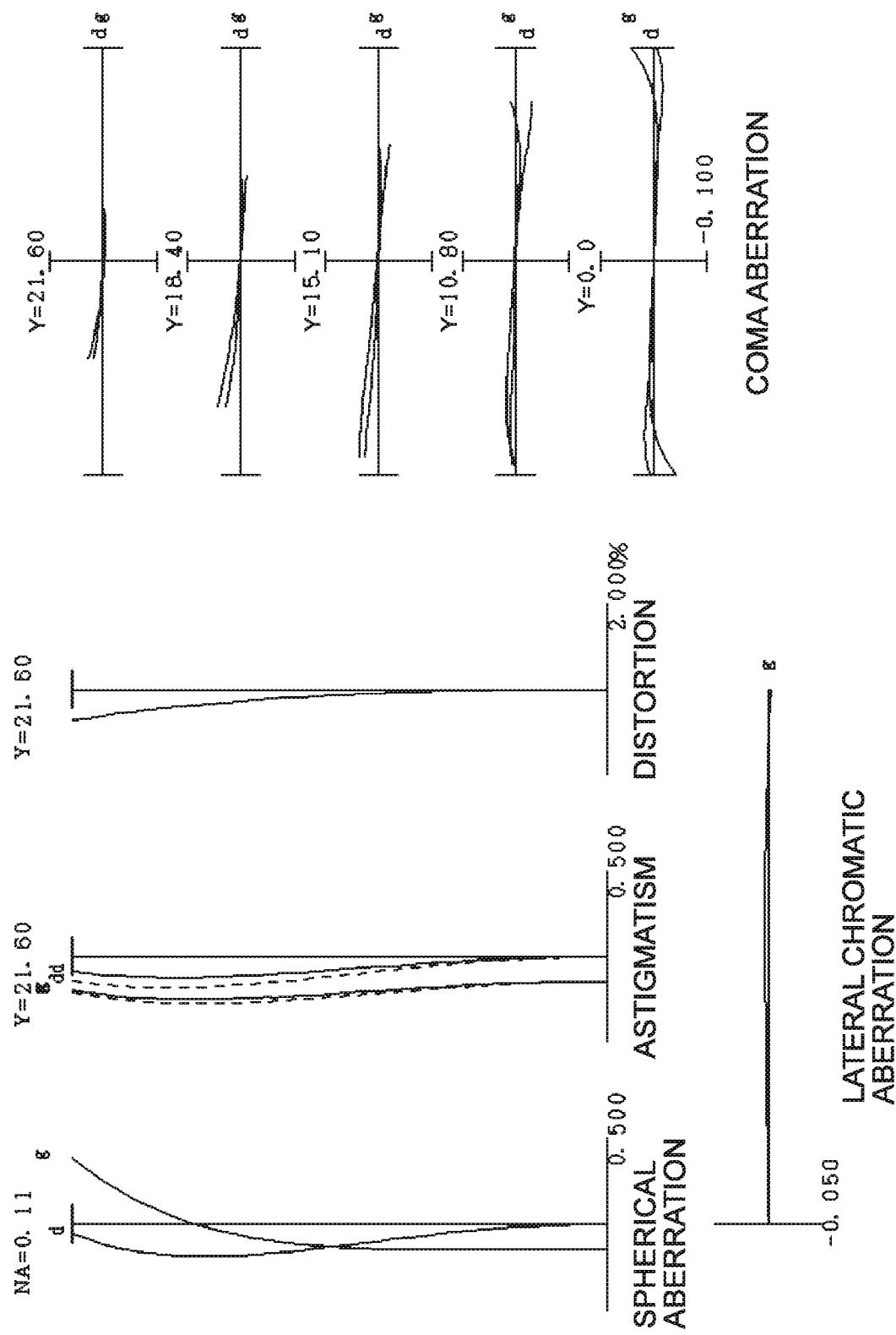

US 10,761,304 B2

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus using the same and a method for manufacturing the zoom optical system.

TECHNICAL BACKGROUND

A zoom optical system suitable for photographic cameras, electronic still cameras, video cameras, and the like has conventionally been proposed (see, for example, Patent Document 1). Optical performance of such a conventional zoom optical system has been insufficient.

PRIOR ARTS LIST

Patent Document

Patent Document 1: Japanese Laid-Open Patent Publication No. H4-293007 (A)

SUMMARY OF THE INVENTION

A zoom optical system according to the present invention comprises, in order from an object: a first lens group having positive refractive power; an intermediate group including at least one lens group and having negative refractive power as a whole; an intermediate side lens group having positive refractive power; a subsequent side lens group having positive refractive power; and a subsequent group including at least one lens group. Upon zooming, distances between the first lens group and the intermediate group, between the intermediate group and the intermediate side lens group, between the intermediate side lens group and the subsequent side lens group, and between the subsequent side lens group and the subsequent group change. The subsequent side lens group moves upon focusing. The intermediate group includes a partial group satisfying following conditional expressions:

$1.4 < fvr/fMt < 2.5$; and $0.15 < (-fvr)/ft < 0.35$ where,
fvr denotes a focal length of the partial group,
fMt denotes a focal length of the intermediate group in a telephoto end state, and
ft denotes a focal length of the zoom optical system in the telephoto end state.

An optical apparatus according to the present invention comprises the zoom optical system described above.

A method for manufacturing a zoom optical system according to the present invention is a method for manufacturing a zoom optical system which comprises, in order from an object: a first lens group having positive refractive power; an intermediate group including at least one lens group and having negative refractive power as a whole; an intermediate side lens group having positive refractive power; a subsequent side lens group having positive refractive power; and a subsequent group including at least one lens group, the method comprising a step of arranging the lens groups in a lens barrel so that: upon zooming, distances between the first lens group and the intermediate group, between the intermediate group and the intermediate side lens group, between the intermediate side lens group and the subsequent side lens group, and between the subsequent side lens group and the subsequent group change; the subsequent side lens group moves upon focusing; and the intermediate group includes a partial group satisfying following conditional expressions:

$1.4 < fvr/fMt < 2.5$; and $0.15 < (-fvr)/ft < 0.35$ where,
fvr denotes a focal length of the partial group,
fMt denotes a focal length of the intermediate group in a telephoto end state, and
ft denotes a focal length of the zoom optical system in the telephoto end state.

BRIEF DESCRIPTION OF THE DRAWINGS

FIG. 1 is a diagram illustrating a lens configuration of a zoom optical system according to Example 1 of the present embodiment.

FIG. 2A is a graph showing various aberrations of the zoom optical system according to Example 1 upon focusing on infinity in a wide angle end state.

FIG. 4A is a graph showing various aberrations of the zoom optical system according to Example 1 upon focusing on infinity in a telephoto end state.

FIGS. 5A, 5B, and 5C are graphs showing various aberrations of the zoom optical system according to Example 1 upon focusing on a short distant object, respectively in the wide angle end state, the intermediate focal length state, and the telephoto end state.

FIG. 6 is a diagram illustrating a lens configuration of a zoom optical system according to Example 2 of the present embodiment.

FIG. 9A is a graph showing various aberrations of the zoom optical system according to Example 2 upon focusing on infinity in the telephoto end state.

FIGS. 10A, 10B, and 10C are graphs showing various aberrations of the zoom optical system according to Example 2 upon focusing on a short distant object, respectively in the wide angle end state, the intermediate focal length state, and the telephoto end state.

FIG. 11 is a diagram illustrating a lens configuration of a zoom optical system according to Example 3 of the present embodiment.

FIG. 14A is a graph showing various aberrations of the zoom optical system according to Example 3 upon focusing on infinity in the telephoto end state.

FIGS. 15A, 15B, and 15C are graphs showing various aberrations of the zoom optical system according to Example 3 upon focusing on a short distant object, respectively in the wide angle end state, the intermediate focal length state, and the telephoto end state.

FIGS. 20A, 20B, and 20C are graphs showing various aberrations of the zoom optical system according to Example 4 upon focusing on a short distant object, respectively in the wide angle end state, the intermediate focal length state, and the telephoto end state.

FIG. 21 is a diagram illustrating a lens configuration of a zoom optical system according to Example 5 of the present embodiment.

FIG. 22A is a graph showing various aberrations of the zoom optical system according to Example 5 upon focusing on infinity in the wide angle end state.

FIG. 23 is a graph showing various aberrations of the zoom optical system according to Example 5 upon focusing on infinity in the intermediate focal length state.

FIGS. 25A, 25B, and 25C are graphs showing various aberrations of the zoom optical system according to Example 5 upon focusing on a short distant object, respectively in the wide angle end state, the intermediate focal length state, and the telephoto end state.

FIGS. 30A, 30B, and 30C are graphs showing various aberrations of the zoom optical system according to Example 6 upon focusing on a short distant object, respectively in the wide angle end state, the intermediate focal length state, and the telephoto end state.

DESCRIPTION OF THE EMBODIMENTS

A zoom optical system and an optical apparatus according to the present embodiment are described below with reference to the drawings. As illustrated in FIG. 1, a zoom optical system ZL(1) as an example of a zoom optical system (zoom lens) ZL according to the present embodiment comprises, in order from an object: a first lens group G1 having positive refractive power; an intermediate group GM (second lens group G2) including at least one lens group and having negative refractive power as a whole; an intermediate side lens group GRP1 (third lens group G3) having positive refractive power; a subsequent side lens group GRP2 (fourth lens group G4) having positive refractive power; and a subsequent group GR (fifth lens group G5) including at least one lens group. Upon zooming, distances between the first lens group G1 and the intermediate group GM, between the intermediate group GM and the intermediate side lens group GRP1, between the intermediate side lens group GRP1 and the subsequent side lens group GRP2, and between the subsequent side lens group GRP2 and the subsequent group GR change. The subsequent side lens group GRP2 moves as a focusing lens group upon focusing.

Figure 16:
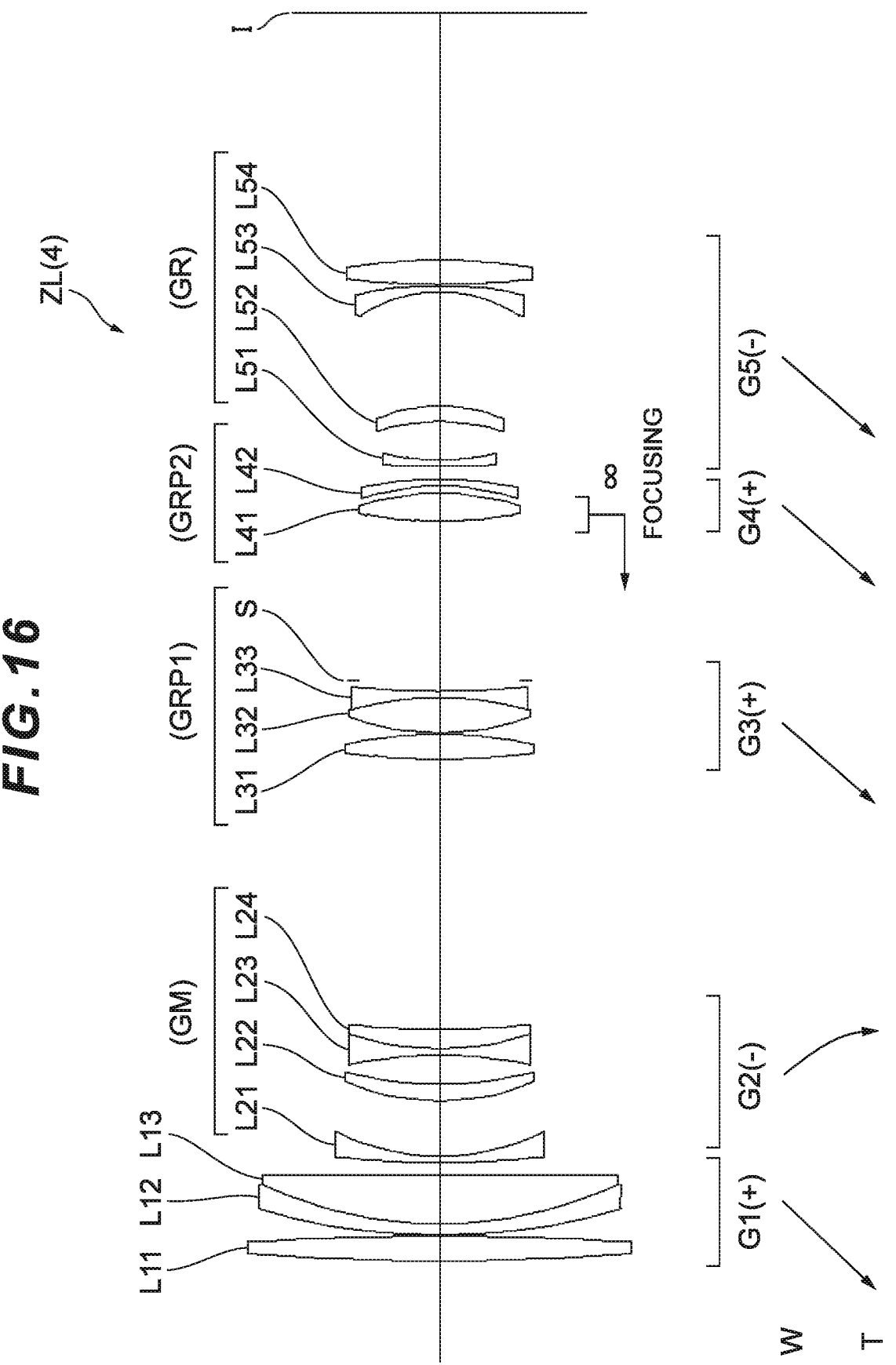
FIG. 16 is a diagram illustrating a lens configuration of a zoom optical system according to Example 4 of the present embodiment.
Figure 26:
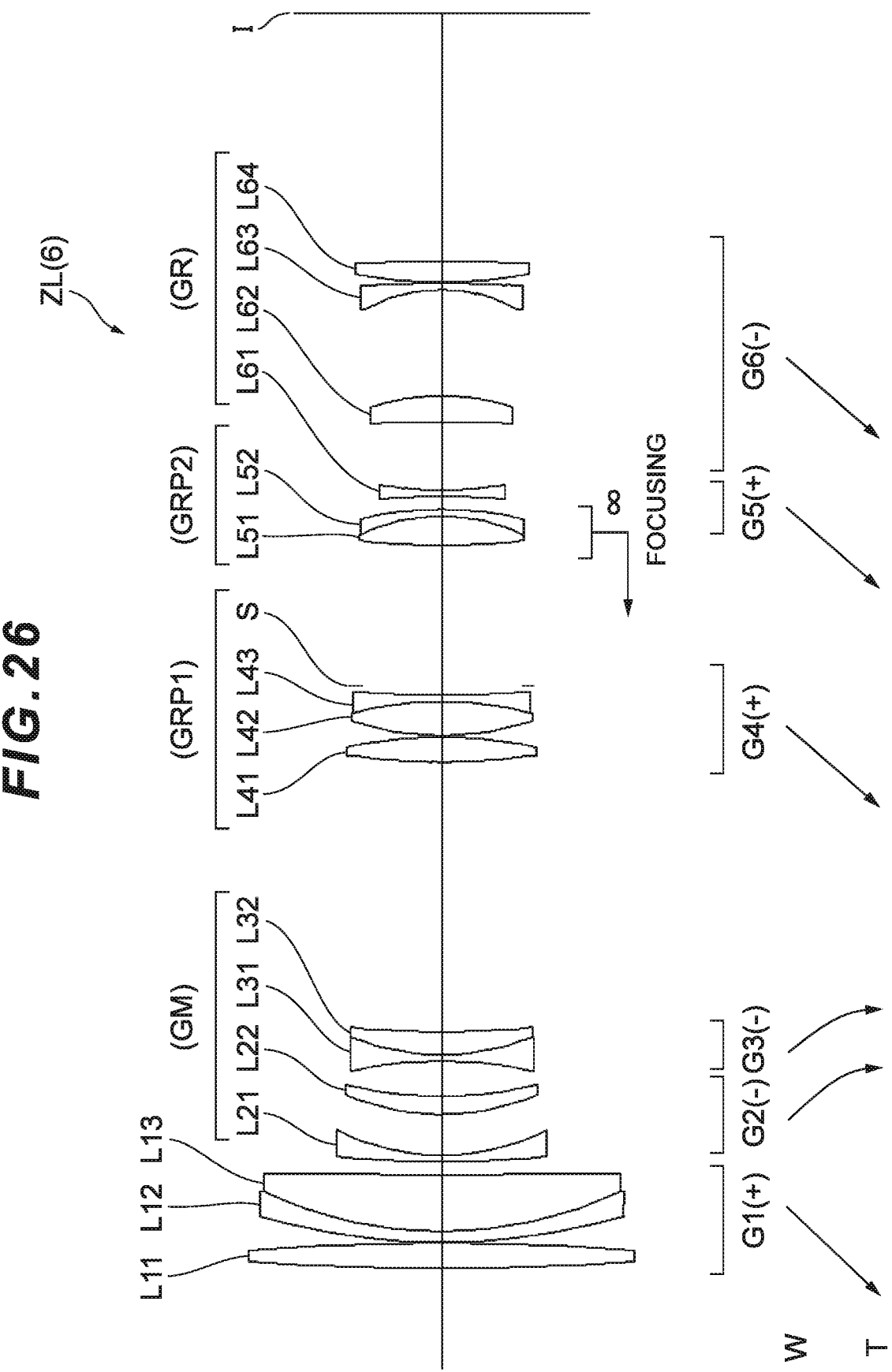
FIG. 26 is a diagram illustrating a lens configuration of a zoom optical system according to Example 6 of the present embodiment.

The zoom optical system ZL according to the present embodiment may also be a zoom optical system ZL(2) illustrated in FIG. 6, a zoom optical system ZL(3) illustrated in FIG. 11, a zoom optical system ZL(4) illustrated in FIG. 16, a zoom optical system ZL(5) illustrated in FIG. 21, or a zoom optical system ZL(6) illustrated in FIG. 26. The zoom optical systems ZL(2), ZL(3), and ZL(4) respectively illustrated in FIGS. 6, 11, and 16 have the same configuration as the zoom optical system ZL(1) illustrated in FIG. 1. In the zoom optical system ZL(5) illustrated in FIG. 21, the intermediate group GM (second lens group G2), the intermediate side lens group GRP1 (third lens group G3), and the subsequent side lens group GRP2 (fourth lens group G4) have the same configurations as those in the zoom optical system ZL(1) illustrated in FIG. 1. The subsequent group GR consists of the fifth lens group G5 and a sixth lens group G6. In the zoom optical system ZL(6) illustrated in FIG. 26, the intermediate group GM consists of the second lens group G2 and the third lens group G3, the intermediate side lens group GRP1 consists of the fourth lens group G4, the subsequent side lens group GRP2 consists of the fifth lens group G5, and the subsequent group GR consists of the sixth lens group G6.

The zoom optical system ZL according to the present embodiment comprises at least five lens groups, and the distances among the lens groups change upon zooming. Thus, successful aberration correction can be achieved upon zooming. Focusing is performed with the subsequent side lens group GRP2 serving as the focusing lens group, and thus the focusing lens group can be small and light weight. The intermediate group GM includes a vibration-proof lens group movable to have a component in a direction orthogonal to the optical axis to correct image blur. This effectively prevents the performance from being compromised by camera shake correction.

An aperture stop is preferably disposed to an object side or an image side of the intermediate side lens group GRP1. The aperture stop may be disposed between lenses forming the intermediate side lens group GRP1.

The intermediate group GM preferably comprises negative refractive power as a whole from the wide angle end state to the telephoto end state. For example, the intermediate group GM may consist of one lens group having negative refractive power, or may consist of two lens groups each having negative refractive power. For example, the intermediate group GM may consist of two lens groups including, in order from the object, a lens group having positive refractive power and a lens group having negative refractive power, or may consist of two lens groups including, in order from the object, a lens group having negative refractive power and a lens group having positive refractive power.

The subsequent group GR preferably comprises negative or positive refractive power as a whole. For example, the subsequent group GR may consist of one lens group having negative refractive power, or may consist of two lens groups each having negative refractive power.

A plurality of lens groups may be configured to move along the same movement locus upon zooming. Preferably, at least one lens group in the intermediate side lens group GRP1 and at least one lens group in the subsequent group GR are configured to move along the same movement locus. More preferably, at least one lens group in the first lens group G1, at least one lens group in the intermediate side lens group GRP1, and at least one lens group in the subsequent group GR are configured to move along the same movement locus.

The zoom optical system ZL according to the present embodiment having the configuration described above includes the intermediate group GM comprising a partial group satisfying the following conditional expressions.

$$1.4 < fvr/fMt < 2.5 \quad (1)$$

$$0.15 < (-fvr)/ft < 0.35 \quad (2)$$

where,
fvr denotes a focal length of the partial group,
fMt denotes a focal length of the intermediate group GM in the telephoto end state, and
ft denotes a focal length of the zoom optical system ZL in the telephoto end state.

The conditional expression (1) is for setting an appropriate range of a ratio between the focal lengths of the partial group (provided in the intermediate group GM) and the intermediate group GM in the telephoto end state. Variation of various aberrations including the spherical aberration can be prevented upon zooming and various aberrations including decentering coma aberration can be prevented upon blur correction, when the conditional expression (1) is satisfied. The partial group according to the present embodiment includes some of lenses in a lens group in the intermediate group GM or includes all of the lenses in a lens group in the intermediate group GM.

A value higher than the upper limit value of the conditional expression (1) leads to large refractive power of the intermediate group GM, rendering variation of various aberrations including the spherical aberration upon zooming difficult to prevent. The effects of the present embodiment can be more effectively guaranteed with the upper limit value of the conditional expression (1) set to be 2.3. To more effectively guarantee the effects of the present embodiment, the upper limit value of the conditional expression (1) is preferably set to be 2.1.

A value lower than the lower limit value of the conditional expression (1) leads to large refractive power of the partial group, rendering various aberrations including the decentering coma aberration upon blur correction difficult to prevent. The effects of the present embodiment can be more effectively guaranteed with the lower limit value of the conditional expression (1) set to be 1.5. To more effectively guarantee the effects of the present embodiment, the lower limit value of the conditional expression (1) is preferably set to be 1.6.

The conditional expression (2) is for setting an appropriate range of a ratio between the focal lengths of the partial group (provided in the intermediate group GM) and the zoom optical system ZL in the telephoto end state. Various aberrations including the decentering coma aberration can be prevented upon blur correction without using a large barrel, when the conditional expression (2) is satisfied.

A value higher than the upper limit value of the conditional expression (2) leads to small refractive power of the partial group, resulting in a large movement amount of the vibration-proof lens group in a direction orthogonal to the optical axis for blur correction. As a result, a large barrel is required, and various aberrations including the decentering coma aberration becomes difficult to prevent. The effects of the present embodiment can be more effectively guaranteed with the upper limit value of the conditional expression (2) set to be 0.33. To more effectively guarantee the effects of the present embodiment, the upper limit value of the conditional expression (2) is preferably set to be 0.31.

A value lower than the lower limit value of the conditional expression (2) leads to large refractive power of the partial group, rendering various aberrations including the decentering coma aberration upon blur correction difficult to prevent. The effects of the present embodiment can be more effectively guaranteed with the lower limit value of the conditional expression (2) set to be 0.17. To more effectively guarantee the effects of the present embodiment, the lower limit value of the conditional expression (2) is preferably set to be 0.19.

In the zoom optical system according to the present embodiment, the partial group (provided in the intermediate group GM) is preferably a vibration-proof lens group movable to comprise a component in a direction orthogonal to the optical axis to correct image blur. This effectively prevents the performance from being compromised by blur correction.

The zoom optical system according to the present embodiment preferably satisfies the following conditional expression (3).

$$2.9 < f1/(-fMt) < 5.5 \quad (3)$$

where,
f1 denotes a focal length of the first lens group G1.

The conditional expression (3) is for setting an appropriate range of a ratio between the focal lengths of the first lens group G1 and the intermediate group GM in the telephoto end state. Variation of various aberrations including the spherical aberration can be prevented upon zooming when the conditional expression (3) is satisfied.

A value higher than the upper limit value of the conditional expression (3) leads to large refractive power of the intermediate group GM, rendering variation of various aberrations including the spherical aberration upon zooming difficult to prevent. The effects of the present embodiment can be more effectively guaranteed with the upper limit value of the conditional expression (3) set to be 5.2. To more effectively guarantee the effects of the present embodiment, the upper limit value of the conditional expression (3) is preferably set to be 4.9.

A value lower than the lower limit value of the conditional expression (3) leads to large refractive power of the first lens group G1, rendering various aberrations including the spherical aberration upon zooming difficult to correct. The effects of the present embodiment can be more effectively guaranteed with the lower limit value of the conditional expression (3) set to be 3.1. To more effectively guarantee the effects of the present embodiment, the lower limit value of the conditional expression (3) is preferably set to be 3.3.

The zoom optical system according to the present embodiment preferably has a configuration in which the first lens group G1 moves toward the object upon zooming from the wide angle end state to the telephoto end state. With this configuration, a short total length of the lenses in the wide angle end state can be achieved, whereby a small size of the zoom optical system can be achieved.

The zoom optical system according to the present embodiment preferably comprises the subsequent side lens group GRP2 having at least one lens having positive refractive power and at least one lens having negative refractive power. With this configuration, variation of various aberrations including the spherical aberration can be prevented upon focusing.

The zoom optical system according to the present embodiment preferably satisfies the following conditional expression (4).

$$0.2 < fP/(-fN) < 0.8 \tag{4}$$

where, fP denotes a focal length of a lens with largest positive refractive power in the subsequent side lens group GRP2, and fN denotes a focal length of a lens with largest negative refractive power in the subsequent side lens group GRP2.

The conditional expression (4) is for defining an appropriate range of a ratio between the focal lengths of the lens with the largest positive refractive power in the subsequent side lens group GRP2 and the lens with the largest negative refractive power in the subsequent side lens group GRP2. Variation of various aberrations including the spherical aberration can be prevented upon focusing when the conditional expression (4) is satisfied.

A value higher than the upper limit value of the conditional expression (4) leads to large refractive power of the lens with the largest negative refractive power in the subsequent side lens group GRP2, rendering variation of various aberrations including the spherical aberration upon focusing difficult to prevent. The effects of the present embodiment can be more effectively guaranteed with the upper limit value of the conditional expression (4) set to be 0.75. To more effectively guarantee the effects of the present embodiment, the upper limit value of the conditional expression (4) is preferably set to be 0.70.

A value lower than the lower limit value of the conditional expression (4) leads to large refractive power of the lens with the largest positive refractive power in the subsequent side lens group GRP2, rendering variation of various aberrations including the spherical aberration upon focusing difficult to prevent. The effects of the present embodiment can be more effectively guaranteed with the lower limit value of the conditional expression (4) set to be 0.25. To more effectively guarantee the effects of the present embodiment, the lower limit value of the conditional expression (4) is preferably set to be 0.30.

The zoom optical system according to the present embodiment preferably comprises the first lens group G1 including, in order from an object: a 1-1st lens having positive refractive power; a 1-2nd lens having negative refractive power; and a 1-3rd lens having positive refractive power. With this configuration, the spherical aberration and the chromatic aberration can be successfully corrected.

The zoom optical system according to the present embodiment preferably satisfies the following conditional expression (5).

$$0.85 < nP/nN < 1.00 \tag{5}$$

where, nP denotes a refractive index of a lens with largest positive refractive power in the first lens group G1, and nN denotes a refractive index of a lens with largest negative refractive power in the first lens group G1.

The conditional expression (5) is for defining an appropriate range of a ratio between the refractive indices of the lens with the largest positive refractive power in the first lens group G1 and the lens with the largest negative refractive power in the first lens group G1. Various aberrations including the spherical aberration can be successfully corrected when the conditional expression (5) is satisfied.

A value higher than the upper limit value of the conditional expression (5) leads to a small refractive index of the lens with the largest negative refractive power in the first lens group G1, rendering various aberrations including the spherical aberration difficult to correct. The effects of the present embodiment can be more effectively guaranteed with the upper limit value of the conditional expression (5) set to be 0.98. To more effectively guarantee the effects of the present embodiment, the upper limit value of the conditional expression (5) is preferably set to be 0.96.

A value lower than the lower limit value of the conditional expression (5) leads to a small refractive index of the lens with the largest positive refractive power in the first lens group G1, leading to extremely large spherical aberration that is difficult to correct. The effects of the present embodiment can be more effectively guaranteed with the lower limit value of the conditional expression (5) set to be 0.86. To more effectively guarantee the effects of the present embodiment, the lower limit value of the conditional expression (5) is preferably set to be 0.87.

The zoom optical system according to the present embodiment preferably satisfies the following conditional expression (6).

$$2.25 < vP/vN < 2.90 \tag{6}$$

where, vP denotes an Abbe number of the lens with the largest positive refractive power in the first lens group G1, and vN denotes an Abbe number of the lens with the largest negative refractive power in the first lens group G1.

The conditional expression (6) is for defining an appropriate range of a ratio between the Abbe numbers of the lens with the largest positive refractive power in the first lens group G1 and the lens with the largest negative refractive power in the first lens group G1. The chromatic aberration can be successfully corrected when the conditional expression (6) is satisfied.

A value higher than the upper limit value of the conditional expression (6) leads to a small Abbe number of the lens with the largest negative refractive power in the first lens group G1, resulting in an extremely large chromatic aberration that is difficult to correct. The effects of the present embodiment can be more effectively guaranteed with the upper limit value of the conditional expression (6) set to be 2.85. To more effectively guarantee the effects of the present embodiment, the upper limit value of the conditional expression (6) is preferably set to be 2.80.

A value lower than the lower limit value of the conditional expression (6) leads to a small Abbe number of the lens with the largest positive refractive power in the first lens group G1, leading to extremely large chromatic aberration that is difficult to correct. The effects of the present embodiment can be more effectively guaranteed with the lower limit value of the conditional expression (6) set to be 2.30. To more effectively guarantee the effects of the present embodiment, the lower limit value of the conditional expression (6) is preferably set to be 2.35.

Figure 31:
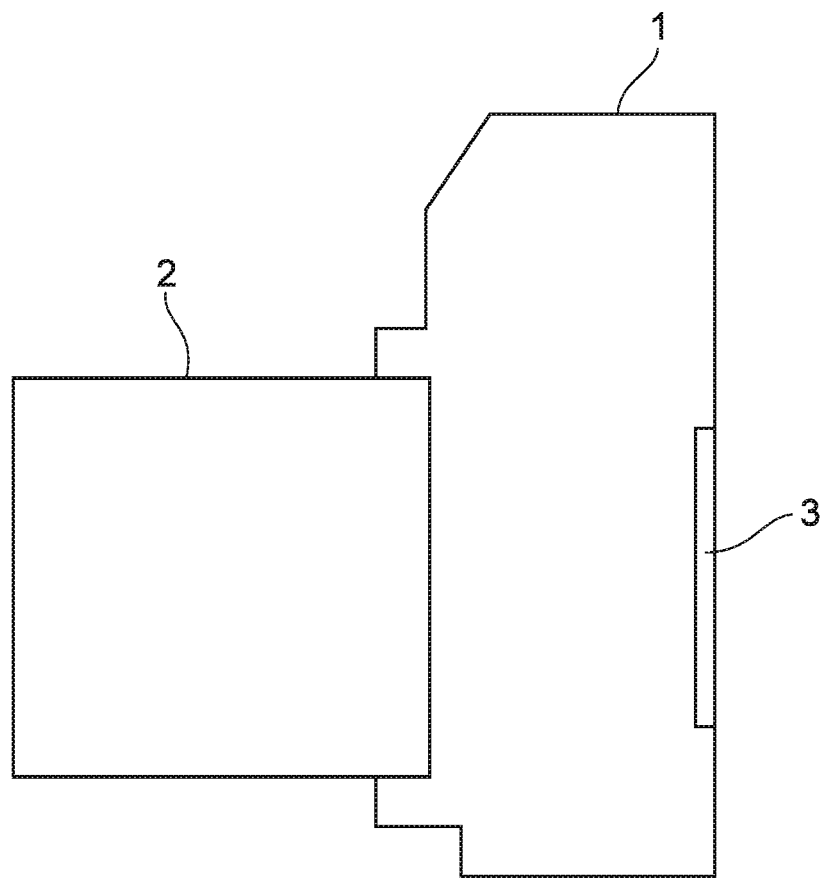
FIG. 31 is a diagram illustrating a configuration of a camera comprising the zoom optical system according to the present embodiment.

The optical apparatus according to the present embodiment comprises the zoom optical system with the configuration described above. A camera (optical apparatus) including the zoom optical system ZL is described, as a specific example, with reference to FIG. 31. This camera 1 is a digital camera including the zoom optical system according to the present embodiment serving as an imaging lens 2 as illustrated in FIG. 31. In the camera 1, the imaging lens 2 collects light from an object (subject) (not illustrated), and then the light reaches an image sensor 3. Thus, an image based on the light from the subject is formed with the image sensor 3 to be stored as a subject image in a memory (not illustrated). In this manner, the photographer can capture an image of the subject with the camera 1. The camera may be a mirrorless camera, or may be a single lens reflex camera having a quick return mirror.

With the configuration described above, the camera 1 comprising the zoom optical system ZL serving as the imaging lens 2 can have the subsequent side lens group GRP2 serving as the focusing lens group that is small and light weight, and thus quick and quiet AF (autofocus) can be achieved without using a large barrel. Furthermore, with this configuration, variation of aberrations upon zooming from the wide angle end state to the telephoto end state, as well as variation of aberrations upon focusing on a short distant object from an infinite distant object can be successfully prevented, whereby excellent optical performance can be achieved.

Figure 32:
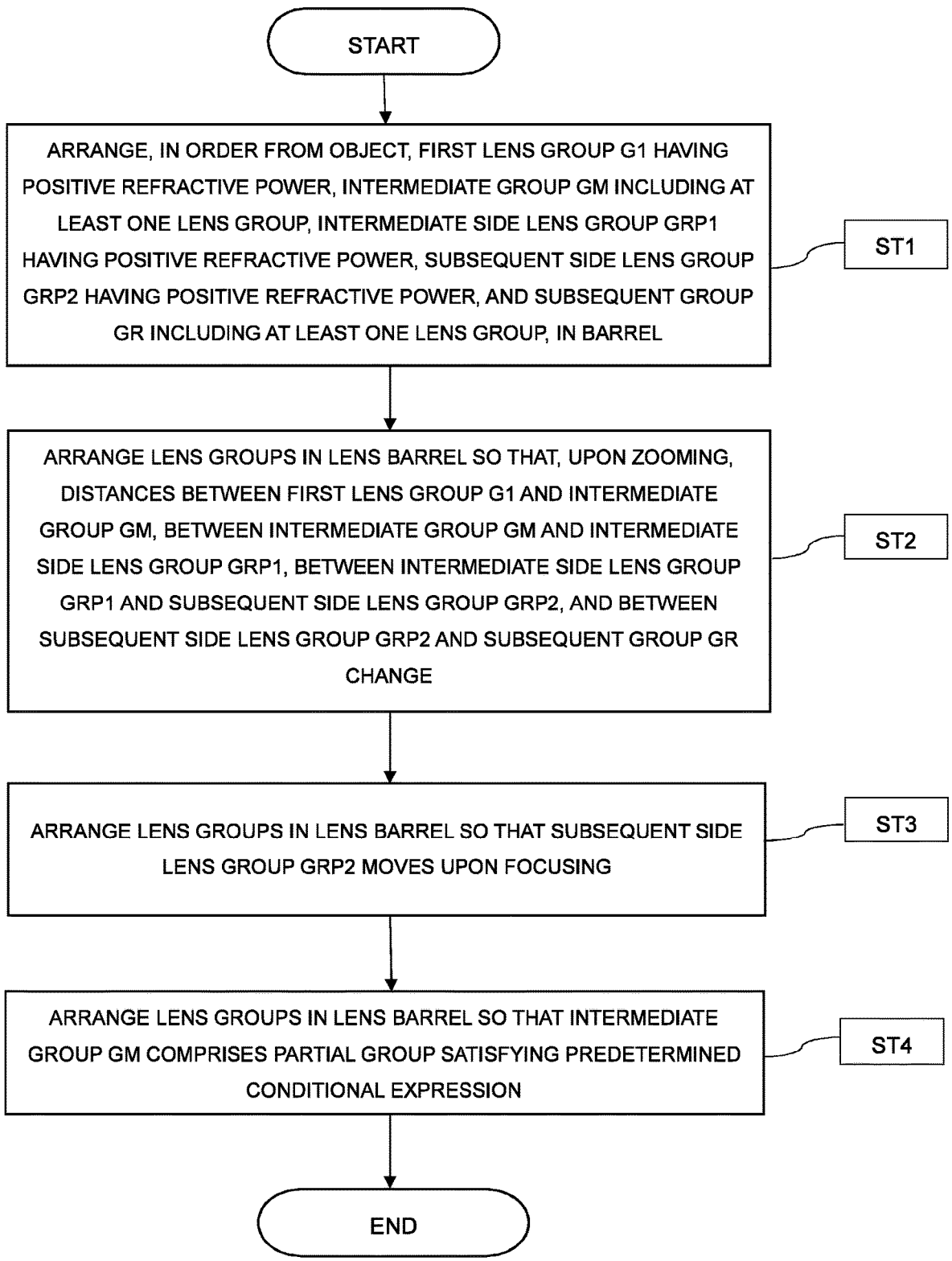
FIG. 32 is a flowchart illustrating a method for manufacturing the zoom optical system according to the present embodiment.

Next, a method for manufacturing the zoom optical system ZL described above is described with reference to FIG. 32. First of all, in order from the object, the first lens group G1 having positive refractive power, the intermediate group GM including at least one lens group and having negative refractive power, the intermediate side lens group GRP1 having positive refractive power, the subsequent side lens group GRP2 having positive refractive power, and the subsequent group GR including at least one lens group are arranged in a barrel (step ST1). The lens groups are arranged in the lens barrel so that, upon zooming, the distances between the first lens group G1 and the intermediate group GM, between the intermediate group GM and the intermediate side lens group GRP1, between the intermediate side lens group GRP1 and the subsequent side lens group GRP2, and between the subsequent side lens group GRP2 and the subsequent group GR change (step ST2). The lens groups are arranged in the lens barrel so that the subsequent side lens group GRP2 moves upon focusing (step ST3). The lens groups are arranged in the lens barrel so that the intermediate group GM comprises the partial group satisfying at least the conditional expressions (1) and (2) described above (step ST4).

EXAMPLES

Zoom optical systems (zoom lenses) ZL according to Examples of the present embodiment are described below with reference to the drawings. FIG. 1, FIG. 6, FIG. 11, FIG. 16, FIG. 21, and FIG. 26 are cross-sectional views illustrating configurations and refractive power distributions of the zoom optical systems ZL {ZL(1) to ZL(6)} according to Examples 1 to 6. In the lower portion of each cross-sectional view of the zoom optical systems ZL(1) to ZL(6), the directions in which the lens groups are moved along the optical axis upon zooming from the wide angle end state (W) to the telephoto end state (T) are shown by arrows. A direction in which the subsequent side lens group GRP2 serving as the focusing lens group moves upon focusing on a short distant object from infinity is shown by an arrow appended with "focusing".

In FIGS. 1, 6, 11, 16, 21, and 26, a combination of a sign G and a number represents each lens group, and a combination of a sign L and a number represents each lens. In each Example, lens groups and the like are each denoted with a combination of the reference sign and numeral independently from other Examples to prevent cumbersomeness due to an excessively wide variety or a large number of signs and numerals. Thus, components in different Examples denoted with the same combination of reference sign and numeral does not necessarily have the same configuration.

Tables 1 to 6 include Table 1 that is a specification table of Example 1, Table 2 that is a specification table of Example 2, Table 3 that is a specification table of Example 3, Table 4 that is a specification table of Example 4, Table 5 that is a specification table of Example 5, and Table 6 that is a specification table of Example 6. In Examples, d-line (wavelength λ=587.6 nm) and g-line (wavelength λ=435.8 nm) are selected as calculation targets of the aberration characteristics.

In Table [Lens specifications], a surface number represents an order of an optical surface from the object side in a traveling direction of a light beam, R represents a radius of curvature of each optical surface (with a surface having the center of curvature position on the image side provided with a positive value), D represents a distance between each optical surface and the next optical surface (or the image surface) on the optical axis, nd represents a refractive index of a material of an optical member with respect to the d-line, and vd represents an Abbe number of the material of the optical member based on the d-line. In the table, object surface represents an object surface, "∞" of the radius of curvature represents a plane or an aperture, (stop S) represents the aperture stop S, and image surface represents an image surface I. The refractive index nd=1.00000 of air is omitted.

Specifically, in Table [Various data], f represents a focal length of the whole zoom lens, FNO represents F number, 2ω represents an angle of view (ω represents a half angle of view (unit: °)), and Ymax represents the maximum image height. TL represents a distance obtained by adding BF to a distance between the lens forefront surface and a lens last surface on the optical axis upon focusing on infinity, and BF (back focus) represents a distance between the lens last surface and the image surface I on the optical axis upon focusing on infinity. These values are provided for each of the zooming states including the wide angle end state (W), the intermediate focal length state (M), and the telephoto end state (T).

Table [Variable distance data] includes surface distances corresponding to surfaces corresponding to surface numbers appended with "variable" in Table [Lens specifications] and the next surface. The surface distances are provided for each of the zooming states including the wide angle end state (W), the intermediate focal length state (M), and the telephoto end state (T) upon focusing on infinity and upon focusing on a short distant object.

Table [Lens group data] includes the group starting surface (surface closest to the object) and the focal length of each of the first to the fifth (or sixth) lens groups.

Table [Conditional expression corresponding value] includes values corresponding to the conditional expressions (1) to (6).

The focal length f, the radius of curvature R, the surface distance D and the other units of length described below as all the specification values, which are generally described with "mm" unless otherwise noted should not be construed in a limiting sense because the optical system proportionally expanded or reduced can have a similar or the same optical performance.

The description on the tables de scribed above commonly applies to all Examples, and thus will not be redundantly given below.

Example 1

Example 1 is described with reference to FIG. 1, FIGS. 2A and 2B, FIG. 3, FIGS. 4A and 4B, and FIGS. 5A-5C and Table 1. FIG. 1 is a diagram illustrating a lens configuration of a zoom optical system according to Example 1 of the present embodiment. The zoom optical system ZL(1) according to Example 1 consists of, in order from an object: a first lens group G1 having positive refractive power; a second lens group G2 having negative refractive power; a third lens group G3 having positive refractive power; an aperture stop S; a fourth lens group G4 having positive refractive power; and a fifth lens group G5 having negative refractive power. The first to the fifth lens groups G1 to G5 each move in a direction indicated by an arrow in FIG. 1 upon zooming from a wide angle end state (W) to a telephoto end state (T). In this Example, the intermediate group GM includes the second lens group G2, the intermediate side lens group GRP1 includes the third lens group G3 and the aperture stop S, the subsequent side lens group GRP2 includes the fourth lens group G4, and the subsequent group GR includes the fifth lens group G5. A sign (+) or (−) provided to a sign of each lens group represents refractive power of the lens group. The same applies to all of Examples described below.

The first lens group G1 consists of, in order from the object, a positive lens (1-1st lens) L11 having a biconvex shape and a cemented positive lens consisting of a negative meniscus lens (1-2nd lens) L12 having a convex surface facing the object and a positive meniscus lens (1-3rd lens) L13 having a convex surface facing the object.

The second lens group G2 consists of, in order from the object, a negative meniscus lens L21 having a convex surface facing the object, a positive meniscus lens L22 having a convex surface facing the object, and a cemented negative lens consisting of a negative lens L23 having a biconcave shape and a positive meniscus lens L24 having a convex surface facing the object.

The third lens group G3 consists of, in order from the object, a positive lens L31 having a biconvex shape and a cemented positive lens consisting of a positive lens L32 having a biconvex shape and a negative lens L33 having a biconcave shape. The aperture stop S is disposed in the neighborhood of and to the image side of the third lens group G3, and integrally moves with the third lens group G3 upon zooming.

The fourth lens group G4 consists of a cemented positive lens consisting of a positive lens L41 having a biconvex shape and a negative meniscus lens L42 having a concave surface facing the object.

The fifth lens group G5 consists of, in order from the object, a negative lens L51 having a biconcave shape, a positive meniscus lens L52 having a concave surface facing the object, a negative meniscus lens L53 having a concave surface facing the object, and a positive lens L54 having a biconvex shape. An image surface I is disposed to the image side of the fifth lens group G5.

In the zoom optical system ZL(1) according to Example 1, the fourth lens group G4 (subsequent side lens group GRP2) moves toward the object upon focusing from a long distant object to a short distant object. In the zoom optical system ZL(1) according to Example 1, the cemented negative lens consisting of the negative lens L23 and the positive meniscus lens L24 in the second lens group G2 serves as a vibration-proof lens group (partial group), movable in a direction orthogonal to the optical axis, to be in charge of correcting displacement of the imaging position due to camera shake or the like (image blur on the image surface I).

To correct roll blur of an angle θ with a focal length of the whole system being f and with a lens having a vibration proof coefficient K (the ratio of the image movement amount on the imaging surface to the movement amount of the moving lens group for camera shake correction), a moving lens group for camera shake correction is moved in the direction orthogonal to the optical axis by (f·tan θ)/K. In the wide angle end state in Example 1, the vibration proof coefficient is 0.97 and the focal length is 72.1 ram, and thus the movement amount of the vibration-proof lens group to correct a roll blur of 0.30° is 0.39 mm. In the telephoto end state in Example 1, the vibration proof coefficient is 2.01 and the focal length is 292.0 mm, and thus the movement amount of the vibration-proof lens group to correct a roll blur of 0.20° is 0.51 mm.

Table 1 below lists specification values of the optical system according to Example 1.

TABLE 1

[Lens specifications]

| Surface number | R | D | nd | νd |
|---|---|---|---|---|
| Object surface | ∞ | | | |
| 1 | 443.9646 | 3.817 | 1.48749 | 70.31 |
| 2 | −469.6963 | 0.200 | | |
| 3 | 100.9381 | 1.700 | 1.67270 | 32.19 |
| 4 | 64.8256 | 8.767 | 1.49700 | 81.73 |

TABLE 1-continued

| | | | | |
|---|---|---|---|---|
| 5 | 2578.1121 | Variable | | |
| 6 | 189.1236 | 1.000 | 1.77250 | 49.62 |
| 7 | 35.4799 | 7.123 | | |
| 8 | 37.2041 | 2.691 | 1.80518 | 25.45 |
| 9 | 57.9432 | 4.513 | | |
| 10 | −64.2854 | 1.000 | 1.67003 | 47.14 |
| 11 | 37.2626 | 3.500 | 1.75520 | 27.57 |
| 12 | 146.7584 | Variable | | |
| 13 | 107.2202 | 3.817 | 1.80610 | 40.97 |
| 14 | −71.1994 | 0.200 | | |
| 15 | 41.9753 | 5.272 | 1.49700 | 81.73 |
| 16 | −54.1569 | 1.000 | 1.85026 | 32.35 |
| 17 | 154.3187 | 1.508 | | |
| 18 | ∞ | Variable | | (Aperture stop S) |
| 19 | 104.1819 | 4.528 | 1.51680 | 63.88 |
| 20 | −28.6539 | 1.000 | 1.80100 | 34.92 |
| 21 | −53.7161 | Variable | | |
| 22 | −120.9949 | 1.000 | 1.90366 | 31.27 |
| 23 | 61.5584 | 10.276 | | |
| 24 | −319.9239 | 4.049 | 1.68893 | 31.16 |
| 25 | −33.0322 | 16.448 | | |
| 26 | −24.1471 | 1.000 | 1.77250 | 49.62 |
| 27 | −213.3380 | 0.200 | | |
| 28 | 79.7473 | 3.205 | 1.71736 | 29.57 |
| 29 | −323.3417 | BF | | |
| Image surface | ∞ | | | |

[Various data]
Zooming rate 4.05

| | W | M | T |
|---|---|---|---|
| f | 72.1 | 99.9 | 292.0 |
| FNO | 4.54 | 4.73 | 5.88 |
| 2ω | 33.60 | 23.92 | 8.26 |
| Ymax | 21.60 | 21.60 | 21.60 |
| TL | 193.31 | 211.69 | 248.31 |
| BF | 38.31 | 41.11 | 61.31 |

[Various distance data]

| | W Infinity | M Infinity | T Infinity | W Short distant | M Short distant | T Short distant |
|---|---|---|---|---|---|---|
| d5 | 2.000 | 26.394 | 73.625 | 2.000 | 26.394 | 73.625 |
| d12 | 41.625 | 32.810 | 2.000 | 41.625 | 32.810 | 2.000 |
| d18 | 21.563 | 20.201 | 21.407 | 20.665 | 19.062 | 19.151 |
| d21 | 2.000 | 3.362 | 2.156 | 2.899 | 4.501 | 4.413 |

[Lens group data]

| Group | Starting surface | Focal length |
|---|---|---|
| G1 | 1 | 169.064 |
| G2 | 6 | −41.090 |
| G3 | 13 | 50.436 |
| G4 | 19 | 100.808 |
| G5 | 22 | −52.611 |

[Conditional expression corresponding value]

| | |
|---|---|
| Conditional expression | (1) fvr/fMt = 1.818 |
| Conditional expression | (2) (−fvr)/ft = 0.256 |
| Conditional expression | (3) f1/(−fMt) = 4.114 |
| Conditional expression | (4) fP/(−fN) = 0.564 |
| Conditional expression | (5) nP/nN = 0.895 |
| Conditional expression | (6) vP/vN = 2.539 |

Figure 2B:
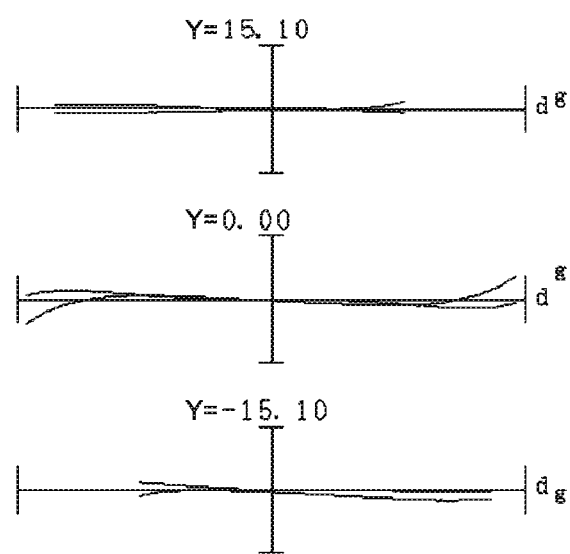
FIG. 2B is a meridional lateral aberration graph in a case where blur correction is performed for the roll blur of 0.30°.
Figure 3:
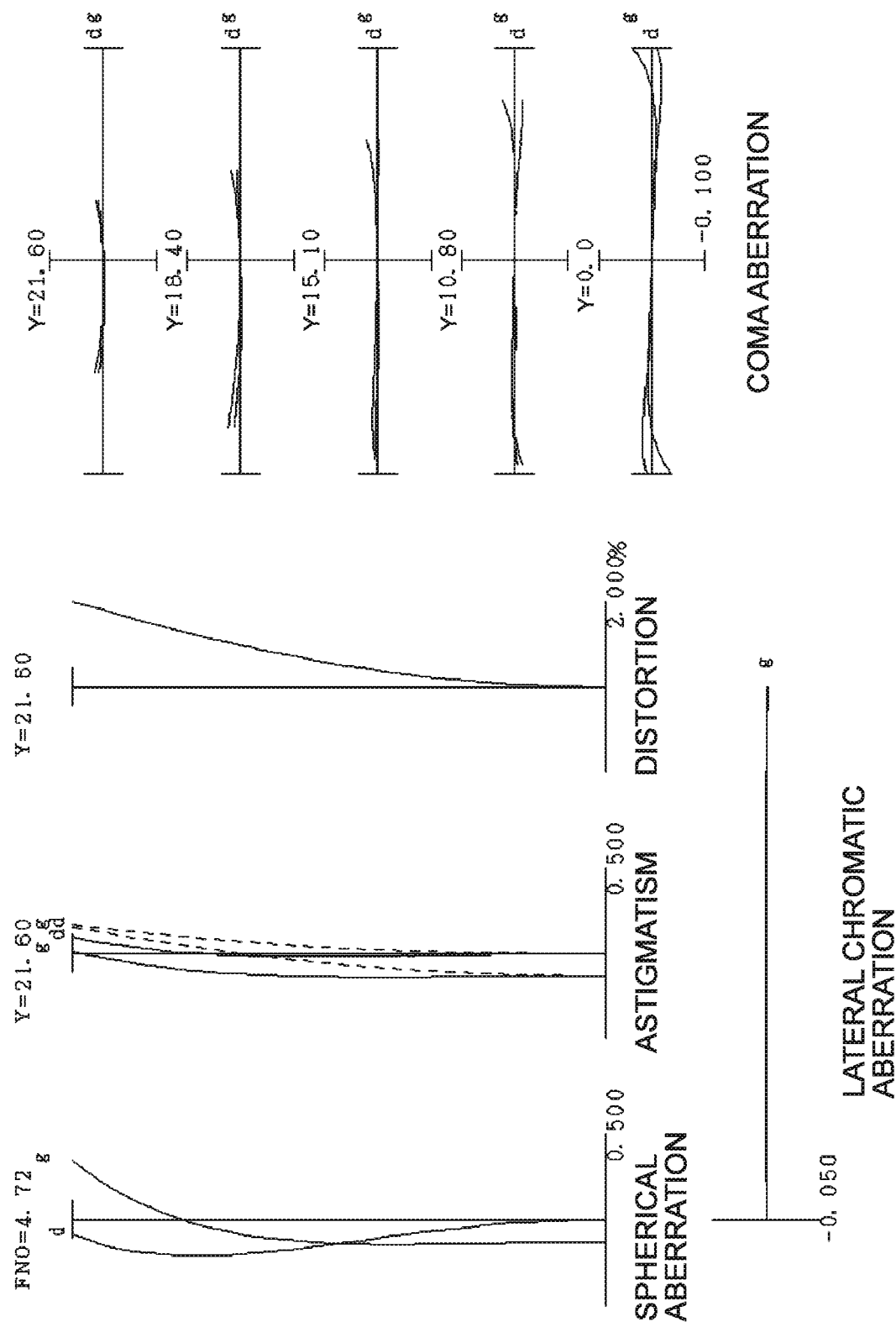
FIG. 3 is a graph showing various aberrations of the zoom optical system according to Example 1 upon focusing on infinity in an intermediate focal length state.
Figure 4B:
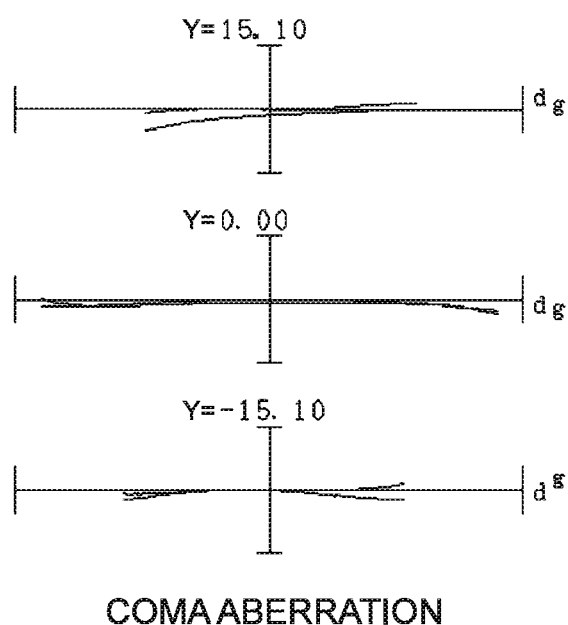
FIG. 4B is a meridional lateral aberration graph in a case where blur correction is performed for the roll blur of 0.20°.

FIG. 2A is a graph showing various aberrations of the zoom optical system according to Example 1 having a vibration-proof function upon focusing on infinity in the wide angle end state, and FIG. 2B is a meridional lateral aberration graph in a case where blur correction is performed for the roll blur of 0.30°. FIG. 3 is a graph showing various aberrations of the zoom optical system according to Example 1 having the vibration proof function upon focusing on infinity in the intermediate focal length state. FIG. 4A is a graph showing various aberrations of the zoom optical system according to Example 1 having a vibration-proof function upon focusing on infinity in the telephoto end state, and FIG. 4B is a meridional lateral aberration graph in a case where blur correction is performed for the roll blur of 0.20°. FIGS. 5A, 5B, and 5C are graphs showing various aberrations of the zoom optical system according to Example 1 upon focusing on a short distant object, respectively in the wide angle end state, the intermediate focal length state, and the telephoto end state.

In the aberration graphs in FIGS. 2A and 2B, FIG. 3, FIGS. 4A and 4B, and FIGS. 5A-5C, FNO denotes an F number, NA denotes the number of apertures, and Y denotes an image height. The spherical aberration graphs illustrate an F number or the number of apertures corresponding to the maximum aperture, astigmatism graphs and distortion graphs illustrate the maximum image height, and coma aberration graphs illustrate values of image heights. d denotes a d line (wavelength λ=587.6 nm) and g denotes a g line (wavelength λ=435.8 nm). In the astigmatism graphs, a solid line represents a sagittal image surface, and a broken line represents a meridional image surface. In aberration graphs in Examples described below, the same reference signs as in this Example are used, and a redundant description is omitted.

It can be seen in these aberration graphs that the zoom optical system according to Example 1 can achieve excellent imaging performance with various aberrations successfully corrected from the wide angle end state to the telephoto end state, and can achieve excellent imaging performance upon focusing on a short distant object.

Example 2

Example 2 is described with reference to FIG. 6, FIGS. 7A and 7B, FIG. 8, FIGS. 9A and 9B, and FIGS. 10A-10C and Table 2. FIG. 6 is a diagram illustrating a lens configuration of a zoom optical system according to Example 2 of the present embodiment. The zoom optical system ZL(2) according to Example 2 consists of, in order from an object: a first lens group G1 having positive refractive power; a second lens group G2 having negative refractive power; a third lens group G3 having positive refractive power; an aperture stop S; a fourth lens group G4 having positive refractive power; and a fifth lens group G5 having negative refractive power. The first to the fifth lens groups G1 to G5 each move in a direction indicated by an arrow in FIG. 6 upon zooming from a wide angle end state (W) to a telephoto end state (T). In this Example, the intermediate group GM includes the second lens group G2, the intermediate side lens group GRP1 includes the third lens group G3 and the aperture stop S, the subsequent side lens group GRP2 includes the fourth lens group G4, and the subsequent group GR includes the fifth lens group G5.

The first lens group G1 consists of, in order from the object, a positive lens (1-1st lens) L11 having a biconvex shape and a cemented positive lens consisting of a negative meniscus lens (1-2nd lens) L12 having a convex surface facing the object and a positive meniscus lens (1-3rd lens) L13 having a convex surface facing the object.

The second lens group G2 consists of, in order from the object, a negative meniscus lens L21 having a convex surface facing the object, a negative meniscus lens L22 having a concave surface facing the object, a positive meniscus lens L23 having a convex surface facing the object, and a cemented negative lens consisting of a negative lens L24 having a biconcave shape and a positive meniscus lens L25 having a convex surface facing the object.

The third lens group G3 consists of, in order from the object, a positive lens L31 having a biconvex shape and a cemented positive lens consisting of a positive lens L32 having a biconvex shape and a negative lens L33 having a biconcave shape. The aperture stop S is disposed in the neighborhood of and to the image side of the third lens group G3, and integrally moves with the third lens group G3 upon zooming.

The fourth lens group G4 consists of a cemented positive lens consisting of a positive lens L41 having a biconvex shape and a negative meniscus lens L42 having a concave surface facing the object.

The fifth lens group G5 consists of, in order from the object, a negative lens L51 having a biconcave shape, a positive lens L52 having a biconvex shape, a negative meniscus lens L53 having a concave surface facing the object, and a positive lens L54 having a biconvex shape. An image surface I is disposed to the image side of the fifth lens group G5.

In the zoom optical system ZL(2) according to Example 2, the fourth lens group G4 (subsequent side lens group GRP2) moves toward the object upon focusing from a long distant object to a short distant object. In the zoom optical system ZL(2) according to Example 2, the cemented negative lens consisting of the negative lens L24 and the positive meniscus lens L25 in the second lens group G2 serves as a vibration-proof lens group (partial group), movable in a direction orthogonal to the optical axis, to be in charge of correcting displacement of the imaging position due to camera shake or the like (image blur on the image surface I).

To correct roll blur of an angle θ with a focal length of the whole system being f and with a lens having a vibration proof coefficient K (the ratio of the image movement amount on the imaging surface to the movement amount of the moving lens group for camera shake correction), a moving lens group for camera shake correction is moved in the direction orthogonal to the optical axis by (f·tan θ)/K. In the wide angle end state in Example 2, the vibration proof coefficient is 0.97 and the focal length is 72.1 ram, and thus the movement amount of the vibration-proof lens group to correct a roll blur of 0.30° is 0.39 mm. In the telephoto end state in Example 2, the vibration proof coefficient is 2.03 and the focal length is 292.0 mm, and thus the movement amount of the vibration-proof lens group to correct a roll blur of 0.20° is 0.50 mm.

Table 2 below lists specification values of the optical system according to Example 2.

TABLE 2

[Lens specifications]

| Surface number | R | D | nd | vd |
|---|---|---|---|---|
| Object surface | ∞ | | | |
| 1 | 524.3080 | 3.649 | 1.48749 | 70.31 |
| 2 | −473.1509 | 0.200 | | |
| 3 | 99.8647 | 1.700 | 1.67270 | 32.19 |
| 4 | 65.5021 | 8.680 | 1.49700 | 81.73 |
| 5 | 1712.5853 | Variable | | |
| 6 | 93.5170 | 1.000 | 1.83400 | 37.18 |
| 7 | 34.3474 | 6.920 | | |
| 8 | −111.6255 | 1.000 | 1.60300 | 65.44 |
| 9 | −404.2382 | 0.200 | | |

TABLE 2-continued

| | | | | |
|---|---|---|---|---|
| 10 | 45.6203 | 2.882 | 1.84666 | 23.80 |
| 11 | 103.2990 | 3.776 | | |
| 12 | −66.2945 | 1.000 | 1.70000 | 48.11 |
| 13 | 38.4320 | 3.453 | 1.79504 | 28.69 |
| 14 | 151.5709 | Variable | | |
| 15 | 101.1563 | 3.699 | 1.80400 | 46.60 |
| 16 | −81.9293 | 0.200 | | |
| 17 | 39.5595 | 5.119 | 1.49700 | 81.73 |
| 18 | −67.2517 | 1.000 | 1.85026 | 32.35 |
| 19 | 148.7139 | 1.531 | | |
| 20 | ∞ | Variable | | (Aperture stop S) |
| 21 | 99.6360 | 4.438 | 1.51680 | 63.88 |
| 22 | −28.3755 | 1.000 | 1.80610 | 40.97 |
| 23 | −55.9883 | Variable | | |
| 24 | −69.2441 | 1.000 | 1.90366 | 31.27 |
| 25 | 64.7455 | 7.965 | | |
| 26 | 1599.2908 | 4.469 | 1.67270 | 32.19 |
| 27 | −30.6814 | 16.326 | | |
| 28 | −23.5416 | 1.000 | 1.80400 | 46.60 |
| 29 | −175.4914 | 0.343 | | |
| 30 | 82.8193 | 3.436 | 1.67270 | 32.19 |
| 31 | −167.6215 | BF | | |
| Image surface | ∞ | | | |

[Various data]
Zooming rate 4.05

| | W | M | T |
|---|---|---|---|
| f | 72.1 | 100.0 | 292.0 |
| FNO | 4.54 | 4.76 | 5.88 |
| 2ω | 33.58 | 23.98 | 8.28 |
| Ymax | 21.60 | 21.60 | 21.60 |
| TL | 193.32 | 210.95 | 248.32 |
| BF | 38.32 | 41.61 | 61.32 |

[Various distance data]

| | W Infinity | M Infinity | T Infinity | W Short distant | M Short distant | T Short distant |
|---|---|---|---|---|---|---|
| d5 | 2.000 | 25.989 | 75.552 | 2.000 | 25.989 | 75.552 |
| d14 | 43.552 | 33.897 | 2.000 | 43.552 | 33.897 | 2.000 |
| d20 | 21.465 | 19.956 | 21.465 | 20.527 | 18.788 | 19.123 |
| d23 | 2.000 | 3.509 | 2.000 | 2.938 | 4.677 | 4.341 |

[Lens group data]

| Group | Starting surface | Focal length |
|---|---|---|
| G1 | 1 | 173.986 |
| G2 | 6 | −42.714 |
| G3 | 15 | 49.108 |
| G4 | 21 | 106.792 |
| G5 | 24 | −51.186 |

[Conditional expression corresponding value]

| | |
|---|---|
| Conditional expression | (1) fvr/fMt = 1.743 |
| Conditional expression | (2) (−fvr)/ft = 0.255 |
| Conditional expression | (3) f1/(−fMt) = 4.073 |
| Conditional expression | (4) fP/(−fN) = 0.596 |
| Conditional expression | (5) nP/nN = 0.895 |
| Conditional expression | (6) vP/vN = 2.539 |

Figure 7A:
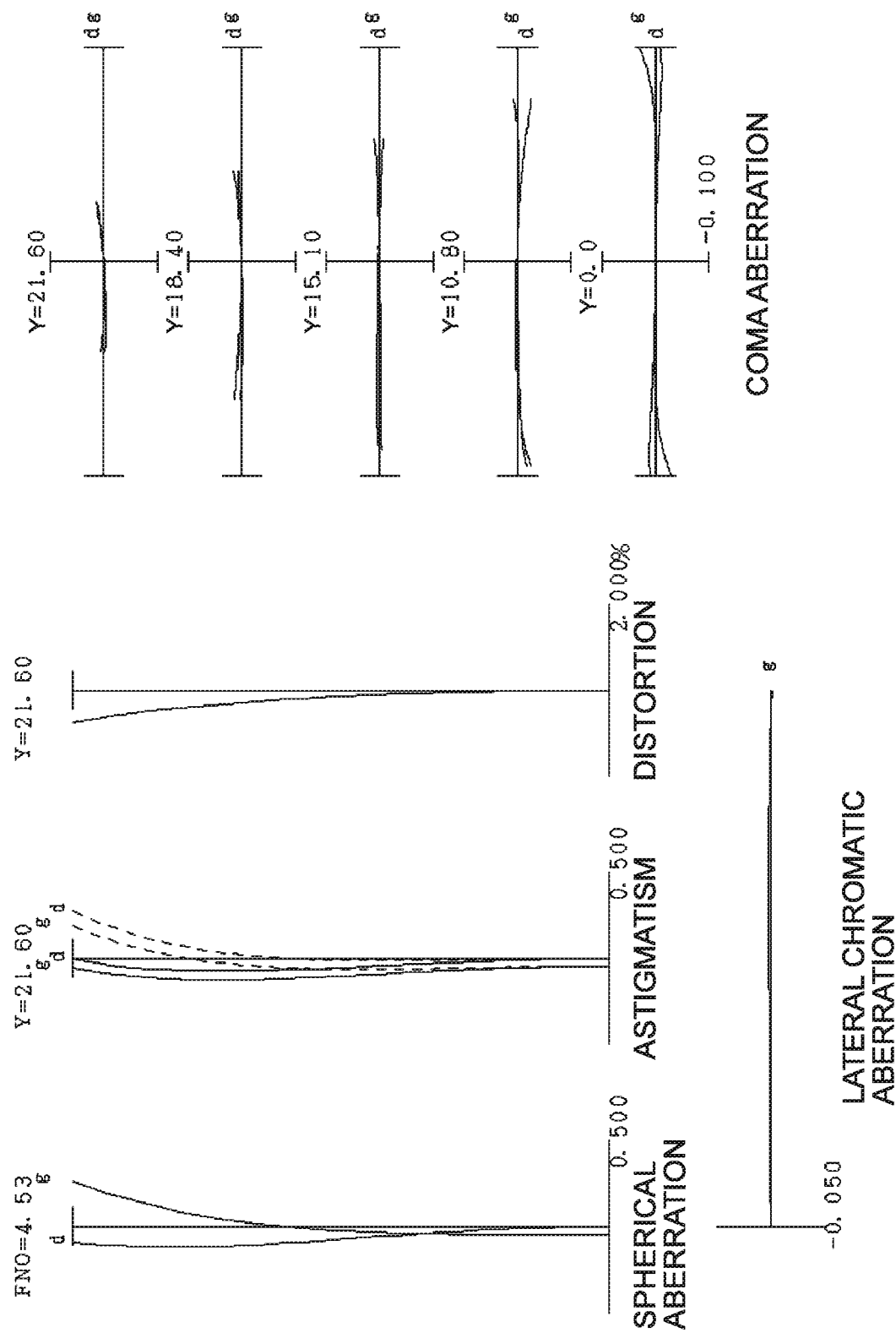
FIG. 7A is a graph showing various aberrations of the zoom optical system according to Example 2 upon focusing on infinity in the wide angle end state.
Figure 7B:
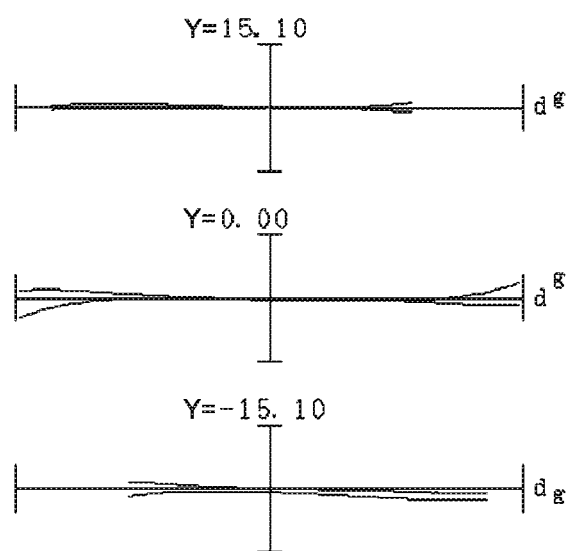
FIG. 7B is a meridional lateral aberration graph in a case where blur correction is performed for the roll blur of 0.30°.
Figure 8:
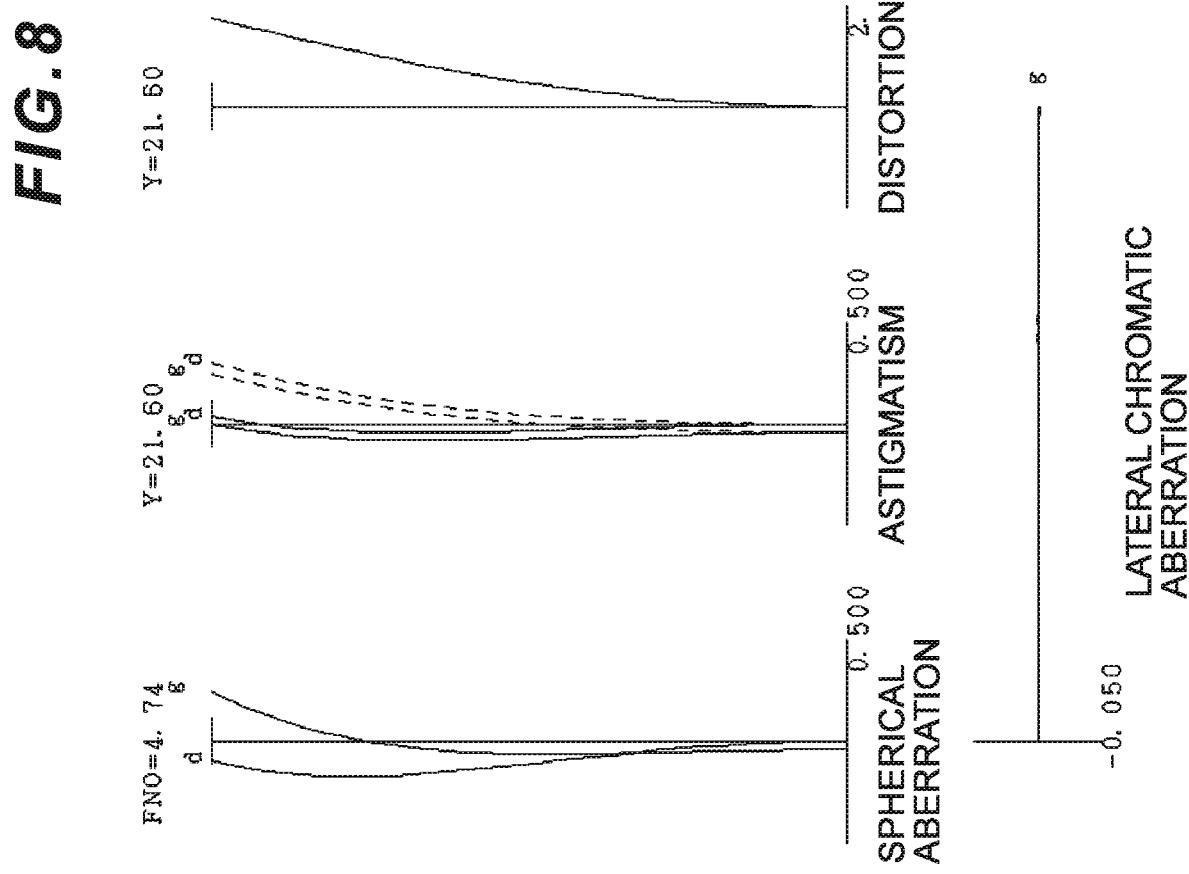
FIG. 8 is a graph showing various aberrations of the zoom optical system according to Example 2 upon focusing on infinity in the intermediate focal length state.
Figure 9B:
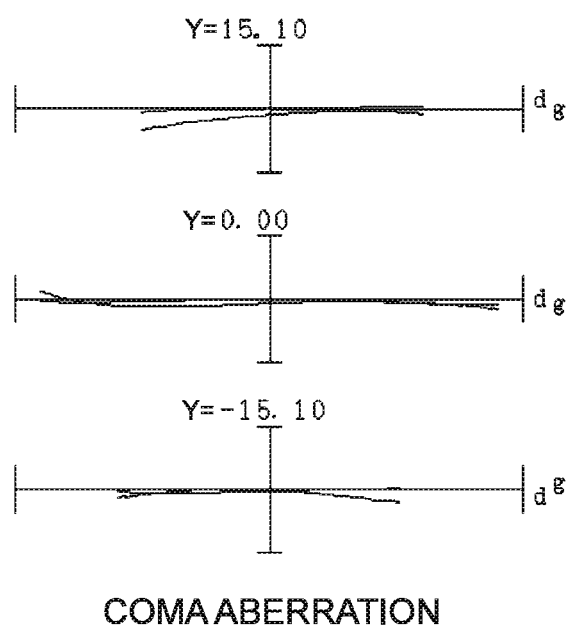
FIG. 9B is a meridional lateral aberration graph in a case where blur correction is performed for the roll blur of 0.20°.
Figure 10A:
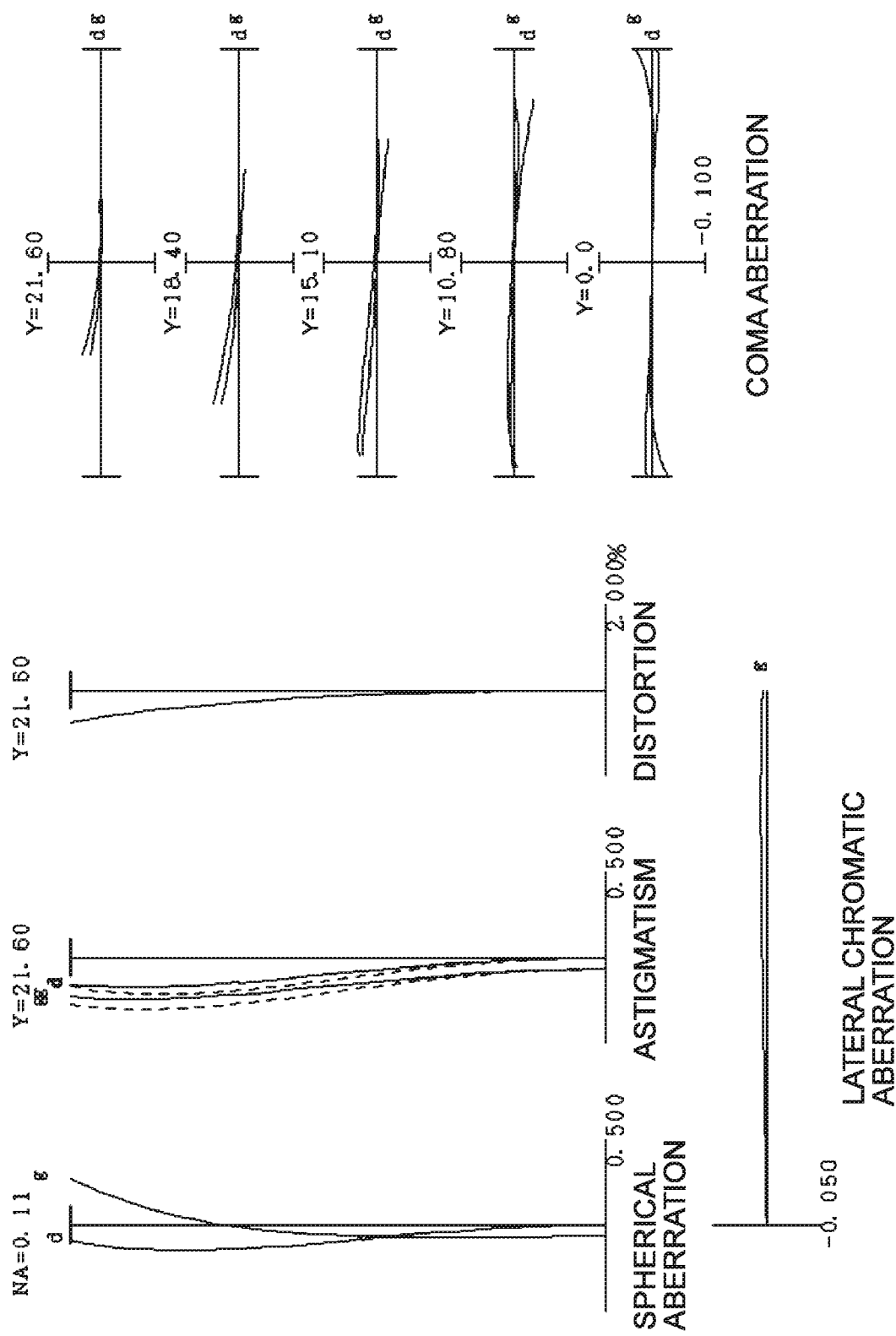
Figure 10B:
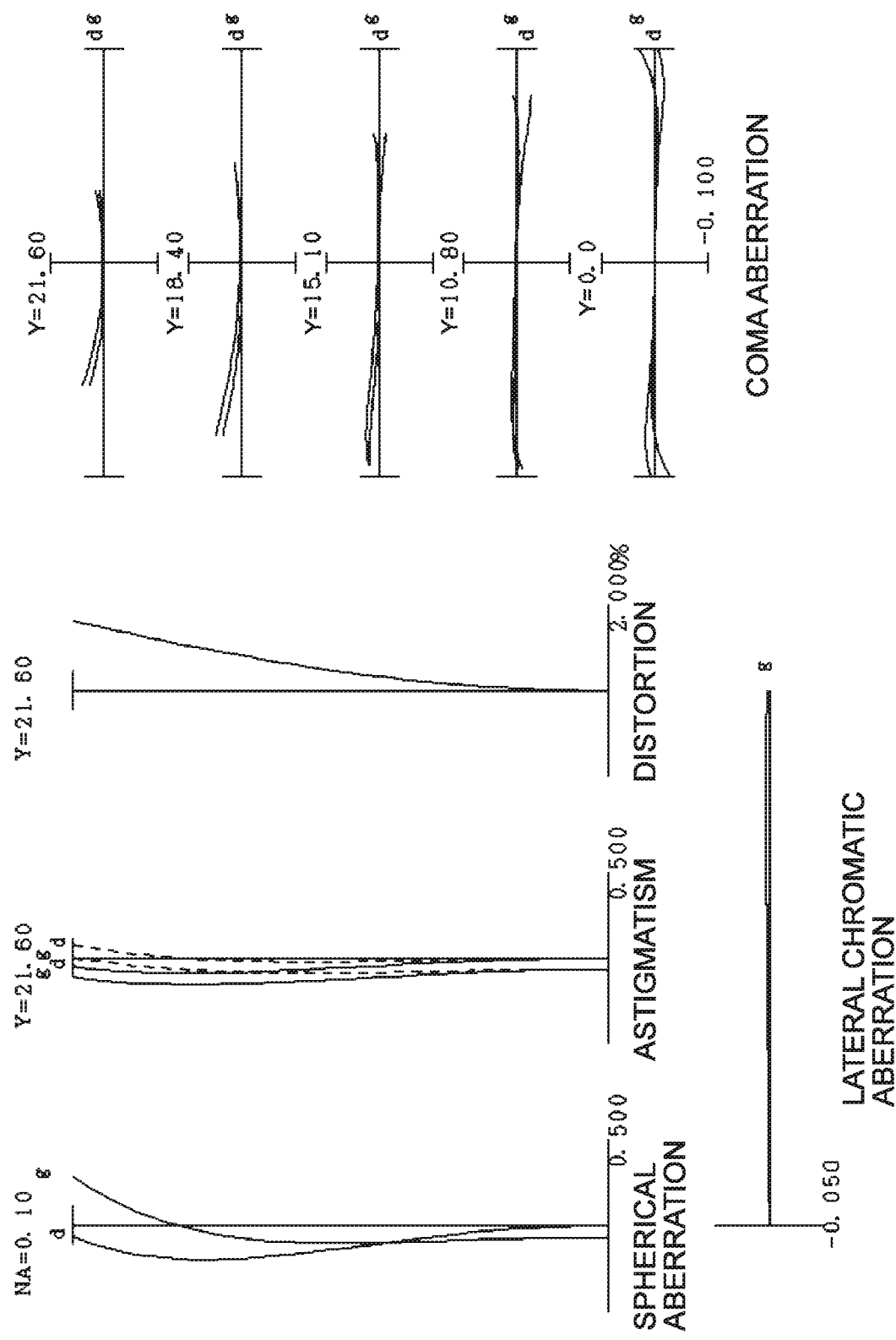

FIG. 7A is a graph showing various aberrations of the zoom optical system according to Example 2 having a vibration-proof function upon focusing on infinity in the wide angle end state, and FIG. 7B is a meridional lateral aberration graph in a case where blur correction is performed for the roll blur of 0.30°. FIG. 8 is a graph showing various aberrations of the zoom optical system according to Example 2 having a vibration proof function upon focusing on infinity in the intermediate focal length state. FIG. 9A is a graph showing various aberrations of the zoom optical system according to Example 2 having a vibration-proof function upon focusing on infinity in the telephoto end state, and FIG. 9B is a meridional lateral aberration graph in a case where blur correction is performed for the roll blur of 0.20°. FIGS. 10A, 10B, and 10C are graphs showing various aberrations of the zoom optical system according to Example 2 upon focusing on a short distant object, respectively in the wide angle end state, the intermediate focal length state, and the telephoto end state.

It can be seen in these aberration graphs that the zoom optical system according to Example 2 can achieve excellent imaging performance with various aberrations successfully corrected from the wide angle end state to the telephoto end state, and can achieve excellent imaging performance upon focusing on a short distant object.

Example 3

Example 3 is described with reference to FIG. 11, FIGS. 12A and 12B, FIG. 13, FIGS. 14A and 14B, and FIGS. 15A-15C and Table 3. FIG. 11 is a diagram illustrating a lens configuration of a zoom optical system according to Example 3 of the present embodiment. The zoom optical system ZL(3) according to Example 3 consists of, in order from an object: a first lens group G1 having positive refractive power; a second lens group G2 having negative refractive power; a third lens group G3 having positive refractive power; an aperture stop S; a fourth lens group G4 having positive refractive power; and a fifth lens group G5 having negative refractive power. The first to the fifth lens groups G1 to G5 each move in a direction indicated by an arrow in FIG. 11 upon zooming from a wide angle end state (W) to a telephoto end state (T). In this Example, the intermediate group GM includes the second lens group G2, the intermediate side lens group GRP1 includes the third lens group G3 and the aperture stop S, the subsequent side lens group GRP2 includes the fourth lens group G4, and the subsequent group GR includes the fifth lens group G5.

The first lens group G1 consists of, in order from the object, a positive lens (1-1st lens) L11 having a biconvex shape and a cemented positive lens consisting of a negative meniscus lens (1-2nd lens) L12 having a convex surface facing the object and a positive meniscus lens (1-3rd lens) L13 having a convex surface facing the object.

The second lens group G2 consists of, in order from the object, a negative meniscus lens L21 having a convex surface facing the object, a positive meniscus lens L22 having a convex surface facing the object, and a cemented negative lens consisting of a negative lens L23 having a biconcave shape and a positive meniscus lens L24 having a convex surface facing the object.

The third lens group G3 consists of, in order from the object, a positive lens L31 having a biconvex shape and a cemented positive lens consisting of a positive lens L32 having a biconvex shape and a negative lens L33 having a biconcave shape. The aperture stop S is disposed in the neighborhood of and to the image side of the third lens group G3, and integrally moves with the third lens group G3 upon zooming.

The fourth lens group G4 consists of a cemented positive lens consisting of a positive lens L41 having a biconvex shape and a negative meniscus lens L42 having a concave surface facing the object.

The fifth lens group G5 consists of, in order from the object, a negative lens L51 having a biconcave shape, a negative lens L52 having a biconcave shape, a positive lens L53 having a biconvex shape, a negative meniscus lens L54 having a concave surface facing the object, and a positive meniscus lens L55 having a convex surface facing the object. An image surface I is disposed to the image side of the fifth lens group G5.

In the zoom optical system ZL(3) according to Example 3, the fourth lens group G4 (subsequent side lens group GRP2) moves toward the object upon focusing from a long distant object to a short distant object. In the zoom optical system ZL(3) according to Example 3, the cemented negative lens consisting of the negative lens L23 and the positive meniscus lens L24 in the second lens group G2 serves as a vibration-proof lens group (partial group), movable in a direction orthogonal to the optical axis, to be in charge of correcting displacement of the imaging position due to camera shake or the like (image blur on the image surface I).

To correct roll blur of an angle θ with a focal length of the whole system being f and with a lens having a vibration proof coefficient K (the ratio of the image movement amount on the imaging surface to the movement amount of the moving lens group for camera shake correction), a moving lens group for camera shake correction is moved in the direction orthogonal to the optical axis by (f·tan θ)/K. In the wide angle end state in Example 3, the vibration proof coefficient is 0.96 and the focal length is 72.1 mm, and thus the movement amount of the vibration-proof lens group to correct a roll blur of 0.30° is 0.39 mm. In the telephoto end state in Example 3, the vibration proof coefficient is 1.99 and the focal length is 292.0 mm, and thus the movement amount of the vibration-proof lens group to correct a roll blur of 0.20° is 0.51 mm.

Table 3 below lists specification values of the optical system according to Example 3.

TABLE 3

| [Lens specifications] | | | | | |
|---|---|---|---|---|---|
| Surface number | R | D | nd | vd | |
| Object surface | ∞ | | | | |
| 1 | 394.8396 | 3.845 | 1.48749 | 70.31 | |
| 2 | −543.4808 | 0.200 | | | |
| 3 | 105.1984 | 1.700 | 1.67270 | 32.19 | |
| 4 | 67.0764 | 8.688 | 1.49700 | 81.73 | |
| 5 | 3999.3650 | Variable | | | |
| 6 | 187.7927 | 1.000 | 1.83481 | 42.73 | |
| 7 | 39.3002 | 8.392 | | | |
| 8 | 40.6875 | 2.537 | 1.84666 | 23.80 | |
| 9 | 61.9560 | 4.302 | | | |
| 10 | −65.9607 | 1.000 | 1.70000 | 48.11 | |
| 11 | 47.5227 | 2.966 | 1.84666 | 23.80 | |
| 12 | 155.3071 | Variable | | | |
| 13 | 100.1220 | 3.921 | 1.80400 | 46.60 | |
| 14 | −71.7118 | 0.200 | | | |
| 15 | 39.6874 | 5.409 | 1.49700 | 81.73 | |
| 16 | −55.1551 | 1.000 | 1.85026 | 32.35 | |
| 17 | 138.4368 | 1.566 | | | |
| 18 | ∞ | Variable | | | (Aperture stop S) |
| 19 | 90.1287 | 4.430 | 1.51680 | 63.88 | |
| 20 | −29.8148 | 1.000 | 1.83400 | 37.18 | |
| 21 | −56.5509 | Variable | | | |
| 22 | −89.4853 | 1.000 | 1.90366 | 31.27 | |
| 23 | 58.7258 | 1.623 | | | |
| 24 | −119.8149 | 1.000 | 1.77250 | 49.62 | |
| 25 | 125.4243 | 2.815 | | | |
| 26 | 86.3318 | 5.240 | 1.67270 | 32.19 | |
| 27 | −30.2745 | 18.277 | | | |
| 28 | −22.8447 | 1.000 | 1.80400 | 46.60 | |
| 29 | −60.6486 | 0.200 | | | |

TABLE 3-continued

| 30 | 89.8891 | 2.703 | 1.66446 | 35.87 |
|---|---|---|---|---|
| 31 | 3303.4609 | BF | | |
| Image surface | ∞ | | | |

[Various data]
Zooming rate 4.05

| | W | M | T |
|---|---|---|---|
| f | 72.1 | 99.9 | 292.0 |
| FNO | 4.53 | 4.71 | 5.88 |
| 2ω | 33.50 | 23.86 | 8.24 |
| Ymax | 21.60 | 21.60 | 21.60 |
| TL | 193.32 | 211.55 | 248.32 |
| BF | 38.32 | 41.10 | 61.32 |

[Various distance data]

| | W Infinity | M Infinity | T Infinity | W Short distant | M Short distant | T Short distant |
|---|---|---|---|---|---|---|
| d5 | 2.000 | 26.748 | 74.901 | 2.000 | 26.748 | 74.901 |
| d12 | 42.901 | 33.607 | 2.000 | 42.901 | 33.607 | 2.000 |
| d18 | 22.086 | 20.598 | 21.608 | 21.186 | 19.465 | 19.388 |
| d21 | 2.000 | 3.489 | 2.479 | 2.900 | 4.621 | 4.698 |

[Lens group data]

| Group | Starting surface | Focal length |
|---|---|---|
| G1 | 1 | 172.579 |
| G2 | 6 | −42.044 |
| G3 | 13 | 48.716 |
| G4 | 19 | 101.916 |
| G5 | 22 | −49.748 |

[Conditional expression corresponding value]

| Conditional expression | (1) fvr/fMt = 1.821 |
| Conditional expression | (2) (−fvr)/ft = 0.262 |
| Conditional expression | (3) f1/(−fMt) = 4.105 |
| Conditional expression | (4) fP/(−fN) = 0.571 |
| Conditional expression | (5) nP/nN = 0.895 |
| Conditional expression | (6) vP/vN = 2.539 |

Figure 12A:
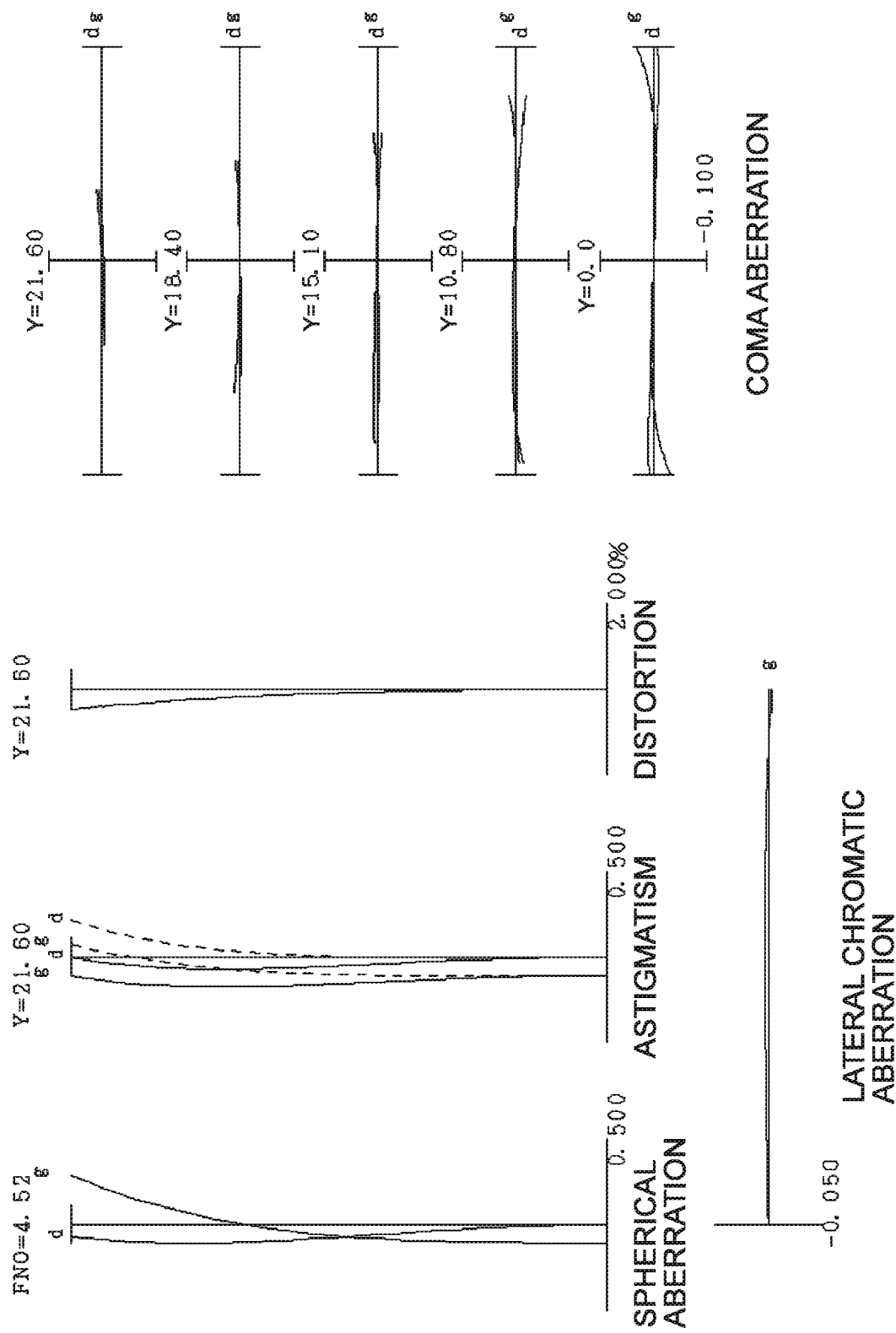
FIG. 12A is a graph showing various aberrations of the zoom optical system according to Example 3 upon focusing on infinity in the wide angle end state.
Figure 12B:
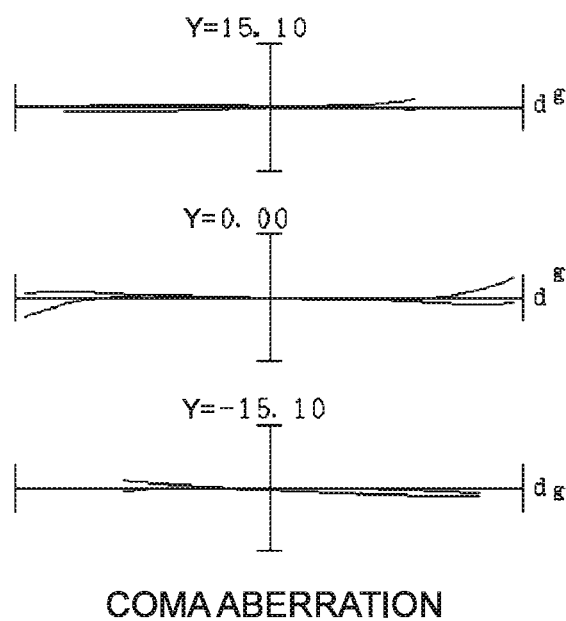
FIG. 12B is a meridional lateral aberration graph in a case where blur correction is performed for the roll blur of 0.30°.
Figure 13:
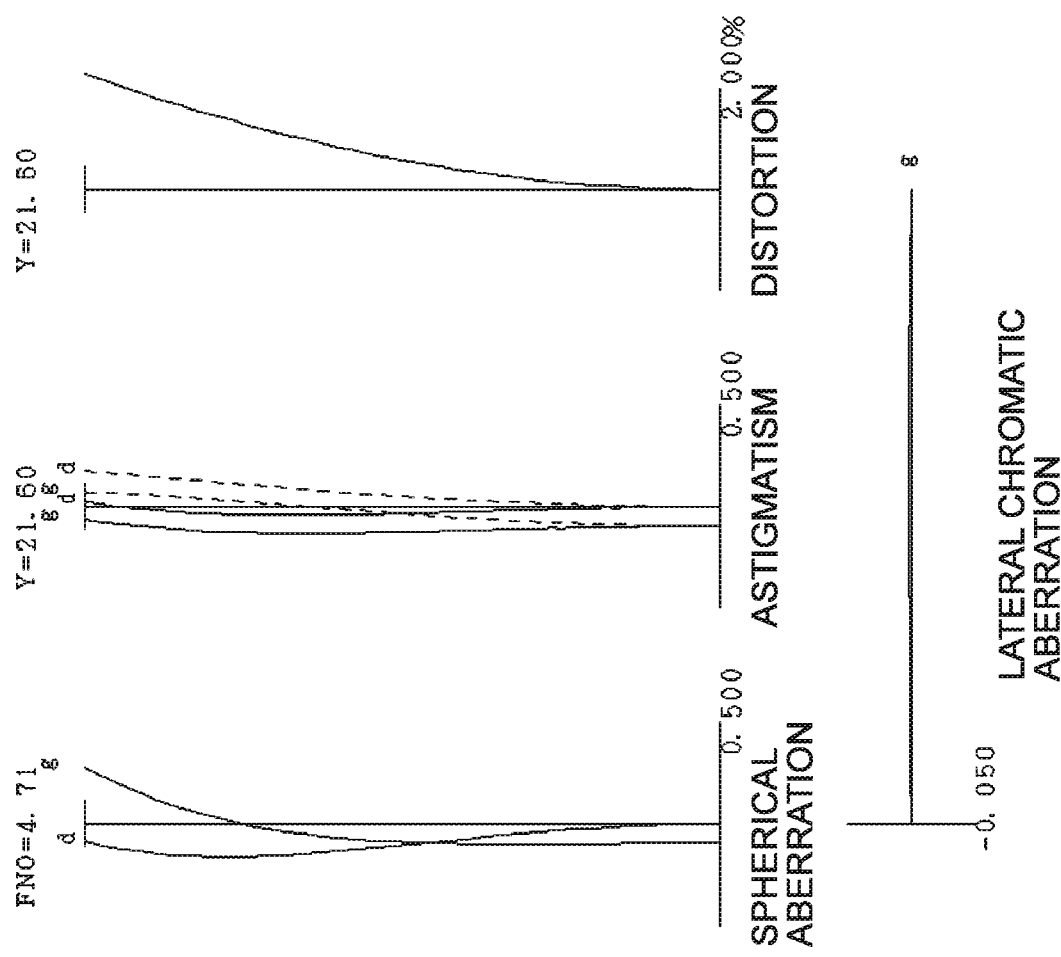
FIG. 13 is a graph showing various aberrations of the zoom optical system according to Example 3 upon focusing on infinity in the intermediate focal length state.
Figure 14B:
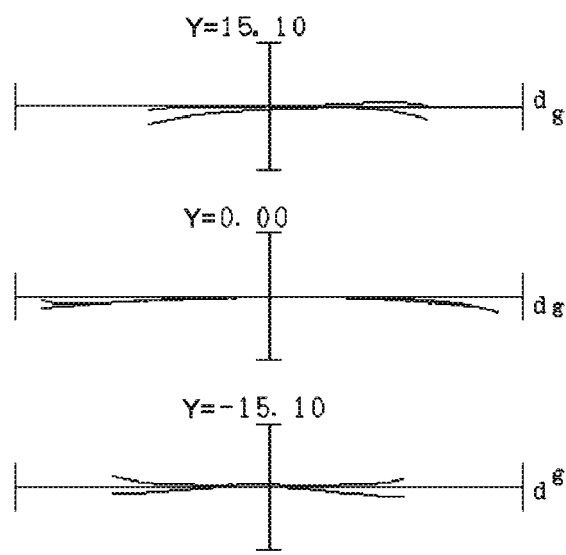
FIG. 14B is a meridional lateral aberration graph in a case where blur correction is performed for the roll blur of 0.20°.
Figure 15A:
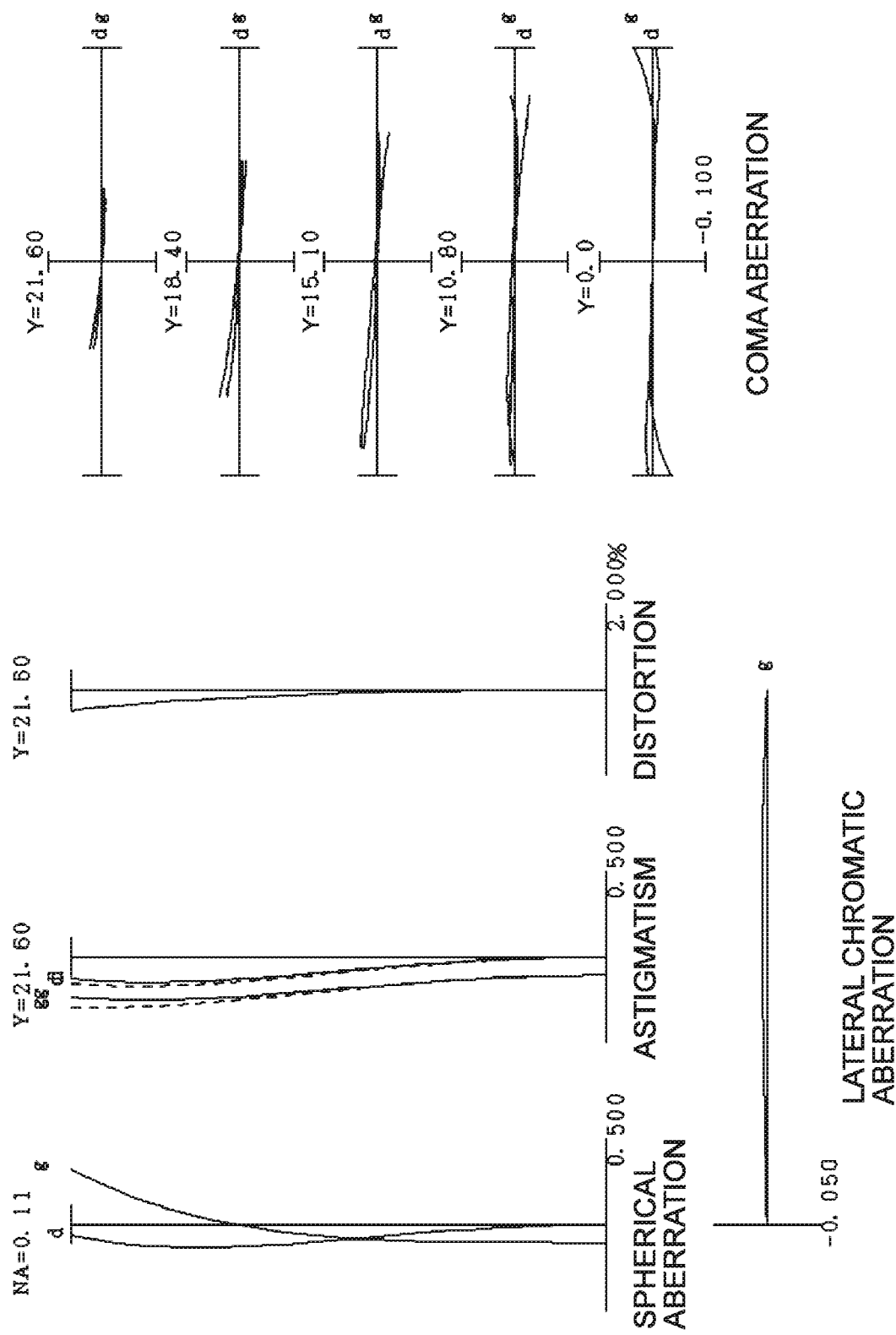
Figure 15C:
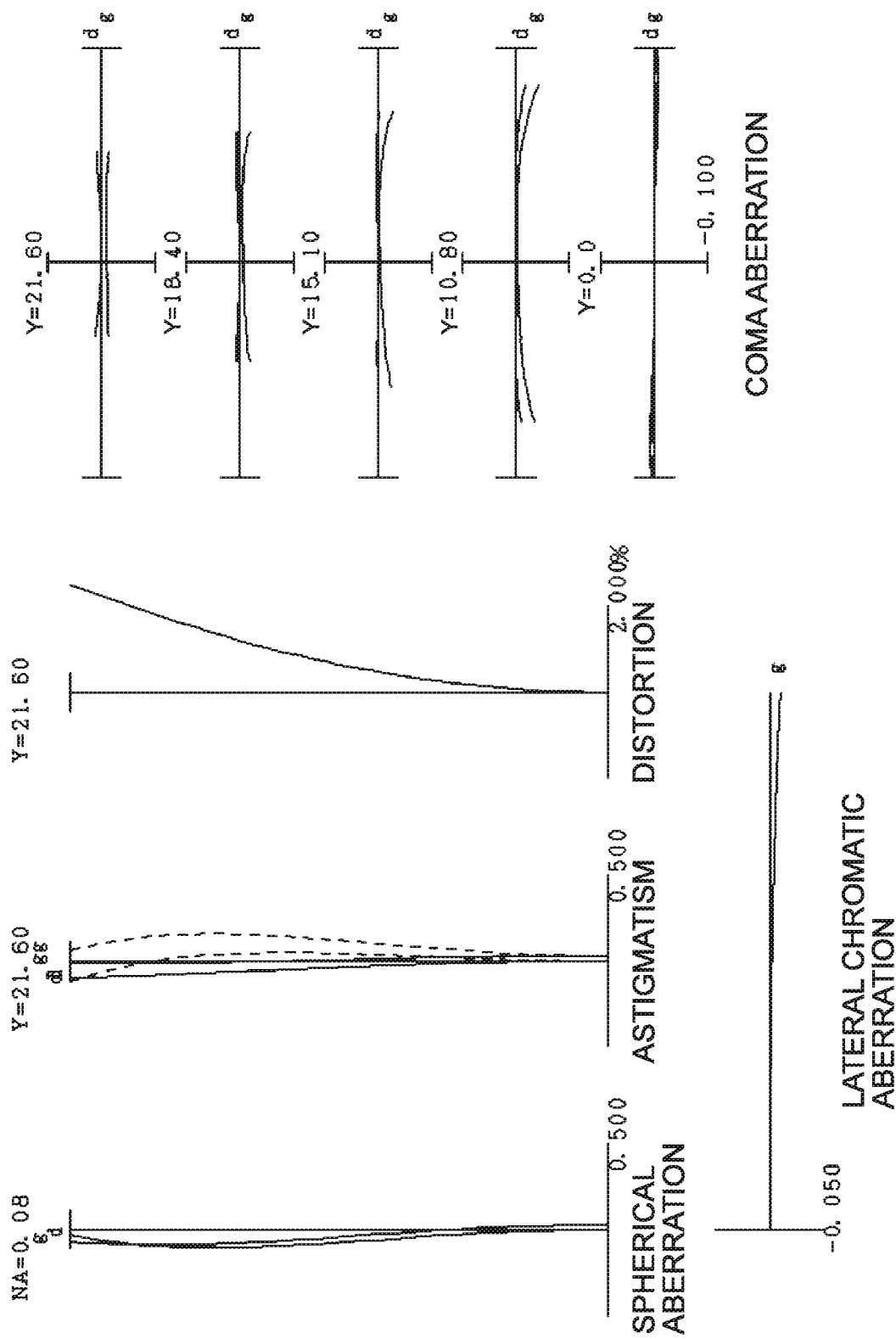

FIG. 12A is a graph showing various aberrations of the zoom optical system according to Example 3 having a vibration-proof function upon focusing on infinity in the wide angle end state, and FIG. 12B is a meridional lateral aberration graph in a case where blur correction is performed for the roll blur of 0.30°. FIG. 13 is a graph showing various aberrations of the zoom optical system according to Example 3 having a vibration proof function upon focusing on infinity in the intermediate focal length state. FIG. 14A is a graph showing various aberrations of the zoom optical system according to Example 3 having a vibration-proof function upon focusing on infinity in the telephoto end state, and FIG. 14B is a meridional lateral aberration graph in a case where blur correction is performed for the roll blur of 0.20°. FIGS. 15A, 15B, and 15C are graphs showing various aberrations of the zoom optical system according to Example 3 upon focusing on a short distant object, respectively in the wide angle end state, the intermediate focal length state, and the telephoto end state.

It can be seen in these aberration graphs that the zoom optical system according to Example 3 can achieve excellent imaging performance with various aberrations successfully corrected from the wide angle end state to the telephoto end state, and can achieve excellent imaging performance upon focusing on a short distant object.

Example 4

Example 4 is described with reference to FIG. 16, FIGS. 17A and 17B, FIG. 18, FIGS. 19A and 19B, and FIGS. 20A-20C and Table 4. FIG. 16 is a diagram illustrating a lens configuration of a zoom optical system according to Example 4 of the present embodiment. The zoom optical system ZL(4) according to Example 4 consists of, in order from an object: a first lens group G1 having positive refractive power; a second lens group G2 having negative refractive power; a third lens group G3 having positive refractive power; an aperture stop S; a fourth lens group G4 having positive refractive power; and a fifth lens group G5 having negative refractive power. The first to the fifth lens groups G1 to G5 each move in a direction indicated by an arrow in FIG. 16 upon zooming from a wide angle end state (W) to a telephoto end state (T). In this Example, the intermediate group GM includes the second lens group G2, the intermediate side lens group GRP1 includes the third lens group G3 and the aperture stop S, the subsequent side lens group GRP2 includes the fourth lens group G4, and the subsequent group GR includes the fifth lens group G5.

The first lens group G1 consists of, in order from the object, a positive lens (1-1st lens) L11 having a biconvex shape and a cemented positive lens consisting of a negative meniscus lens (1-2nd lens) L12 having a convex surface facing the object and a positive meniscus lens (1-3rd lens) L13 having a convex surface facing the object.

The second lens group G2 consists of, in order from the object, a negative meniscus lens L21 having a convex surface facing the object, a positive meniscus lens L22 having a convex surface facing the object, and a cemented negative lens consisting of a negative lens L23 having a biconcave shape and a positive meniscus lens L24 having a convex surface facing the object.

The third lens group G3 consists of, in order from the object, a positive lens L31 having a biconvex shape and a cemented positive lens consisting of a positive lens L32 having a biconvex shape and a negative lens L33 having a biconcave shape. The aperture stop S is disposed in the neighborhood of and to the image side of the third lens group G3, and integrally moves with the third lens group G3 upon zooming.

The fourth lens group G4 consists of, in order from the object, a positive lens L41 having a biconvex shape and a negative meniscus lens L42 having a concave surface facing the object.

The fifth lens group G5 consists of, in order from the object, a negative meniscus lens L51 having a convex surface facing the object, a positive meniscus lens L52 having a concave surface facing the object, a negative meniscus lens L53 having a concave surface facing the object, and a positive lens L54 having a biconvex shape. An image surface I is disposed to the image side of the fifth lens group G5.

In the zoom optical system ZL(4) according to Example 4, the fourth lens group G4 (subsequent side lens group GRP2) moves toward the object upon focusing from a long distant object to a short distant object. In the zoom optical system ZL(4) according to Example 4, the cemented negative lens consisting of the negative lens L23 and the positive meniscus lens L24 in the second lens group G2 serves as a vibration-proof lens group (partial group), movable in a direction orthogonal to the optical axis, to be in charge of correcting displacement of the imaging position due to camera shake or the like (image blur on the image surface I).

To correct roll blur of an angle θ with a focal length of the whole system being f and with a lens having a vibration proof coefficient K (the ratio of the image movement amount on the imaging surface to the movement amount of the moving lens group for camera shake correction), a moving lens group for camera shake correction is moved in the direction orthogonal to the optical axis by (f·tan θ)/K. In the wide angle end state in Example 4, the vibration proof coefficient is 0.99 and the focal length is 72.1 ram, and thus the movement amount of the vibration-proof lens group to correct a roll blur of 0.30° is 0.38 mm. In the telephoto end state in Example 4, the vibration proof coefficient is 2.04 and the focal length is 292.0 mm, and thus the movement amount of the vibration-proof lens group to correct a roll blur of 0.20° is 0.50 mm.

Table 4 below lists specification values of the optical system according to Example 4.

TABLE 4

[Lens specifications]

| Surface number | R | D | nd | vd |
|---|---|---|---|---|
| Object surface | ∞ | | | |
| 1 | 397.7403 | 3.807 | 1.48749 | 70.31 |
| 2 | −541.2704 | 0.200 | | |
| 3 | 98.5962 | 1.700 | 1.67270 | 32.19 |
| 4 | 64.4142 | 7.530 | 1.49700 | 81.73 |
| 5 | 2167.3548 | Variable | | |
| 6 | 153.3759 | 1.000 | 1.80610 | 40.97 |
| 7 | 35.8256 | 8.557 | | |
| 8 | 37.5306 | 2.567 | 1.84666 | 23.80 |
| 9 | 55.0899 | 4.528 | | |
| 10 | −64.5906 | 1.000 | 1.70000 | 48.11 |
| 11 | 45.3004 | 3.006 | 1.84666 | 23.80 |
| 12 | 146.7719 | Variable | | |
| 13 | 120.3729 | 3.847 | 1.79952 | 42.09 |
| 14 | −66.6553 | 0.200 | | |
| 15 | 40.5542 | 5.444 | 1.49700 | 81.73 |
| 16 | −51.5427 | 1.000 | 1.85026 | 32.35 |
| 17 | 136.7432 | 1.574 | | |
| 18 | ∞ | Variable | | (Aperture stop S) |
| 19 | 73.0072 | 4.267 | 1.51680 | 63.88 |
| 20 | −41.6199 | 1.157 | | |
| 21 | −36.8096 | 1.000 | 1.80100 | 34.92 |
| 22 | −63.5855 | Variable | | |
| 23 | 142.7978 | 1.000 | 1.90366 | 31.27 |
| 24 | 39.2858 | 5.972 | | |
| 25 | −32.2173 | 2.394 | 1.80518 | 25.45 |
| 26 | −25.4336 | 17.643 | | |
| 27 | −22.2559 | 1.000 | 1.77250 | 49.62 |
| 28 | −60.4849 | 0.200 | | |
| 29 | 133.6379 | 3.767 | 1.69895 | 30.13 |
| 30 | −86.4148 | BF | | |
| Image surface | ∞ | | | |

[Various data]
Zooming rate 4.05

| | W | M | T |
|---|---|---|---|
| f | 72.1 | 100.0 | 292.0 |
| FNO | 4.58 | 4.77 | 5.88 |
| 2ω | 33.52 | 23.92 | 8.28 |
| Ymax | 21.60 | 21.60 | 21.60 |
| TL | 193.32 | 210.92 | 248.32 |
| BF | 38.32 | 41.32 | 62.32 |

TABLE 4-continued

[Various distance data]

| | W Infinity | M Infinity | T Infinity | W Short distant | M Short distant | T Short distant |
|---|---|---|---|---|---|---|
| d5 | 2.000 | 25.714 | 72.838 | 2.000 | 25.714 | 72.838 |
| d12 | 41.838 | 32.720 | 2.000 | 41.838 | 32.720 | 2.000 |
| d18 | 24.804 | 23.298 | 24.804 | 23.943 | 22.207 | 22.596 |
| d22 | 2.000 | 3.505 | 2.000 | 2.861 | 4.597 | 4.208 |

[Lens group data]

| Group | Starting surface | Focal length |
|---|---|---|
| G1 | 1 | 166.403 |
| G2 | 6 | −40.599 |
| G3 | 13 | 52.091 |
| G4 | 19 | 95.393 |
| G5 | 23 | −58.282 |

[Conditional expression corresponding value]

| Conditional expression | (1) fvr/fMt = 1.831 |
| Conditional expression | (2) (−fvr)/ft = 0.255 |
| Conditional expression | (3) f1/(−fMt) = 4.099 |
| Conditional expression | (4) fP/(−fN) = 0.468 |
| Conditional expression | (5) nP/nN = 0.895 |
| Conditional expression | (6) vP/vN = 2.539 |

Figure 17A:
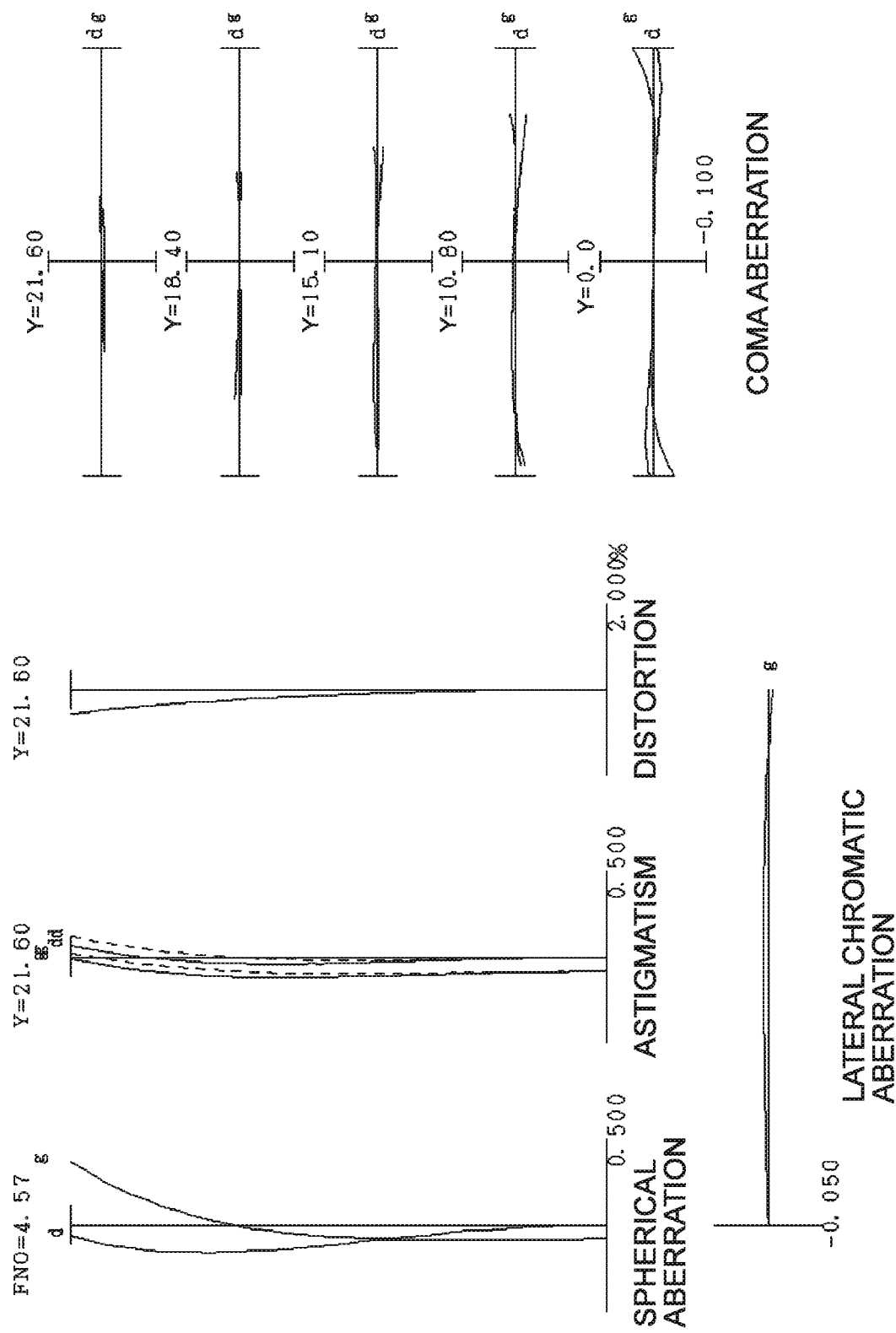
FIG. 17A is a graph showing various aberrations of the zoom optical system according to Example 4 upon focusing on infinity in the wide angle end state.
Figure 17B:
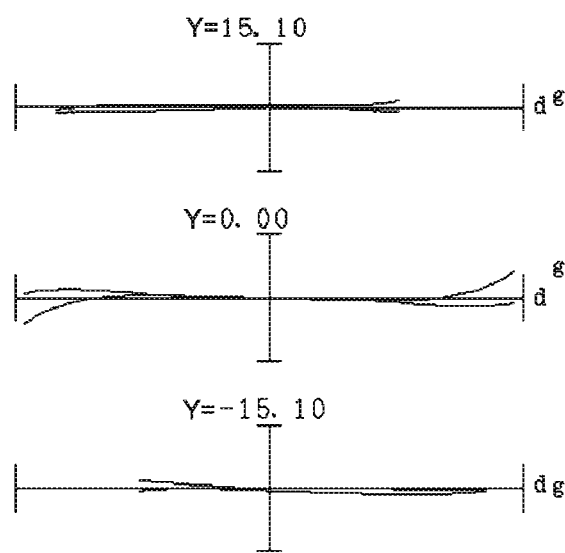
FIG. 17B is a meridional lateral aberration graph in a case where blur correction is performed for the roll blur of 0.30°.
Figure 18:
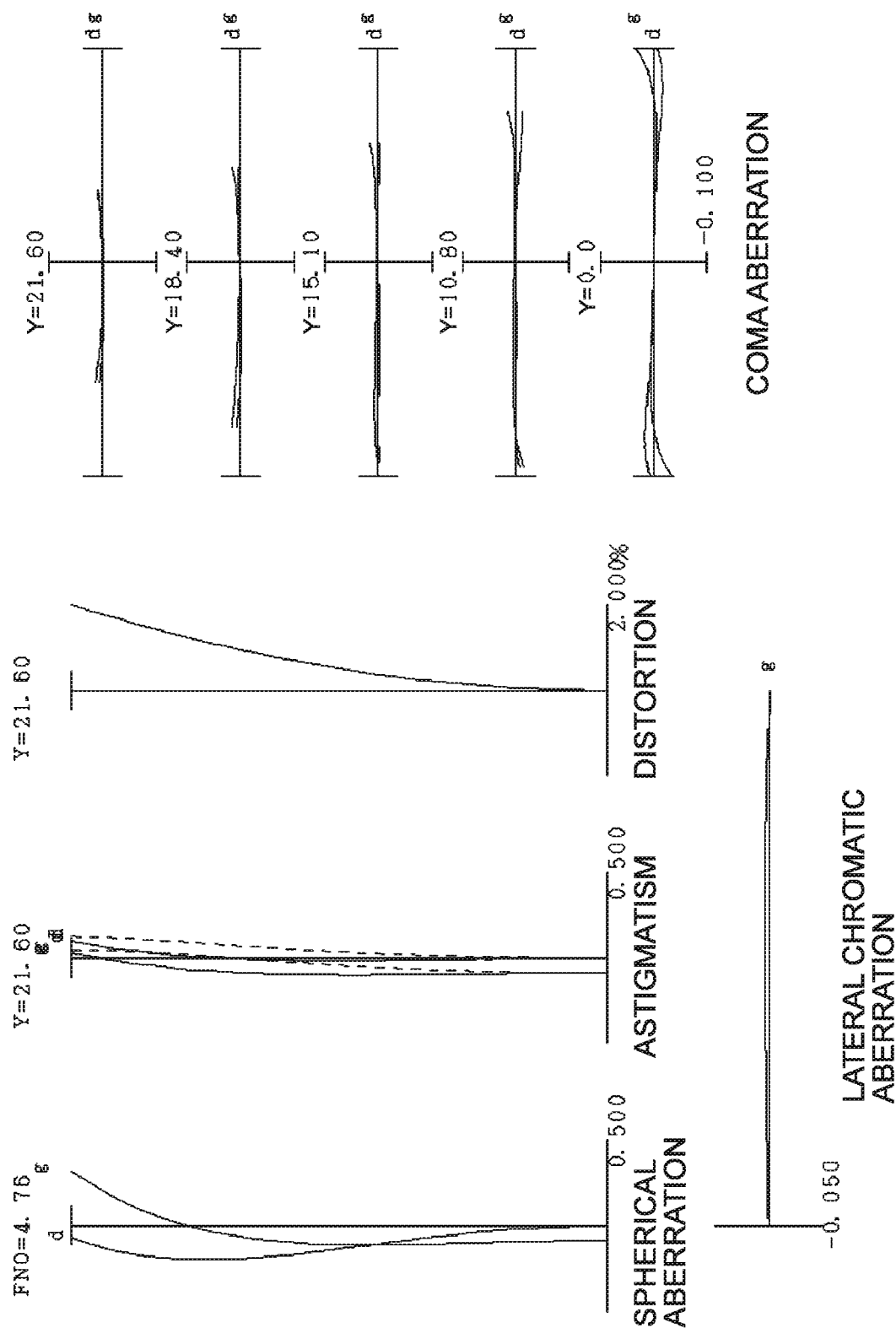
FIG. 18 is a graph showing various aberrations of the zoom optical system according to Example 4 upon focusing on infinity in the intermediate focal length state.
Figure 19A:
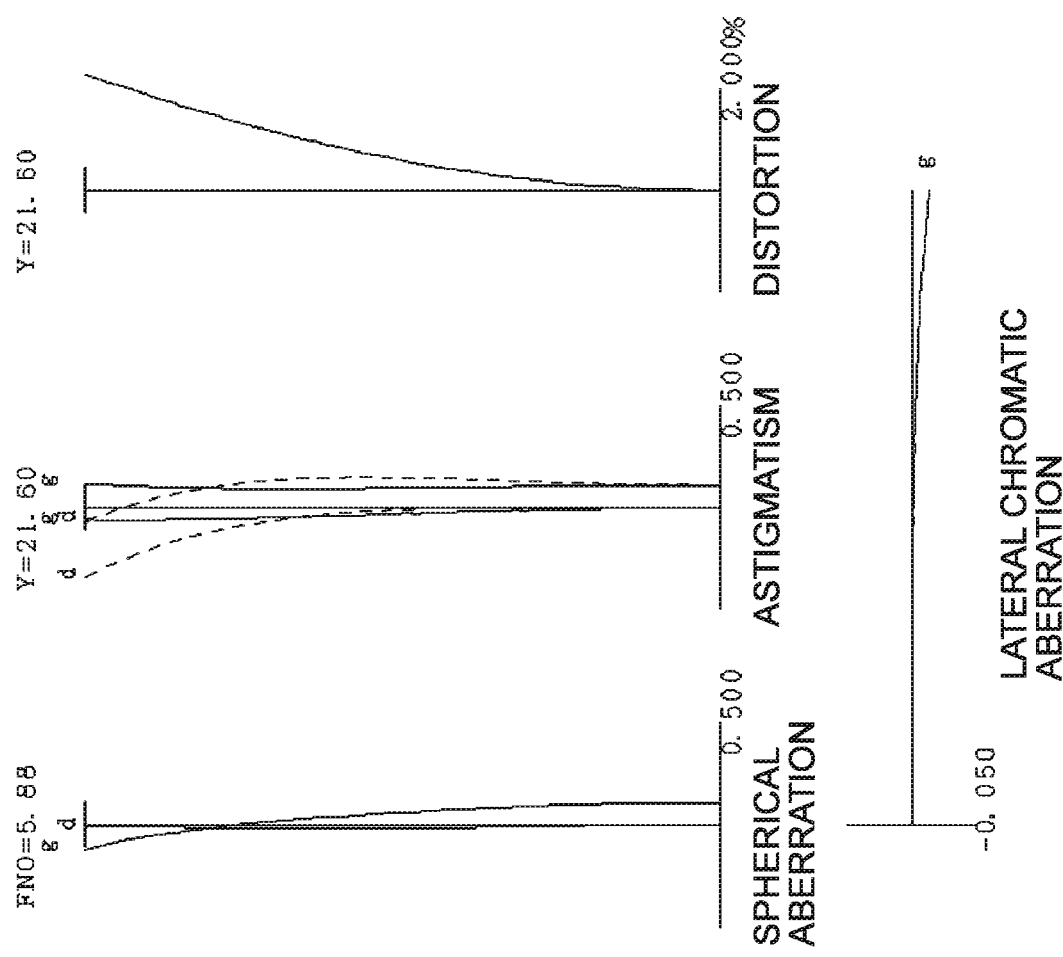
FIG. 19A is a graph showing various aberrations of the zoom optical system according to Example 4 upon focusing on infinity in the telephoto end state.
Figure 19B:
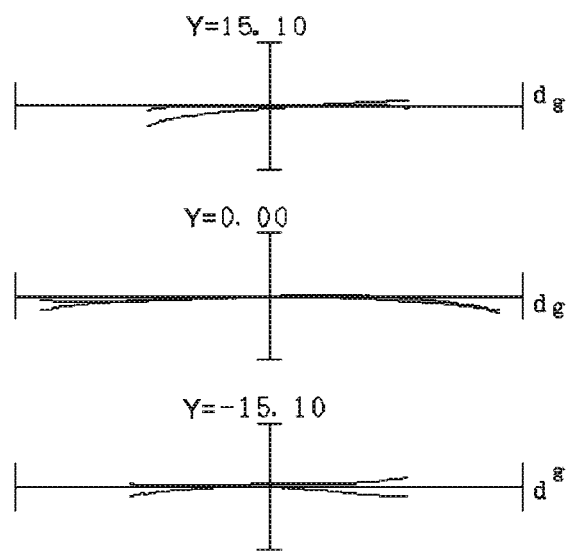
FIG. 19B is a meridional lateral aberration graph in a case where blur correction is performed for the roll blur of 0.20°.
Figure 20A:
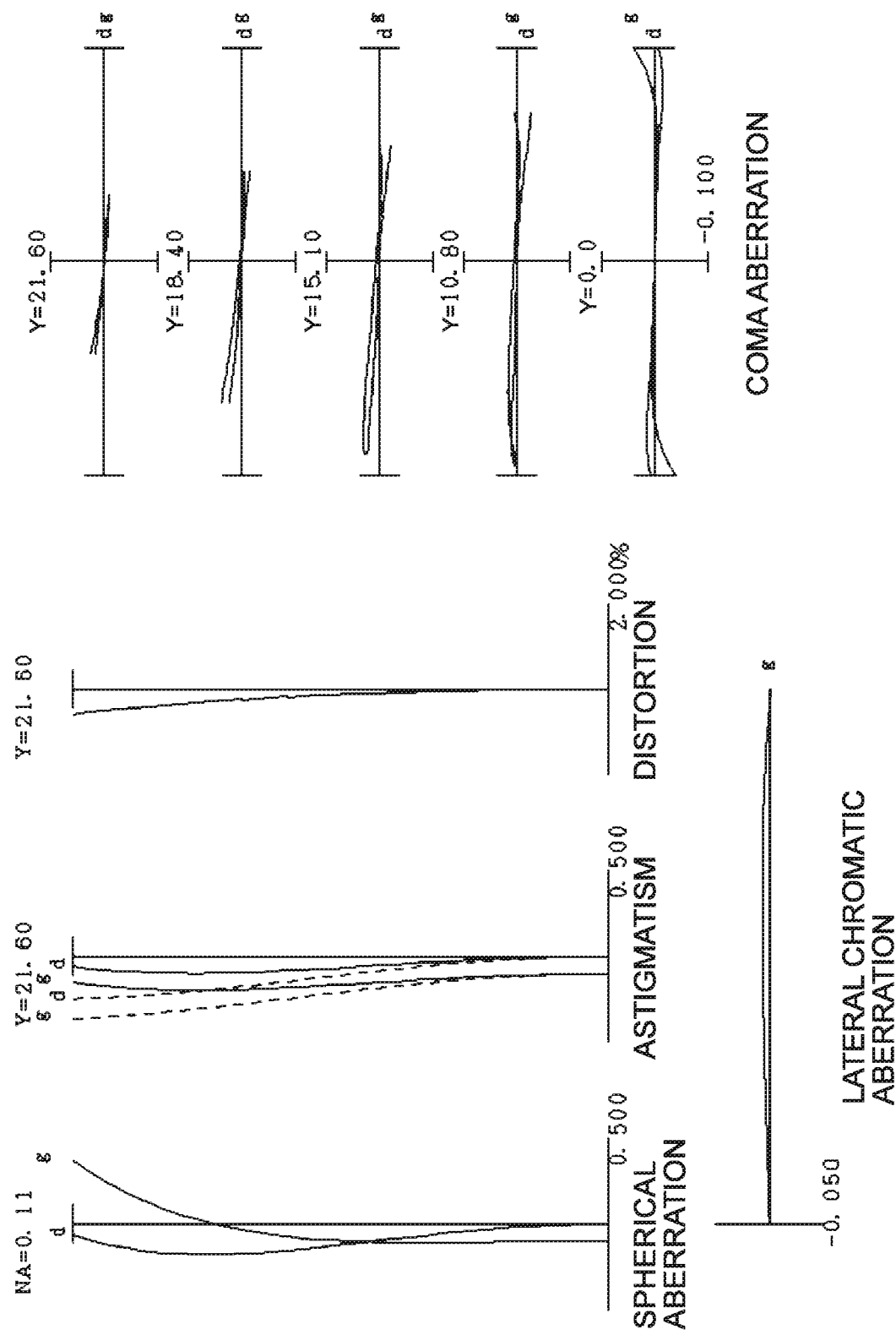

FIG. 17A is a graph showing various aberrations of the zoom optical system according to Example 4 having a vibration-proof function upon focusing on infinity in the wide angle end state, and FIG. 17B is a meridional lateral aberration graph in a case where blur correction is performed for the roll blur of 0.30°. FIG. 18 is a graph showing various aberrations of the zoom optical system according to Example 4 having a vibration proof function upon focusing on infinity in the intermediate focal length state. FIG. 19A is a graph showing various aberrations of the zoom optical system according to Example 4 having a vibration-proof function upon focusing on infinity in the telephoto end state, and FIG. 19B is a meridional lateral aberration graph in a case where blur correction is performed for the roll blur of 0.20°. FIGS. 20A, 20B, and 20C are graphs showing various aberrations of the zoom optical system according to Example 4 upon focusing on a short distant object, respectively in the wide angle end state, the intermediate focal length state, and the telephoto end state.

It can be seen in these aberration graphs that the zoom optical system according to Example 4 can achieve excellent imaging performance with various aberrations successfully corrected from the wide angle end state to the telephoto end state, and can achieve excellent imaging performance upon focusing on a short distant object.

Example 5

Example 5 is described with reference to FIG. 21, FIGS. 22A and 22B, FIG. 23, FIGS. 24A and 24B, and FIGS. 25A-25C and Table 5. FIG. 21 is a diagram illustrating a lens configuration of a zoom optical system according to Example 5 of the present embodiment. The zoom optical system ZL(5) according to Example 5 consists of, in order from an object: a first lens group G1 having positive refractive power; a second lens group G2 having negative refractive power; a third lens group G3 having positive refractive power; an aperture stop S; a fourth lens group G4 having positive refractive power; a fifth lens group G5 having negative refractive power; and a sixth lens group G6 having negative refractive power. The first to the sixth lens groups G1 to G6 each move in a direction indicated by an arrow in FIG. 21 upon zooming from a wide angle end state (W) to a telephoto end state (T). In this Example, the intermediate group GM includes the second lens group G2, the intermediate side lens group GRP1 includes the third lens group G3 and the aperture stop S, the subsequent side lens group GRP2 includes the fourth lens group G4, and the subsequent group GR includes the fifth lens group G5 and the sixth lens group G6. The subsequent group GR has negative refractive power as a whole.

The first lens group G1 consists of, in order from the object, a positive lens (1-1st lens) L11 having a biconvex shape and a cemented positive lens consisting of a negative meniscus lens (1-2nd lens) L12 having a convex surface facing the object and a positive meniscus lens (1-3rd lens) L13 having a convex surface facing the object.

The second lens group G2 consists of, in order from the object, a negative meniscus lens L21 having a convex surface facing the object, a positive meniscus lens L22 having a convex surface facing the object, and a cemented negative lens consisting of a negative lens L23 having a biconcave shape and a positive meniscus lens L24 having a convex surface facing the object.

The third lens group G3 consists of, in order from the object, a positive lens L31 having a biconvex shape and a cemented positive lens consisting of a positive lens L32 having a biconvex shape and a negative lens L33 having a biconcave shape. The aperture stop S is disposed in the neighborhood of and to the image side of the third lens group G3, and integrally moves with the third lens group G3 upon zooming.

The fourth lens group G4 consists of, in order from the object, a positive lens L41 having a biconvex shape and a negative meniscus lens L42 having a concave surface facing the object.

The fifth lens group G5 consists of, in order from the object, a negative meniscus lens L51 having a convex surface facing the object and a positive meniscus lens L52 having a concave surface facing the object.

The sixth lens group G6 consists of, in order from the object, a negative meniscus lens L61 having a concave surface facing the object and a positive lens L62 having a biconvex shape. An image surface I is disposed to the image side of the sixth lens group G6.

In the zoom optical system ZL(5) according to Example 5, the fourth lens group G4 (subsequent side lens group GRP2) moves toward the object upon focusing from a long distant object to a short distant object. In the zoom optical system ZL(5) according to Example 5, the cemented negative lens consisting of the negative lens L23 and the positive meniscus lens L24 in the second lens group G2 serves as a vibration-proof lens group (partial group), movable in a direction orthogonal to the optical axis, to be in charge of correcting displacement of the imaging position due to camera shake or the like (image blur on the image surface I).

To correct roll blur of an angle θ with a focal length of the whole system being f and with a lens having a vibration proof coefficient K (the ratio of the image movement amount on the imaging surface to the movement amount of the moving lens group for camera shake correction), a moving lens group for camera shake correction is moved in the direction orthogonal to the optical axis by (f·tan θ)/K. In the wide angle end state in Example 5, the vibration proof coefficient is 1.00 and the focal length is 72.1 mm, and thus the movement amount of the vibration-proof lens group to correct a roll blur of 0.30° is 0.38 mm. In the telephoto end state in Example 5, the vibration proof coefficient is 2.07 and the focal length is 292.0 mm, and thus the movement amount of the vibration-proof lens group to correct a roll blur of 0.20° is 0.49 mm.

Table 5 below lists specification values of the optical system according to Example 5.

TABLE 5

[Lens specifications]

| Surface number | R | D | nd | vd |
|---|---|---|---|---|
| Object surface | ∞ | | | |
| 1 | 410.0484 | 3.688 | 1.48749 | 70.31 |
| 2 | −563.1103 | 0.200 | | |
| 3 | 102.5753 | 1.700 | 1.67270 | 32.19 |
| 4 | 66.0707 | 7.494 | 1.49700 | 81.73 |
| 5 | 15350.0260 | Variable | | |
| 6 | 139.4435 | 1.000 | 1.80610 | 40.97 |
| 7 | 35.1229 | 7.231 | | |
| 8 | 37.6103 | 2.601 | 1.84666 | 23.80 |
| 9 | 56.2791 | 4.573 | | |
| 10 | −62.1771 | 1.000 | 1.70000 | 48.11 |
| 11 | 45.7876 | 3.019 | 1.84666 | 23.80 |
| 12 | 152.3777 | Variable | | |
| 13 | 118.3464 | 3.864 | 1.79952 | 42.09 |
| 14 | −66.5127 | 0.200 | | |
| 15 | 41.1734 | 5.431 | 1.49700 | 81.73 |
| 16 | −51.3614 | 1.000 | 1.85026 | 32.35 |
| 17 | 129.2055 | 1.610 | | |
| 18 | ∞ | Variable | | (Aperture stop S) |
| 19 | 79.6726 | 4.263 | 1.51680 | 63.88 |
| 20 | −41.5025 | 1.192 | | |
| 21 | −36.1506 | 1.000 | 1.80100 | 34.92 |
| 22 | −57.7482 | Variable | | |
| 23 | 360.1366 | 1.000 | 1.90366 | 31.27 |
| 24 | 48.3936 | 6.817 | | |
| 25 | −37.2103 | 2.515 | 1.80518 | 25.45 |
| 26 | −27.2408 | Variable | | |
| 27 | −22.1710 | 1.000 | 1.80400 | 46.60 |
| 28 | −62.3440 | 0.200 | | |
| 29 | 129.8338 | 3.640 | 1.71736 | 29.57 |
| 30 | −94.8486 | BF | | |
| Image surface | ∞ | | | |

[Various data]
Zooming rate 4.05

| | W | M | T |
|---|---|---|---|
| f | 72.1 | 100.0 | 292.0 |
| FNO | 4.57 | 4.79 | 5.88 |
| 2ω | 33.64 | 23.96 | 8.26 |
| Ymax | 21.60 | 21.60 | 21.60 |
| TL | 193.32 | 211.43 | 248.32 |
| BF | 38.32 | 41.66 | 60.02 |

[Various distance data]

| | W Infinity | M Infinity | T Infinity | W Short distant | M Short distant | T Short distant |
|---|---|---|---|---|---|---|
| d5 | 2.000 | 25.563 | 73.573 | 2.000 | 25.563 | 73.573 |
| d12 | 42.573 | 33.490 | 2.000 | 42.573 | 33.490 | 2.000 |
| d18 | 24.947 | 23.743 | 24.947 | 24.097 | 22.674 | 22.767 |
| d22 | 2.000 | 3.203 | 2.000 | 2.849 | 4.273 | 4.180 |
| d26 | 17.243 | 17.537 | 19.544 | 17.243 | 17.537 | 19.544 |

TABLE 5-continued

[Lens group data]

| Group | Starting surface | Focal length |
|---|---|---|
| G1 | 1 | 168.635 |
| G2 | 6 | −41.024 |
| G3 | 13 | 53.154 |
| G4 | 19 | 92.760 |
| G5 | 23 | −175.236 |
| G6 | 27 | −106.197 |

[Conditional expression corresponding value]

| | |
|---|---|
| Conditional expression | (1) fvr/fMt = 1.779 |
| Conditional expression | (2) (−fvr)/ft = 0.250 |
| Conditional expression | (3) f1/(−fMt) = 4.111 |
| Conditional expression | (4) fP/(−fN) = 0.434 |
| Conditional expression | (5) nP/nN = 0.895 |
| Conditional expression | (6) vP/vN = 2.539 |

Figure 22B:
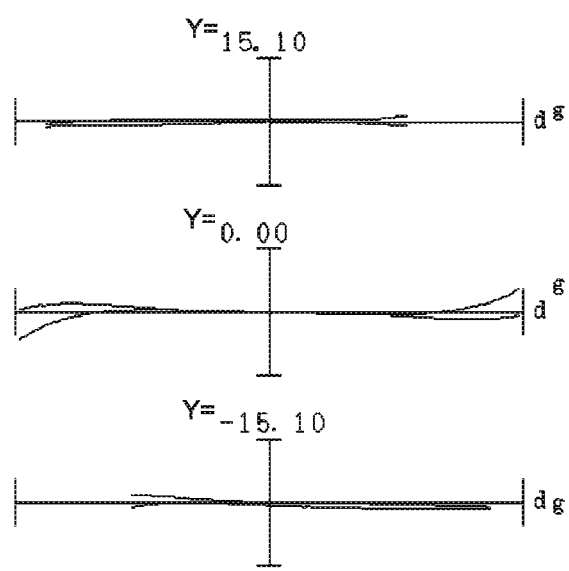
FIG. 22B is a meridional lateral aberration graph in a case where blur correction is performed for the roll blur of 0.30°.
Figure 24A:
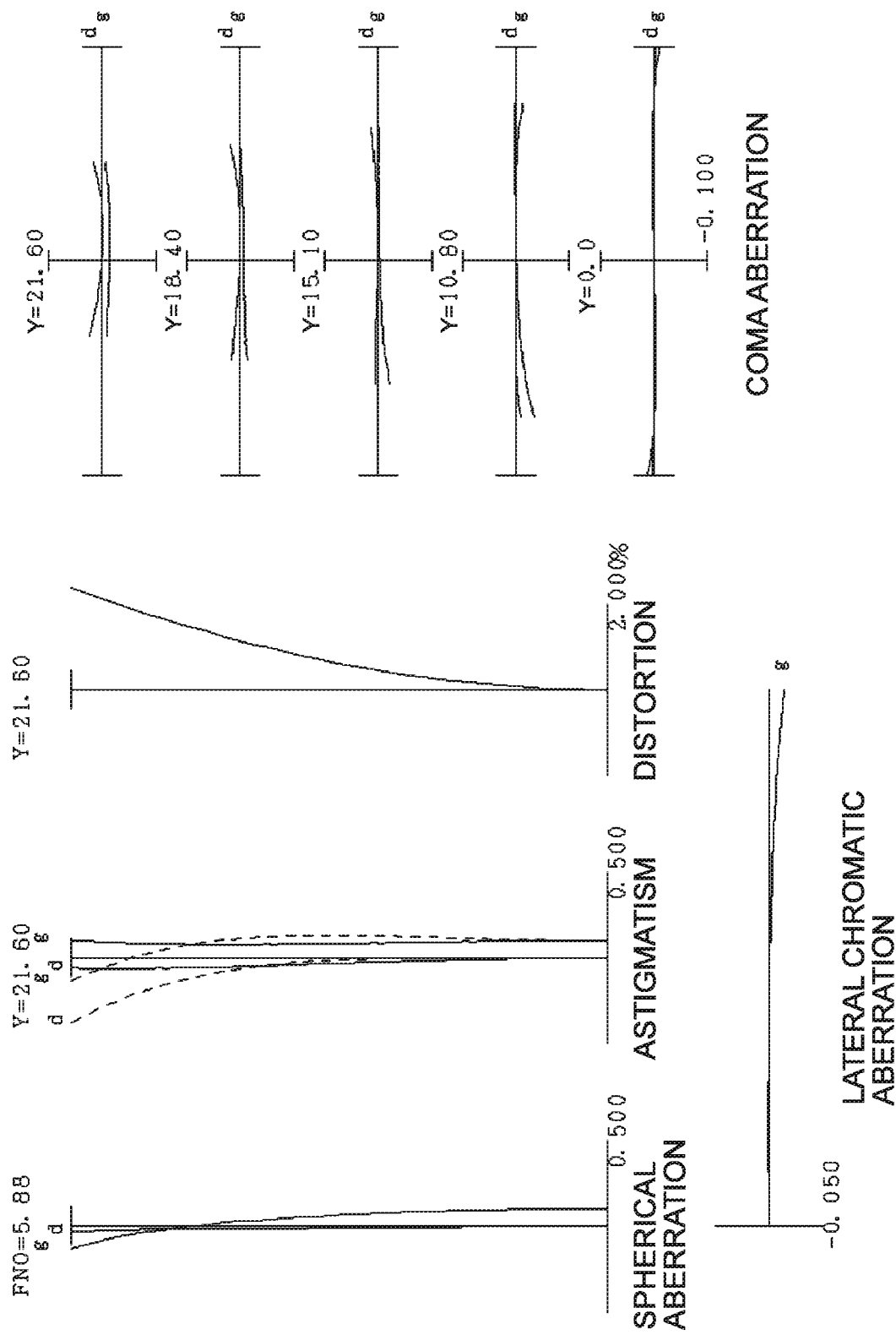
FIG. 24A is a graph showing various aberrations of the zoom optical system according to Example 5 upon focusing on infinity in the telephoto end state.
Figure 24B:
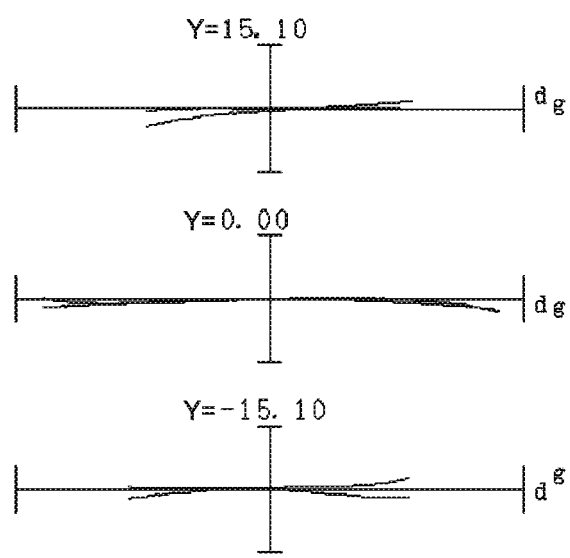
FIG. 24B is a meridional lateral aberration graph in a case where blur correction is performed for the roll blur of 0.20°.
Figure 25A:
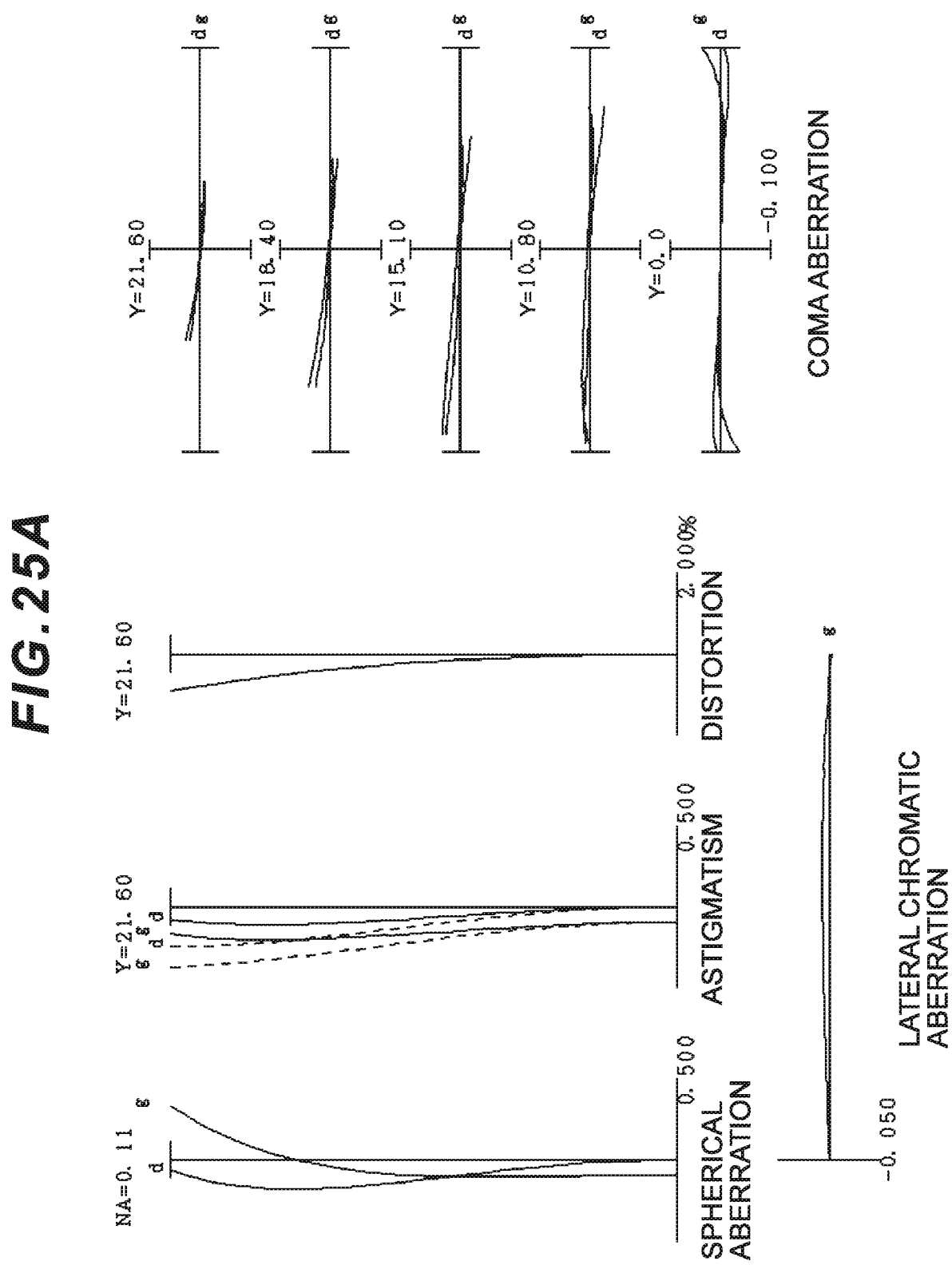

FIG. 22A is a graph showing various aberrations of the zoom optical system according to Example 5 having a vibration-proof function upon focusing on infinity in the wide angle end state, and FIG. 22B is a meridional lateral aberration graph in a case where blur correction is performed for the roll blur of 0.30°. FIG. 23 is a graph showing various aberrations of the zoom optical system according to Example 5 having a vibration proof function upon focusing on infinity in the intermediate focal length state. FIG. 24A is a graph showing various aberrations of the zoom optical system according to Example 5 having a vibration-proof function upon focusing on infinity in the telephoto end state, and FIG. 24B is a meridional lateral aberration graph in a case where blur correction is performed for the roll blur of 0.20°. FIGS. 25A, 25B, and 25C are graphs showing various aberrations of the zoom optical system according to Example 5 upon focusing on a short distant object, respectively in the wide angle end state, the intermediate focal length state, and the telephoto end state.

It can be seen in these aberration graphs that the zoom optical system according to Example 5 can achieve excellent imaging performance with various aberrations successfully corrected from the wide angle end state to the telephoto end state, and can achieve excellent imaging performance upon focusing on a short distant object.

Example 6

Example 6 is described with reference to FIG. 26, FIGS. 27A and 27B, FIG. 28, FIGS. 29A and 29B, and FIGS. 30A-30C and Table 6. FIG. 26 is a diagram illustrating a lens configuration of a zoom optical system according to Example 6 of the present embodiment. The zoom optical system ZL(6) according to Example 6 consists of, in order from an object: a first lens group G1 having positive refractive power; a second lens group G2 having negative refractive power; a third lens group G3 having negative refractive power; a fourth lens group G4 having positive refractive power; an aperture stop S; a fifth lens group G5 having positive refractive power; and a sixth lens group G6 having negative refractive power. The first to the sixth lens groups G1 to G6 each move in a direction indicated by an arrow in FIG. 26 upon zooming from a wide angle end state (W) to a telephoto end state (T). In this Example, the intermediate group GM includes the second lens group G2 and the third lens group G3, the intermediate side lens group GRP1 includes the fourth lens group G4 and the aperture stop S, the subsequent side lens group GRP2 includes the fifth lens group G5, and the subsequent group GR includes the sixth lens group G6. The intermediate group GM has negative refractive power as a whole.

The first lens group G1 consists of, in order from the object, a positive lens (1-1st lens) L11 having a biconvex shape and a cemented positive lens consisting of a negative meniscus lens (1-2nd lens) L12 having a convex surface facing the object and a positive meniscus lens (1-3rd lens) L13 having a convex surface facing the object.

The second lens group G2 consists of, in order from the object, a negative meniscus lens L21 having a convex surface facing the object and a positive meniscus lens L22 having a convex surface facing the object.

The third lens group G3 consists of a cemented negative lens consisting of a negative lens L31 having a biconcave shape and a positive meniscus lens L32 having a convex surface facing the object.

The fourth lens group G4 consists of, in order from the object, a positive lens L41 having a biconvex shape and a cemented positive lens consisting of a positive lens L42 having a biconvex shape and a negative lens L43 having a biconcave shape. The aperture stop S is disposed in the neighborhood of and to the image side of the fourth lens group G4, and integrally moves with the fourth lens group G4 upon zooming.

The fifth lens group G5 consists of a cemented positive lens consisting of a positive lens L51 having a biconvex shape and a negative meniscus lens L52 having a concave surface facing the object.

The sixth lens group G6 consists of, in order from the object, a negative lens L61 having a biconcave shape, a positive meniscus lens L62 having a concave surface facing the object, a negative meniscus lens L63 having a concave surface facing the object, and a positive lens L64 having a biconvex shape. An image surface I is disposed to the image side of the sixth lens group G6.

In the zoom optical system ZL(6) according to Example 6, the fifth lens group G5 (subsequent side lens group GRP2) moves toward the object upon focusing from a long distant object to a short distant object. In the zoom optical system ZL(6) according to Example 6, all the lenses (cemented negative lens) in the third lens group G3 serves as a vibration-proof lens group (partial group), movable in a direction orthogonal to the optical axis, to be in charge of correcting displacement of the imaging position due to camera shake or the like (image blur on the image surface I).

To correct roll blur of an angle θ with a focal length of the whole system being f and with a lens having a vibration proof coefficient K (the ratio of the image movement amount on the imaging surface to the movement amount of the moving lens group for camera shake correction), a moving lens group for camera shake correction is moved in the direction orthogonal to the optical axis by (f·tan θ)/K. In the wide angle end state in Example 6, the vibration proof coefficient is 0.97 and the focal length is 72.1 mm, and thus the movement amount of the vibration-proof lens group to correct a roll blur of 0.30° is 0.39 mm. In the telephoto end state in Example 6, the vibration proof coefficient is 2.01 and the focal length is 292.0 mm, and thus the movement amount of the vibration-proof lens group to correct a roll blur of 0.20° is 0.51 mm.

Table 6 below lists specification values of the optical system according to Example 6.

TABLE 6

[Lens specifications]

| Surface number | R | D | nd | νd |
|---|---|---|---|---|
| Object surface | ∞ | | | |
| 1 | 508.9189 | 3.766 | 1.48749 | 70.31 |
| 2 | −429.0392 | 0.200 | | |
| 3 | 100.5086 | 1.700 | 1.67270 | 32.19 |
| 4 | 64.9622 | 8.695 | 1.49700 | 81.73 |
| 5 | 2159.2215 | Variable | | |
| 6 | 177.6966 | 1.000 | 1.83481 | 42.73 |
| 7 | 35.6714 | 6.299 | | |
| 8 | 37.8917 | 2.779 | 1.84666 | 23.80 |
| 9 | 62.3935 | Variable | | |
| 10 | −64.2559 | 1.000 | 1.67003 | 47.14 |
| 11 | 36.7145 | 3.536 | 1.75520 | 27.57 |
| 12 | 146.9123 | Variable | | |
| 13 | 109.3840 | 3.810 | 1.80610 | 40.97 |
| 14 | −70.8019 | 0.200 | | |
| 15 | 42.2948 | 5.265 | 1.49700 | 81.73 |
| 16 | −53.8261 | 1.000 | 1.85026 | 32.35 |
| 17 | 161.9717 | 1.485 | | |
| 18 | ∞ | Variable | | (Aperture stop S) |
| 19 | 106.0675 | 4.532 | 1.51680 | 63.88 |
| 20 | −28.5067 | 1.000 | 1.80100 | 34.92 |
| 21 | −53.2383 | Variable | | |
| 22 | −126.6137 | 1.000 | 1.90366 | 31.27 |
| 23 | 60.3618 | 10.455 | | |
| 24 | −323.4470 | 4.054 | 1.68893 | 31.16 |
| 25 | −33.1410 | 16.327 | | |
| 26 | −24.3740 | 1.000 | 1.77250 | 49.62 |
| 27 | −200.9248 | 0.200 | | |
| 28 | 79.6785 | 3.126 | 1.71736 | 29.57 |
| 29 | −428.7833 | BF | | |
| Image surface | ∞ | | | |

[Various data]
Zooming rate 4.05

| | W | M | T |
|---|---|---|---|
| f | 72.1 | 100.0 | 292.0 |
| FNO | 4.54 | 4.72 | 5.88 |
| 2ω | 33.58 | 23.90 | 8.26 |
| Ymax | 21.60 | 21.60 | 21.60 |
| TL | 193.32 | 211.83 | 248.32 |
| BF | 38.32 | 41.01 | 61.32 |

[Various distance data]

| | W Infinity | M Infinity | T Infinity | W Short distant | M Short distant | T Short distant |
|---|---|---|---|---|---|---|
| d5 | 2.000 | 26.835 | 74.493 | 2.000 | 26.835 | 74.493 |
| d9 | 5.400 | 5.100 | 4.500 | 5.400 | 5.100 | 4.500 |
| d12 | 41.592 | 32.879 | 2.000 | 41.592 | 32.879 | 2.000 |
| d18 | 21.578 | 20.267 | 21.578 | 20.680 | 19.126 | 19.320 |
| d21 | 2.000 | 3.311 | 2.001 | 2.898 | 4.453 | 4.259 |

[Lens group data]

| Group | Starting surface | Focal length |
|---|---|---|
| G1 | 1 | 170.267 |
| G2 | 6 | −114.490 |
| G3 | 10 | −74.908 |
| G4 | 13 | 50.411 |
| G5 | 19 | 100.849 |
| G6 | 22 | −52.429 |

TABLE 6-continued

[Conditional expression corresponding value]

| | |
|---|---|
| Conditional expression | (1) fvr/fMt = 1.807 |
| Conditional expression | (2) (−fvr)/ft = 0.257 |
| Conditional expression | (3) f1/(−fMt) = 4.107 |
| Conditional expression | (4) fP/(−fN) = 0.564 |
| Conditional expression | (5) nP/nN = 0.895 |
| Conditional expression | (6 νP/νN = 2.539 |

Figure 27A:
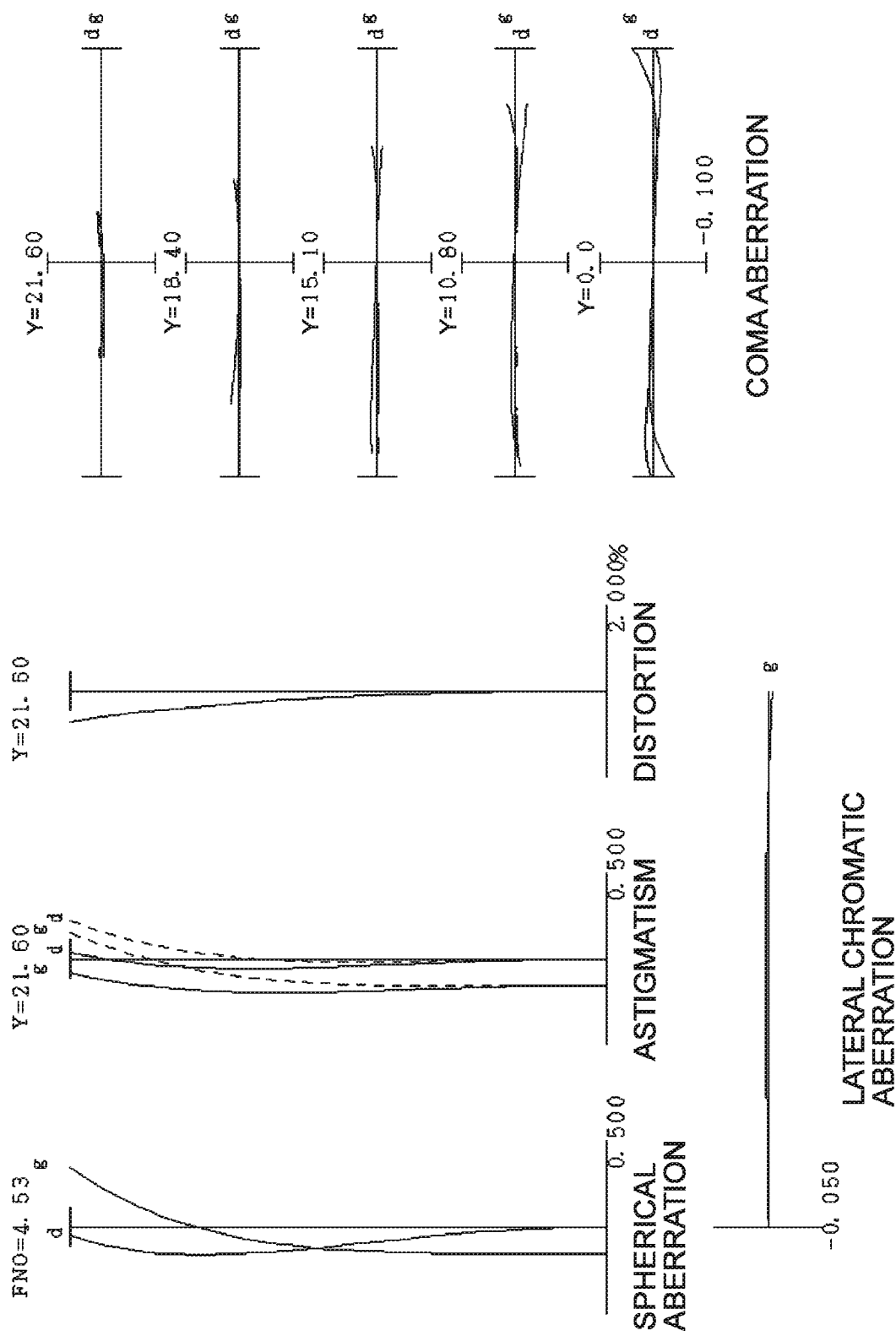
FIG. 27A is a graph showing various aberrations of the zoom optical system according to Example 6 upon focusing on infinity in the wide angle end state.
Figure 27B:
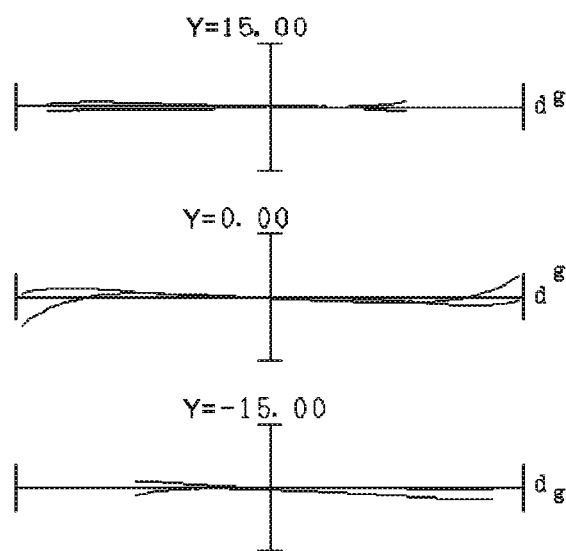
FIG. 27B is a meridional lateral aberration graph in a case where blur correction is performed for the roll blur of 0.30°.
Figure 28:
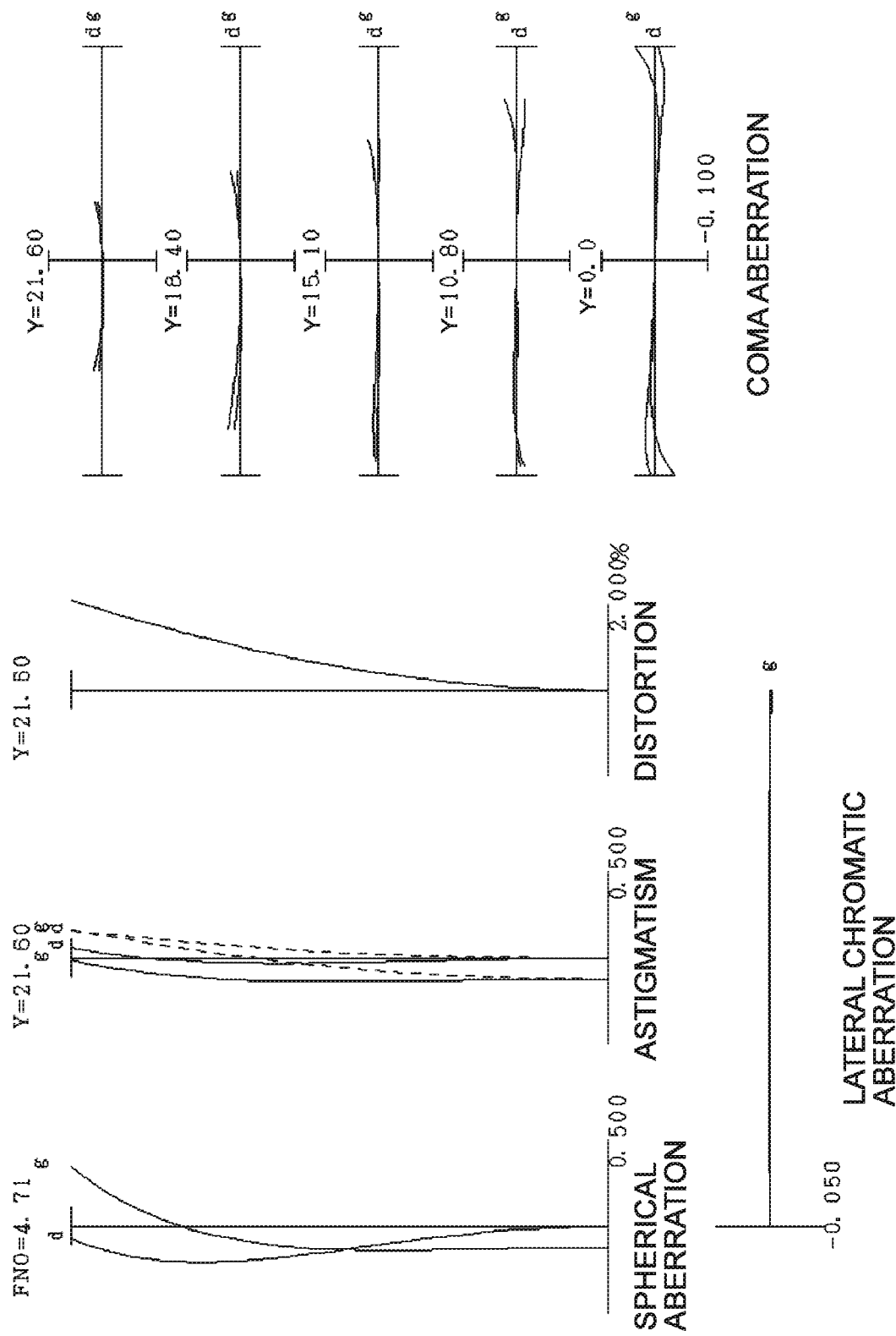
FIG. 28 is a graph showing various aberrations of the zoom optical system according to Example 6 upon focusing on infinity in the intermediate focal length state.
Figure 29A:
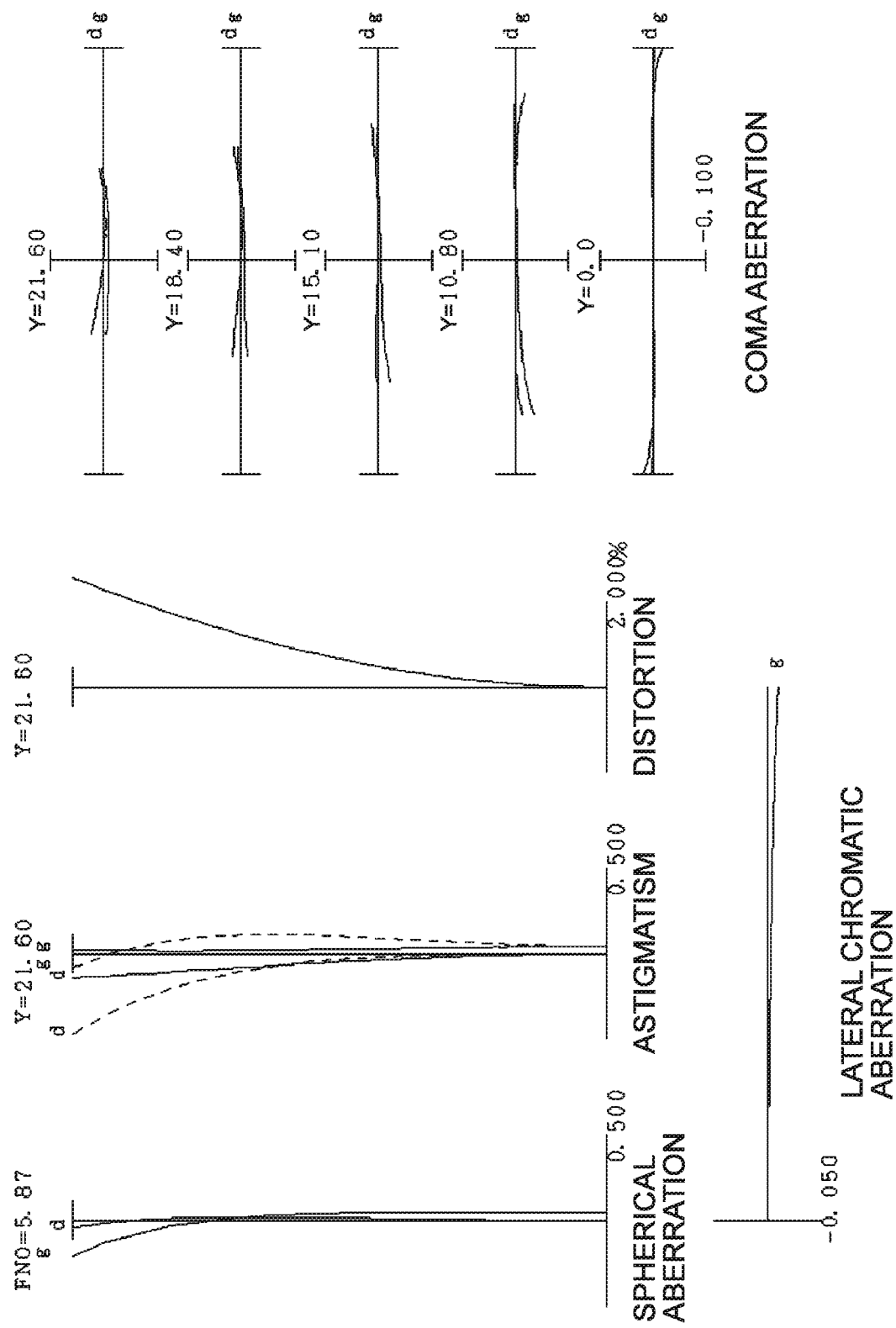
FIG. 29A is a graph showing various aberrations of the zoom optical system according to Example 6 upon focusing on infinity in the telephoto end state.
Figure 29B:
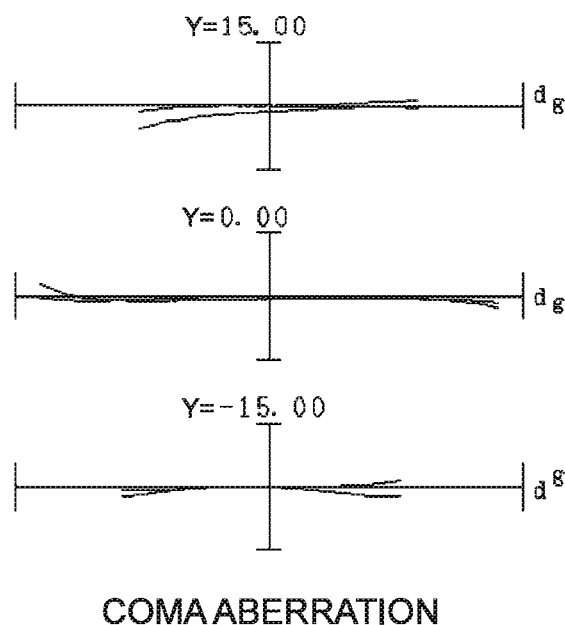
FIG. 29B is a meridional lateral aberration graph in a case where blur correction is performed for the roll blur of 0.20°.
Figure 30B:
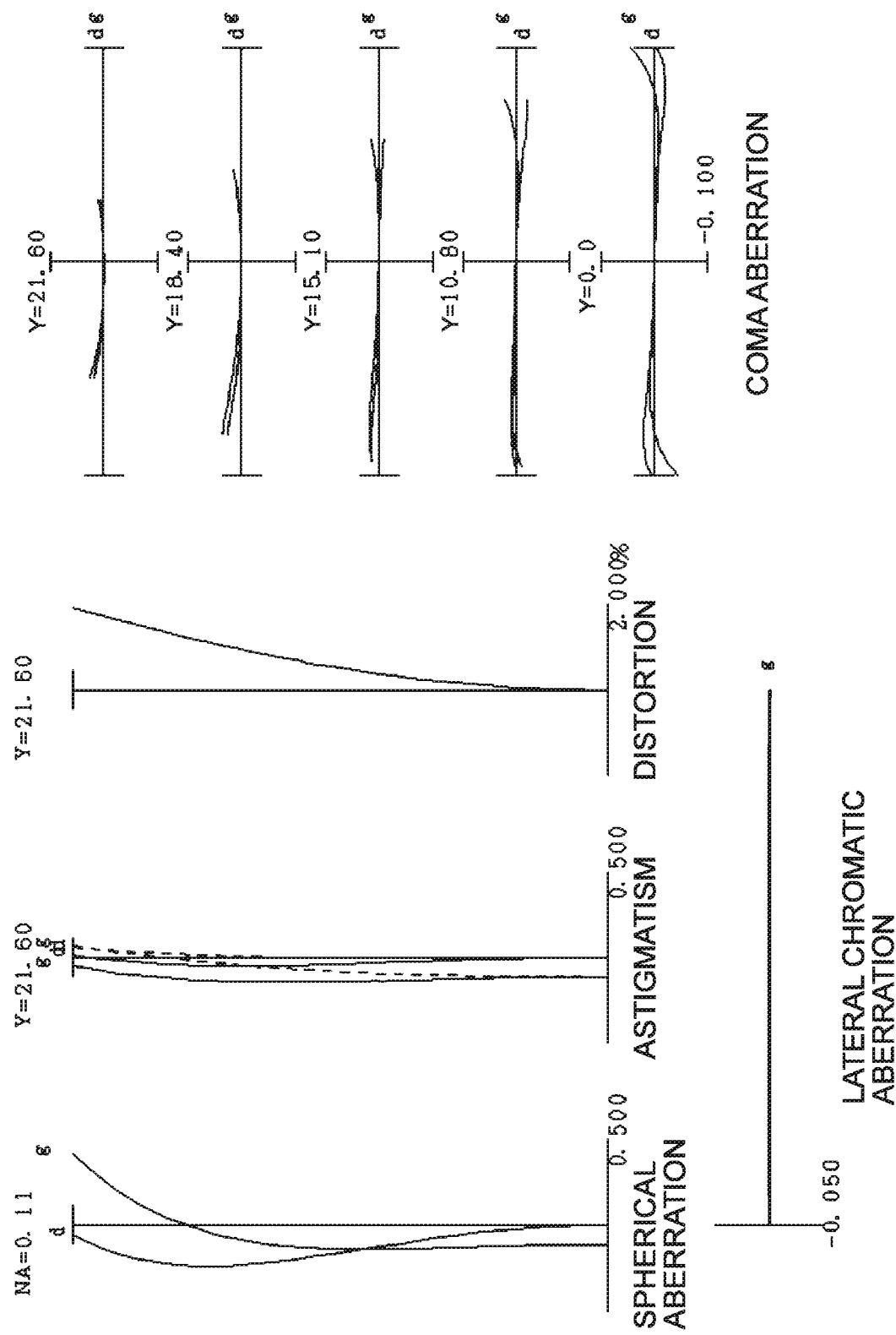
Figure 30C:
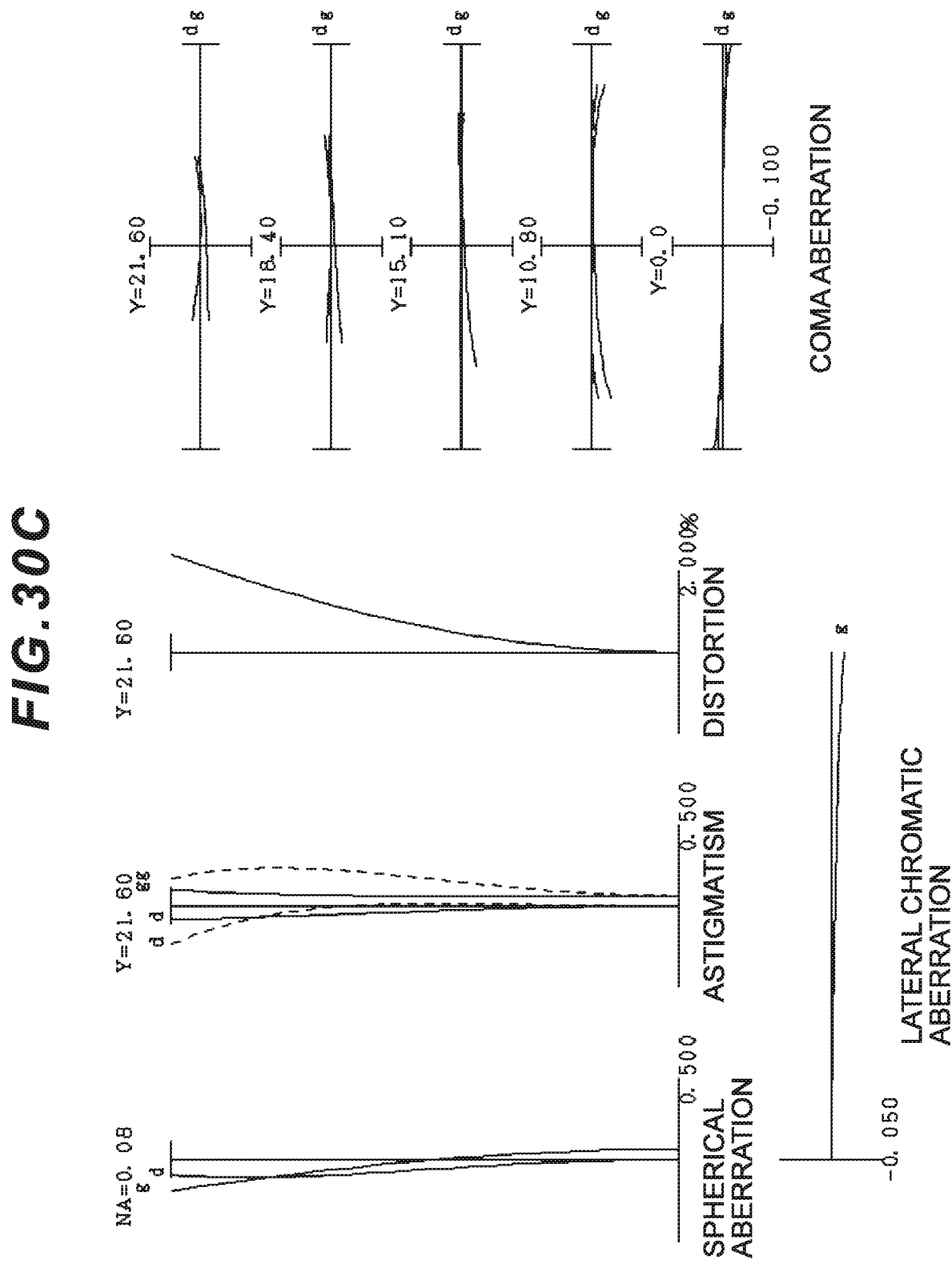

FIG. 27A is a graph showing various aberrations of the zoom optical system according to Example 6 having a vibration-proof function upon focusing on infinity in the wide angle end state, and FIG. 27B is a meridional lateral aberration graph in a case where blur correction is performed for the roll blur of 0.30°. FIG. 28 is a graph showing various aberrations of the zoom optical system according to Example 6 having a vibration proof function upon focusing on infinity in the intermediate focal length state. FIG. 29A is a graph showing various aberrations of the zoom optical system according to Example 6 having a vibration-proof function upon focusing on infinity in the telephoto end state, and FIG. 29B is a meridional lateral aberration graph in a case where blur correction is performed for the roll blur of 0.20°. FIGS. 30A, 30B, and 30C are graphs showing various aberrations of the zoom optical system according to Example 6 upon focusing on a short distant object, respectively in the wide angle end state, the intermediate focal length state, and the telephoto end state.

It can be seen in these aberration graphs that the zoom optical system according to Example 6 can achieve excellent imaging performance with various aberrations successfully corrected from the wide angle end state to the telephoto end state, and can achieve excellent imaging performance upon focusing on a short distant object.

According to Examples described above, the subsequent side lens group GRP2 serves as the focusing lens group to achieve a small size and light weight so that quick and quiet AF (autofocus) can be implemented without using a large barrel. Furthermore, a zoom optical system successfully preventing variation of aberrations upon zooming from the wide angle end state to the telephoto end state, as well as variation of aberrations upon focusing on a short distant object from an infinite distant object can be implemented.

Examples described above are merely examples of the invention according to the present application. The invention according to the present application is not limited to these examples.

The following configurations can be appropriately employed as long as the optical performance of the zoom optical system according to the present embodiment is not compromised.

Examples of values of the zoom optical system according to the present embodiment having five or six lens groups are described above. However, this should not be construed in a limiting sense, and a zoom optical system with other lens group configurations (for example, a configuration with seven lens groups or the like) may be employed. More specifically, the zoom optical system according to the present embodiment may be further provided with a lens or a lens group closest to an object or further provided with a lens or a lens group closest to the image surface. The lens group is a portion comprising at least one lens separated from another lens with a distance varying upon zooming.

The focusing lens group is a portion comprising at least one lens separated from another lens with a distance varying upon focusing. Thus, the focusing lens group may be provided for focusing from an infinite distant object to a short distant object, with a single or a plurality of lens groups or a partial lens group moved in the optical axis direction. The focusing lens group can be applied to auto focus, and is suitable for motor driving for auto focus (using supersonic wave motors, etc.).

The lens surface may be formed to have a spherical surface or a planer surface, or may be formed to have an aspherical surface. The lens surface having a spherical surface or a planer surface features easy lens processing and assembly adjustment, which leads to the processing and assembly adjustment less likely to involve an error compromising the optical performance, and thus is preferable. Furthermore, there is an advantage that a rendering performance is not largely compromised even when the image surface is displaced.

The lens surface having an aspherical surface may be achieved with any one of an aspherical surface formed by grinding, a glass-molded aspherical surface obtained by molding a glass piece into an aspherical shape, and a composite type aspherical surface obtained by providing an aspherical shape resin piece on a glass surface. A lens surface may be a diffractive surface. The lens may be a gradient index lens (GRIN lens) or a plastic lens.

The aperture stop is preferably disposed in the neighborhood of the third or the fourth lens group. Alternatively, the aperture stop may be disposed in the third or the fourth lens group. A lens frame may serve as the aperture stop so that the member serving as the aperture stop needs not to be provided.

The lens surfaces may be provided with an antireflection film comprising high transmittance over a wide range of wavelengths to achieve an excellent optical performance with reduced flare and ghosting and increased contrast. Thus, an excellent optical performance with reduced flare and ghosting and increased contrast can be achieved.

EXPLANATION OF NUMERALS AND CHARACTERS

G1 first lens group
G2 second lens group
G3 third lens group
G4 fourth lens group
G5 fifth lens group
G6 sixth lens group
GM intermediate group
GR subsequent group
GRP1 intermediate side lens group
GRP2 subsequent side lens group
I image surface
S aperture stop

The invention claimed is:

1. A zoom optical system comprising, in order from an object: a first lens group having positive refractive power; an intermediate group including at least one lens group and having negative refractive power as a whole; an intermediate side lens group having positive refractive power; a subsequent side lens group having positive refractive power; and a subsequent group including at least one lens group, wherein
upon zooming, distances between the first lens group and the intermediate group, between the intermediate group and the intermediate side lens group, between the intermediate side lens group and the subsequent side lens group, and between the subsequent side lens group and the subsequent group change,
the subsequent side lens group moves upon focusing,
the intermediate group comprising a partial group satisfying following conditional expressions:

$$1.4 < fvr/fMt < 2.5;\ \text{and}$$

$$0.15 < (-fvr)/ft < 0.35$$

where,
fvr denotes a focal length of the partial group,
fMt denotes a focal length of the intermediate group in a telephoto end state, and
ft denotes a focal length of the zoom optical system in the telephoto end state,
wherein the partial group is a vibration-proof lens group movable to comprise a component in a direction orthogonal to an optical axis to correct image blur, and
wherein the lens group disposed closest to an image has negative refractive power.

2. The zoom optical system according to claim 1, wherein a following conditional expression is satisfied:

$$2.9 < f1/(-fMt) < 5.5$$

where,
f1 denotes a focal length of the first lens group.

3. The zoom optical system according to claim 1, wherein the first lens group moves toward the object upon zooming from a wide angle end state to a telephoto end state.

4. The zoom optical system according to claim 1, wherein the subsequent side lens group comprises at least one lens having positive refractive power and at least one lens having negative refractive power.

5. The zoom optical system according to claim 4, wherein a following conditional expression is satisfied:

$$0.2 < fP/(-fN) < 0.8$$

where,
fP denotes a focal length of a lens with largest positive refractive power in the subsequent side lens group, and
fN denotes a focal length of a lens with largest negative refractive power in the subsequent side lens group.

6. The zoom optical system according to claim 1, wherein the first lens group comprises, in order from an object: a 1-1st lens having positive refractive power; a 1-2nd lens having negative refractive power; and a 1-3rd lens having positive refractive power.

7. The zoom optical system according to claim 6, wherein a following conditional expression is satisfied:

$$0.85 < nP/nN < 1.00$$

where,
nP denotes a refractive index of a lens with largest positive refractive power in the first lens group, and
nN denotes a refractive index of a lens with largest negative refractive power in the first lens group.

8. The zoom optical system according to claim 6, wherein a following conditional expression is satisfied:

$$2.25 < vP/vN < 2.90$$

where,
vP denotes an Abbe number of the lens with largest positive refractive power in the first lens group, and
vN denotes an Abbe number of the lens with largest negative refractive power in the first lens group.

9. An optical apparatus comprising the zoom optical system according to claim 1.

10. A method for manufacturing a zoom optical system which comprises, in order from an object: a first lens group having positive refractive power; an intermediate group including at least one lens group and having negative refractive power as a whole; an intermediate side lens group having positive refractive power; a subsequent side lens group having positive refractive power; and a subsequent group including at least one lens group, the method comprising a step of arranging the lens groups in a lens barrel so that:

upon zooming, distances between the first lens group and the intermediate group, between the intermediate group and the intermediate side lens group, between the intermediate side lens group and the subsequent side lens group, and between the subsequent side lens group and the subsequent group change;

the subsequent side lens group moves upon focusing; and the intermediate group comprises a partial group satisfying following conditional expressions:

$$1.4 < fvr/fMt < 2.5; \text{ and}$$

$$0.15 < (-fvr)/ft < 0.35$$

where, fvr denotes a focal length of the partial group, fMt denotes a focal length of the intermediate group in a telephoto end state, and ft denotes a focal length of the zoom optical system in the telephoto end state, wherein the partial group is a vibration-proof lens group movable to comprise a component in a direction orthogonal to an optical axis to correct image blur, and wherein the lens group disposed closest to an image has negative refractive power.

11. The zoom optical system according to claim 1, wherein the subsequent group consists of negative refractive power lenses only.

* * * * *